(12) United States Patent
Wada et al.

(10) Patent No.: US 8,483,034 B2
(45) Date of Patent: Jul. 9, 2013

(54) OPTICAL PICKUP, INCLINATION ANGLE DETECTION METHOD, OPTICAL INFORMATION DEVICE AND INFORMATION PROCESSING DEVICE

(75) Inventors: Hidenori Wada, Kyoto (JP); Kousei Sano, Osaka (JP); Keiichi Matsuzaki, Kyoto (JP); Sadao Mizuno, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/702,882

(22) PCT Filed: Nov. 9, 2011

(86) PCT No.: PCT/JP2011/006264
§ 371 (c)(1),
(2), (4) Date: Dec. 7, 2012

(87) PCT Pub. No.: WO2012/063484
PCT Pub. Date: May 18, 2012

(65) Prior Publication Data
US 2013/0083645 A1 Apr. 4, 2013

(30) Foreign Application Priority Data

Nov. 10, 2010 (JP) .................................. 2010-251460
May 10, 2011 (JP) .................................. 2011-104980
May 25, 2011 (JP) .................................. 2011-116569

(51) Int. Cl.
*G11B 7/00* (2006.01)

(52) U.S. Cl.
USPC .................................. 369/112.23; 369/53.19

(58) Field of Classification Search
USPC ............... 369/112.01, 112.02, 112.1, 112.03, 369/112.23, 53.12, 53.19, 53.14, 53.27, 44.32
See application file for complete search history.

(56) References Cited

U.S. PATENT DOCUMENTS

| 7,462,855 | B2 | 12/2008 | Saito et al. |
| 7,551,540 | B2 * | 6/2009 | Shinoda .................... 369/112.23 |
| 8,130,623 | B2 | 3/2012 | Narumi et al. |
| 8,179,768 | B2 | 5/2012 | Tanaka et al. |
| 8,233,372 | B2 | 7/2012 | Tanaka et al. |
| 2006/0255247 | A1 | 11/2006 | Saito et al. |
| 2007/0217300 | A1 | 9/2007 | Koyama et al. |
| 2007/0242583 | A1 | 10/2007 | Huang et al. |
| 2009/0161522 | A1 | 6/2009 | Shin |
| 2010/0254248 | A1 | 10/2010 | Tanaka et al. |

(Continued)

FOREIGN PATENT DOCUMENTS

| JP | 2005-332447 | 12/2005 |
| JP | 2006-4596 | 1/2006 |

(Continued)

*Primary Examiner* — Nabil Z Hindi
(74) *Attorney, Agent, or Firm* — Wenderoth, Lind & Ponack, L.L.P.

(57) ABSTRACT

An optical pickup, an inclination angle detection method, an optical information device, and an information processing device capable of reliably and accurately detecting a relative inclination angle between an end face of a solid immersion lens and a surface of an optical recording medium are provided. A convergence position modifying unit modifies convergence states of a first beam and a second beam according to layers of an optical recording medium, a first optical detector includes a first light receiving section which receives the converged first beam and a second light receiving section which receives the converged second beam, and the first optical detector detects a relative inclination angle between an end face of a solid immersion lens and a surface of the optical recording medium based on a difference in quantities of received light between the first light receiving section and the second light receiving section.

19 Claims, 46 Drawing Sheets

U.S. PATENT DOCUMENTS

2010/0278030 A1 11/2010 Tanaka et al.
2011/0069599 A1 3/2011 Narumi et al.

FOREIGN PATENT DOCUMENTS

| | | |
|---|---|---|
| JP | 2006-344351 | 12/2006 |
| JP | 2007-287297 | 11/2007 |
| JP | 2007-293963 | 11/2007 |
| JP | 2008-117513 | 5/2008 |
| JP | 2009-522712 | 6/2009 |
| WO | 2009/037850 | 3/2009 |
| WO | 2009/141994 | 11/2009 |
| WO | 2010/113411 | 10/2010 |

* cited by examiner $d3' \times \beta \times n_{disk}/n_{SIL}$

FIG.19A
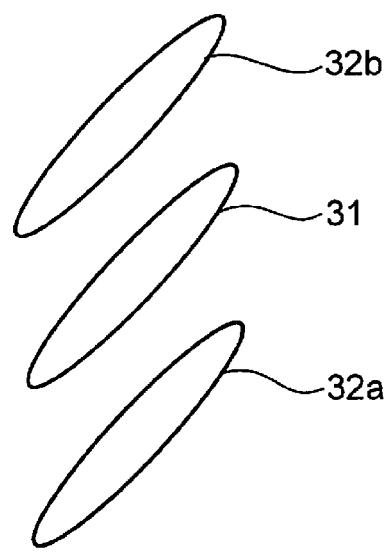
FIG.19B
FIG.19C
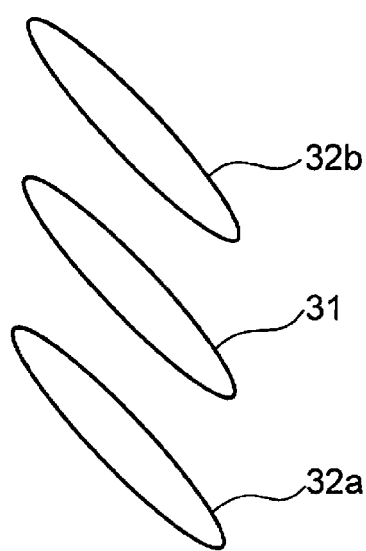

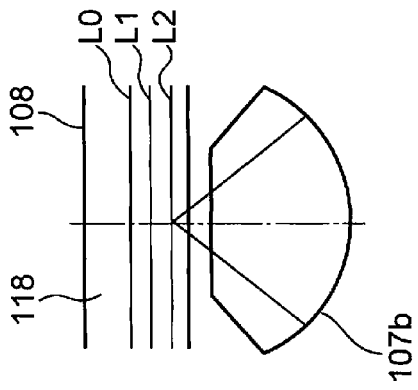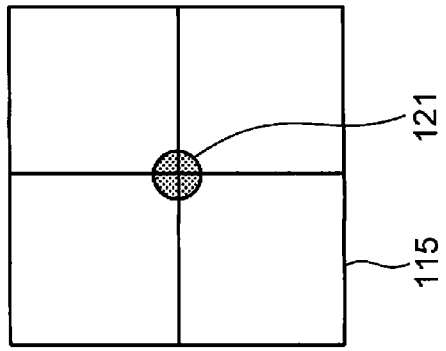
FIG.24C
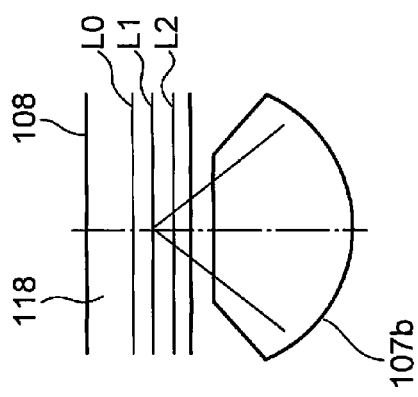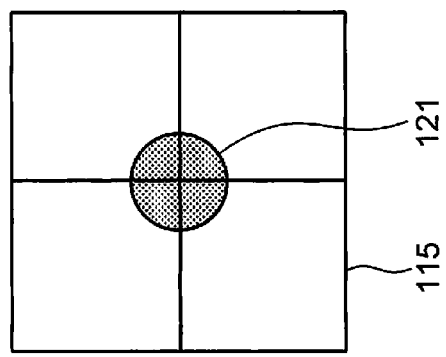
FIG.24B
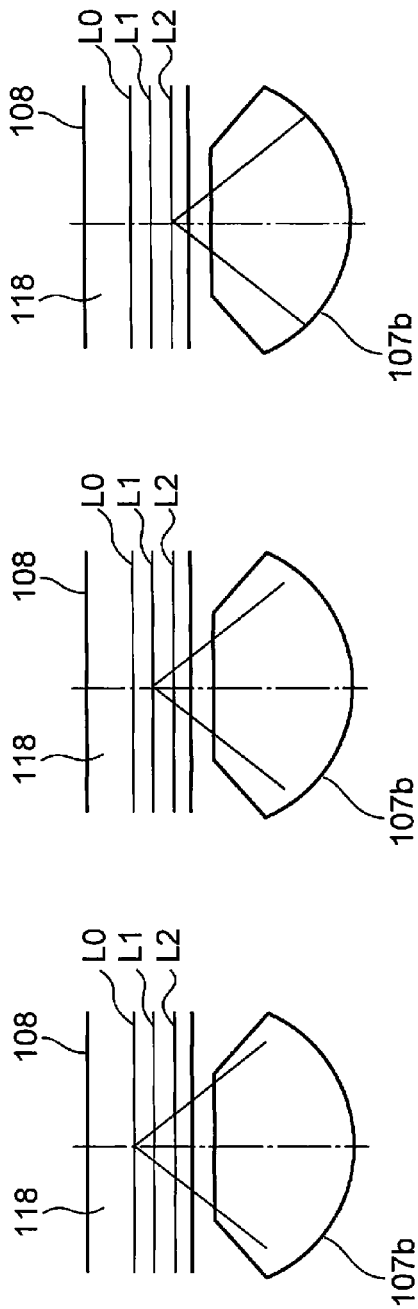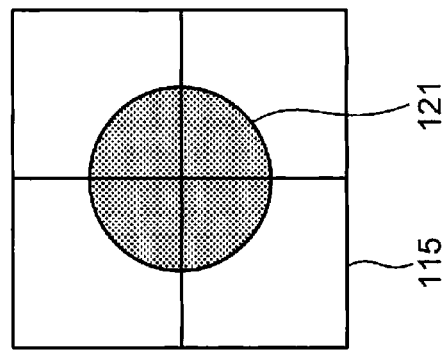
FIG.24A 131d  131c  131b  131a 131d  131c  131b  131a

OPTICAL PICKUP, INCLINATION ANGLE DETECTION METHOD, OPTICAL INFORMATION DEVICE AND INFORMATION PROCESSING DEVICE

TECHNICAL FIELD

The present invention relates to an optical pickup that irradiates an optical recording medium such as an optical disk or an optical card with converged light to record information on or reproduce information from the optical recording medium, an optical information device provided with the optical pickup, an information processing device provided with the optical information device, and an inclination angle detection method of detecting a relative inclination angle between a surface of an optical recording medium having a plurality of layers and an end face of a solid immersion lens, the end face opposing the surface of the optical recording medium.

BACKGROUND ART

Conventionally, optical disks such as a CD, a DVD, and a BD (Blu-ray Disc) are widely used as optical recording media for recording various types of information including video and sound. With an optical information device using such an optical recording medium, since information is recorded or reproduced by irradiating the optical recording medium with light, information recording density is dependent on a size of an optical spot that converges on the optical recording medium. Therefore, capacity enlargement of an optical recording medium can be achieved by reducing an optical spot irradiated by an optical pickup. The size of the optical spot is proportional to a numerical aperture of an objective lens and inversely proportional to a wavelength of irradiated light. Thus, a smaller optical spot can be formed by either further shortening the wavelength of the light used or further increasing the numerical aperture of the objective lens.

However, with optical information devices already put into practical use, a distance between an optical recording medium and an objective lens is sufficiently greater than wavelength. In addition, when a numerical aperture of an objective lens exceeds 1, light incident to the objective lens is fully reflected at a lens emission plane. Therefore, recording density of optical recording media could not be increased.

In consideration thereof, a near-field optical recording/reproducing method using an SIL (a solid immersion lens) has been developed as an optical recording/reproducing method that is applicable in a case where an objective lens has a numerical aperture exceeding 1. If n denotes a refractive index of a medium of an optical recording medium and $\theta$ denotes a maximum angle of incident light with respect to an optical axis, then a numerical aperture NA can be defined by NA=n·sin $\theta$. Normally, when the numerical aperture exceeds 1, an angle of light emitting the objective lens equals or exceeds a critical angle. Light in a region equal to or exceeding the critical angle is fully reflected at an emission end plane of the objective lens. The fully-reflected light seeps out from the emission end plane as an evanescent light. The near-field optical recording/reproducing method is configured such that the evanescent light propagates from the lens to the optical recording medium. Therefore, a spacing (an air gap) between the emission end plane of the objective lens and a surface of the optical recording medium is kept shorter than an attenuation distance of the evanescent light so that light in a range where a numerical aperture exceeds one is transmitted from the objective lens to the optical recording medium.

With an optical system using such a solid immersion lens, in order to propagate light in the form of evanescent light, a spacing between the solid immersion lens and an optical disk must be kept sufficiently shorter than a wavelength of light. For example, the spacing between the solid immersion lens and the optical disk must be set to approximately 1/10 of the wavelength of light or less, which means that when using light with a wavelength of 405 nm, the spacing between the solid immersion lens and the optical disk must be kept to around 25 nm. However, when there is a relative inclination between the solid immersion lens and the optical disk in such a narrowly-spaced state, an end of the solid immersion lens and the optical disk collide with each other. Therefore, a margin of error permissible for inclination is extremely small.

A relative inclination angle $\theta$ between the solid immersion lens and the optical disk is expressed by Expression (1) below. In Expression (1) below, g denotes a spacing between the solid immersion lens and the optical disk and D denotes a diameter of a tip of the solid immersion lens. When the diameter D of the tip of the solid immersion lens is set to 40 μm and the spacing g is set to 25 nm, the permissible relative inclination angle $\theta$ is around 0.07 degrees.

$$\theta=\sin^{-1}(g/2D) \quad (1)$$

However, limiting the relative inclination angle to or below 0.07 degrees is not easy. One method of limiting the relative inclination angle involves detecting the relative inclination angle and inclining the solid immersion lens or the optical disk. As a method of detecting a relative inclination angle, a method is proposed in which a distribution of a reflected light from an end face of the solid immersion lens is detected and the relative inclination angle is detected from a bias in the distribution of the reflected light (for example, refer to Patent Literature 1).

FIG. 47 is a diagram showing a configuration of a conventional optical pickup. A beam outputted from a semiconductor laser 401 is converted into a parallel light by a collimator lens 402 and is transmitted through a beam splitter 403 and a beam splitter 404. The beam having passed through a quarter wavelength plate 405 is converted into a convergent light by a lens 406a. The beam now in the form of a convergent light is incident to a solid immersion lens 406b and converges on an optical disk 407. A tip of the solid immersion lens 406b and a surface of the optical disk 407 are in proximity with each other at a distance where light is propagated in the form of evanescent light.

The beam reflected by the optical disk 407 once again passes through the solid immersion lens 406b, the lens 406a, and the quarter wavelength plate 405, and is incident to the beam splitter 404. A part of the beam incident to the beam splitter 404 is reflected and is incident to an optical detector 408. Another part of the beam incident to the beam splitter 404 is transmitted and is incident to the beam splitter 403. The beam incident to the beam splitter 403 is reflected toward an optical detector 409 and is incident to the optical detector 409. At this point, the optical detector 408 receives the beam reflected by an information face of the optical disk 407 and generates a signal for information reproduction. On the other hand, the optical detector 409 receives light reflected by an end face of the solid immersion lens 406b. In addition, the optical detector 409 has a four-fraction light receiving section. Each light receiving section outputs a signal corresponding to a quantity of respectively received light.

FIG. 48 is an enlarged view of a vicinity of the end face of the solid immersion lens 406b in a case where the end face of the solid immersion lens 406b and a surface of the optical disk 407 are inclined relative to each other in the conventional optical pickup. A peripheral light depicted by an arrow A and a peripheral light depicted by an arrow B differ from each other in distances between the end face of the solid immersion lens 406b and the surface of the optical disk 407. Therefore, a position where the peripheral light depicted by the arrow A passes and a position where the peripheral light depicted by the arrow B passes have different reflectances. Accordingly, light-dark differences occur in a beam reflected by the end face of the solid immersion lens 406b. The optical detector 409 shown in FIG. 47 is able to detect an inclination angle by detecting the light-dark differences as differences in signal quantities among the four light receiving sections.

In addition, as another method of detecting a relative inclination angle, a method is proposed in which a plurality of beams are irradiated on an optical disk through an end face of a solid immersion lens to detect a relative inclination angle (for example, refer to Patent Literature 2).

However, with the conventional configuration described above, when conceivably using only one light source on a multilayered disk having a plurality of recording layers to obtain a reproduction signal from the recording layers, a gap signal for gap control, and a tilt signal for detecting a relative inclination angle, a beam diameter at the end face of the solid immersion lens varies according to a position of the recording layer on which information is to be recorded or from which information is to be reproduced. As a result, a detection sensitivity of a relative inclination angle varies significantly. In particular, using a solid immersion lens is problematic in that the thinness of a cover layer of the optical disk prevents a practical tilt detection sensitivity from being obtained at a recording layer nearest to the surface.

In addition, when changing a layer on which a beams is focused (for example, a recording layer on which information is recorded or from which information is reproduced) in a multilayered disk, a conventional method of using a plurality of beams is problematic in that detection cannot be carried out by sufficiently separating a main beam and a sub-beam from each other.

CITATION LIST

Patent Literature
Patent Literature 1: Japanese Patent Application Laid-open No. 2006-344351
Patent Literature 2: Japanese Patent Application Laid-open No. 2006-004596

SUMMARY OF THE INVENTION

The present invention has been made in order to solve the problems described above, and an object thereof is to provide an optical pickup, an inclination angle detection method, an optical information device, and an information processing device capable of reliably and accurately detecting a relative inclination angle between an end face of a solid immersion lens and a surface of an optical recording medium.

An optical pickup according to an aspect of the present invention comprises: an optical beam generating unit which generates a first beam and a second beam; an objective lens optical system which includes a solid immersion lens having an end face opposing a surface of an optical recording medium having a plurality of layers, and which converges the first beam and the second beam on the optical recording medium; a first branch element which reflects the first beam and the second beam reflected by the end face of the solid immersion lens; a convergence state modifying unit which converges the first beam and the second beam reflected by the first branch element and which modifies convergence states of the first beam and the second beam; and a first optical detector which detects the first beam and the second beam converged by the convergence state modifying unit, wherein a center of the first beam and a center of the second beam are at positions that differ from each other on the end face of the solid immersion lens, the convergence state modifying unit modifies the convergence states of the first beam and the second beam according to layers of the optical recording medium, and the first optical detector includes a first light receiving section which receives the converged first beam and a second light receiving section which receives the converged second beam, and the first optical detector detects a relative inclination angle between the end face of the solid immersion lens and the surface of the optical recording medium based on a difference in quantities of received light between the first light receiving section and the second light receiving section.

According to this configuration, the optical beam generating unit generates a first beam and a second beam. The objective lens optical system includes a solid immersion lens having an end face opposing a surface of an optical recording medium having a plurality of layers, and converges the first beam and the second beam on the optical recording medium. The first branch element reflects the first beam and the second beam reflected by the end face of the solid immersion lens. The convergence state modifying unit converges the first beam and the second beam reflected by the first branch element, and modifies convergence states of the first beam and the second beam. The first optical detector detects the first beam and the second beam converged by the convergence state modifying unit. A center of the first beam and a center of the second beam are at positions that differ from each other on the end face of the solid immersion lens. The convergence state modifying unit modifies the convergence states of the first beam and the second beam according to layers of the optical recording medium. The first optical detector includes a first light receiving section which receives the converged first beam and a second light receiving section which receives the converged second beam, and the first optical detector detects a relative inclination angle between the end face of the solid immersion lens and the surface of the optical recording medium based on a difference in quantities of received light between the first light receiving section and the second light receiving section.

According to the present invention, even if an optical recording medium has a plurality of layers, convergence states of the first beam and the second beam are modified according to layers of the optical recording medium and a spot diameter of the first beam and the second beam incident to the first optical detector is modified to an appropriate size. Therefore, a relative inclination angle between an end face of a solid immersion lens and a surface of an optical recording medium can be reliably and accurately detected and a deviation in inclination angle can be suppressed.

The objects, features, and advantages of the present invention will become more apparent from the detailed description below taken in connection with the accompanying drawings.

BRIEF DESCRIPTION OF THE DRAWINGS

FIG. 19A is a diagram showing spots on a first optical detector of a main beam, a first sub-beam, and a second sub-beam reflected by an end face of a solid immersion lens when the main beam is focused on a first recording layer, FIG. 19B is a diagram showing spots on a first optical detector of a main beam, a first sub-beam, and a second sub-beam reflected by an end face of a solid immersion lens when the main beam is focused on a second recording layer, and FIG. 19C is a diagram showing spots on a first optical detector of a main beam, a first sub-beam, and a second sub-beam reflected by an end face of a solid immersion lens when the main beam is focused on a third recording layer.

FIG. 24A is a diagram showing light incident from an end face of a solid immersion lens to a first recording surface of an optical recording medium and a spot formed on a second optical detector in a case where light from a second light source is focused on the first recording surface in the optical pickup shown in FIG. 23, FIG. 24B is a diagram showing light incident from an end face of a solid immersion lens to a second recording surface of an optical recording medium and a spot formed on the second optical detector in a case where light from the second light source is focused on the second recording surface in the optical pickup shown in FIG. 23, and FIG. 24C is a diagram showing light incident from an end face of a solid immersion lens to a third recording surface of an optical recording medium and a spot formed on the second optical detector in a case where light from the second light source is focused on the third recording surface in the optical pickup shown in FIG. 23.

DESCRIPTION OF EMBODIMENTS

Hereinafter, embodiments of the present invention will be described with reference to the accompanying drawings. The following embodiments are merely one specific example of the present invention and are not intended to limit the technical scope of the present invention.

(First Embodiment)

Figure 1:
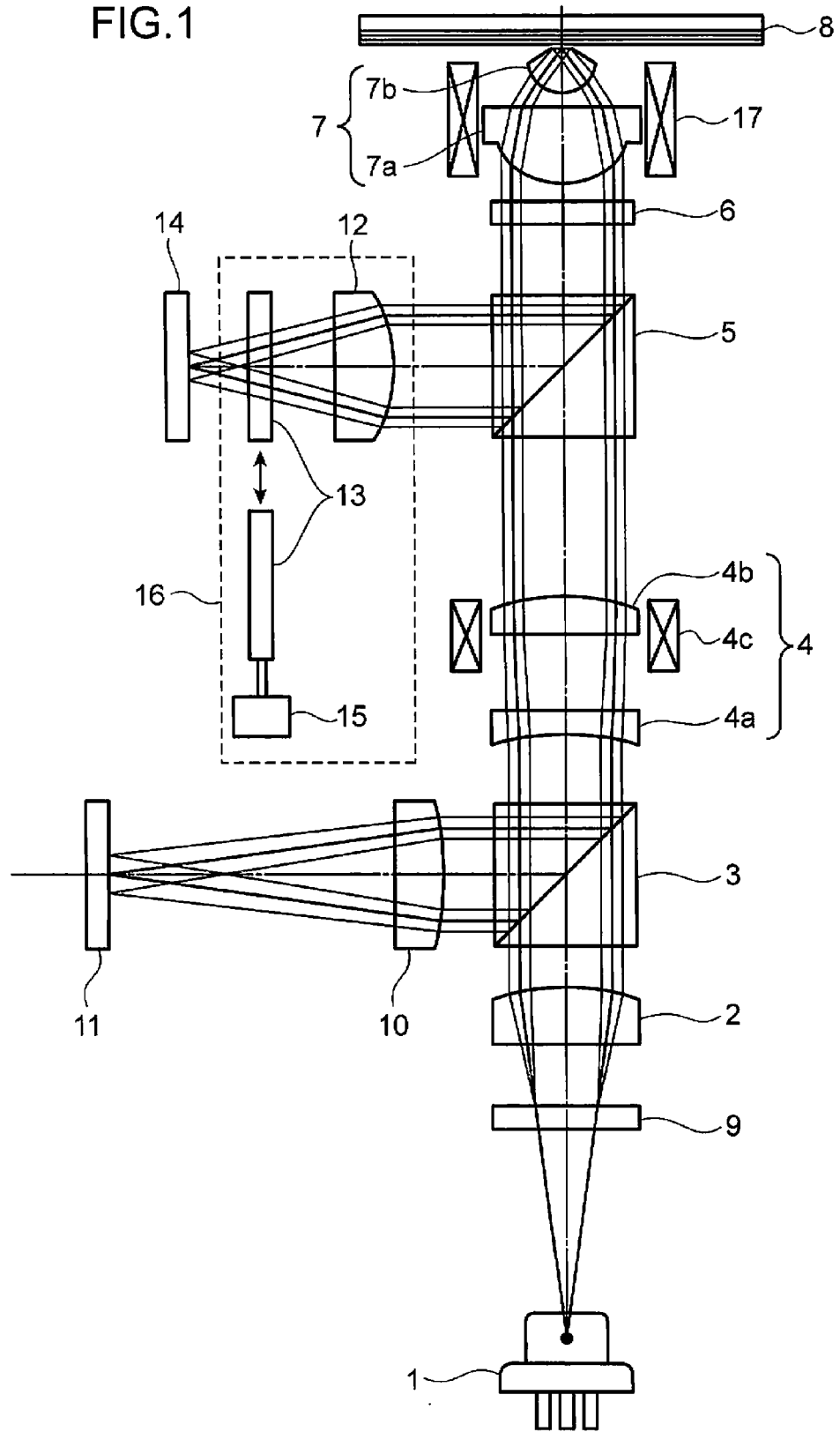
FIG. 1 is a diagram showing a configuration of an optical pickup according to a first embodiment of the present invention.

FIG. 1 is a diagram showing a configuration of an optical pickup according to a first embodiment of the present invention.

An optical pickup shown in FIG. 1 comprises a light source 1, a collimator lens 2, a first beam splitter (a second branch element) 3, an emittance modifying unit 4, a second beam splitter (a first branch element) 5, a quarter wavelength plate 6, an objective lens optical system 7, a diffractive grating (an optical beam generating unit) 9, a second detection lens 10, a second optical detector 11, a convergence position modifying unit 16, a first optical detector 14, and an objective lens actuator 17.

The emittance modifying unit 4 is constituted by a concave lens 4a, a convex lens 4b, and an actuator 4c that moves the convex lens 4b in an optical axis direction. The objective lens optical system 7 is constituted by a diaphragm lens 7a and a solid immersion lens (SIL) 7b.

Furthermore, in the present first embodiment, the convergence position modifying unit 16 that modifies a convergence position is an example of a convergence state modifying unit that modifies convergence states of a first beam and a second beam according to layers of an optical recording medium.

In this case, the light source 1 is constituted by, for example, a GaN-based semiconductor laser element and outputs a coherent light (with a wavelength of 390 to 450 nm) for recording or reproduction to each recording layer of an optical recording medium 8 having a plurality of recording layers (in the present embodiment, three layers).

Figure 2:
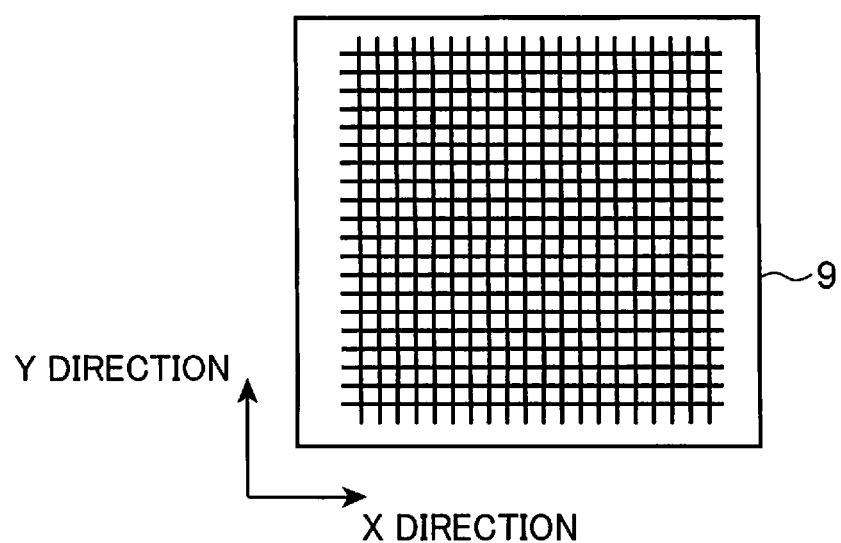
FIG. 2 is a front view showing an example of a diffractive grating according to the first embodiment of the present invention.

The optical recording medium 8 is a multilayered optical recording medium having three recording layers. The diffractive grating 9 is an optical element which diffracts an incident light and separates the incident beam into a plurality of beams. The diffractive grating 9 generates a first beam and a second beam. Among beams diffracted by the diffractive grating 9, 80% is zero-order diffracted light and 20% is first-order diffracted light. In addition, a pattern shown in FIG. 2 is formed on the diffractive grating 9. FIG. 2 is a front view showing an example of a diffractive grating according to the first embodiment of the present invention. The diffractive grating 9 diffracts a beam in an x direction and a y direction. In other words, the diffractive grating 9 is capable of separating an incident beam into five beams including zero-order diffracted light. In this case, the x direction corresponds to a radial direction of the optical recording medium 8 and the y direction corresponds to a tangential direction of the optical recording medium 8. Therefore, incident light is separated in both the radial direction and the tangential direction of the optical recording medium 8.

The collimator lens 2 converts a divergent light outputted from the light source 1 into a parallel light. The first beam splitter 3 has a property such that a given linearly-polarized light has a transmittance of 100% and a linearly-polarized light perpendicular to the given linearly-polarized light has a reflectance of 100%.

In addition, although the emittance modifying unit 4 is described in WO2009/37850 and a detailed description thereof will be omitted, the emittance modifying unit 4 modifies emittances of the first beam and the second beam generated by the diffractive grating 9. The emittance modifying unit 4 comprises the concave lens 4a having negative power, the convex lens 4b having positive power, and the actuator 4c which moves the convex lens 4b in the optical axis direction. By varying a spacing between the concave lens 4a and the convex lens 4b using the actuator 4c, the emittance modifying unit 4 is able to convert an emittance of the incident light into a different emittance. Modifying the emittance enables both a focus component and a spherical aberration to be simultaneously corrected according to a variation in thickness from the surface to the respective recording layers of the optical recording medium 8.

The second beam splitter 5 has a property such that, with respect to a wavelength of light outputted from the light source 1, a given linearly-polarized light has a transmittance of 90% and a reflectance of 10%, and a linearly-polarized light perpendicular to the given linearly-polarized light has a transmittance of 100%. The quarter wavelength plate 6 is formed of a birefringent material and converts a linearly-polarized light into a circularly-polarized light.

The objective lens optical system 7 converges the first beam and the second beam on the optical recording medium 8 having a plurality of layers. The objective lens optical system 7 converges the first beam and the second beam from the emittance modifying unit 4 on the optical recording medium 8 having a plurality of layers. The objective lens optical system 7 is constituted by the diaphragm lens 7a and the solid immersion lens (SIL) 7b. The solid immersion lens 7b has an end face opposing a surface of the optical recording medium 8. An air gap that exists between an emission end face of the solid immersion lens 7b and the surface of the optical recording medium 8, the surface opposing the emission end face, enables propagation of light in the form of evanescent light to be performed shorter than an evanescent attenuation length. In addition, a gap spacing is set shorter than approximately 1/10 of the wavelength.

The objective lens actuator 17 moves the objective lens optical system 7 in the optical axis direction (a focusing direction) and a tracking direction (a radial direction) of the optical recording medium 8. In addition, the objective lens actuator 17 adjusts an angle of the objective lens optical system 7 so that the emission end face of the solid immersion lens 7b of the objective lens optical system 7 and the surface of the optical recording medium 8 become parallel to each other. Moreover, the objective lens actuator 17 integrally moves the diaphragm lens 7a and the solid immersion lens 7b.

The second beam splitter 5 reflects the first beam and the second beam reflected by the end face of the solid immersion lens 7b.

The second detection lens 10 has an incidence plane that is a cylindrical surface and an emission plane that is a rotationally-symmetrical surface with respect to an optical axis of the lens. The second detection lens 10 imparts astigmatism to an incident light which enables detection of a focus error signal according to a so-called astigmatic method. The second optical detector 11 receives light reflected by a recording layer of the optical recording medium 8 and converts the light into an electrical signal according to a quantity of received light.

The convergence position modifying unit 16 converges the first beam and the second beam reflected by the second beam splitter 5 and modifies convergence states of the first beam and the second beam. The convergence position modifying unit 16 modifies the convergence states of the first beam and the second beam according to layers of the optical recording medium 8. The convergence position modifying unit 16 modifies convergence positions of the first beam and the second beam. The convergence position modifying unit 16 is constituted by a first detection lens 12, a glass plate 13, and a glass plate insertion section 15.

The first detection lens 12 focuses light reflected by the emission end face of the solid immersion lens 7b. The glass plate 13 is a flat glass plate with a transmittance of 100% and varies a focusing position of the first detection lens 12 by being inserted onto and removed from an optical path. The glass plate insertion section 15 inserts and removes the glass plate 13 onto and from the optical path. The first optical detector 14 detects the first beam and the second beam converged by the convergence position modifying unit 16. The first optical detector 14 receives light reflected by the emission end face of the solid immersion lens 7b and converts the light into an electrical signal according to a quantity of received light.

A center of the first beam and a center of the second beam are at positions that differ from each other on the end face of the solid immersion lens 7b. The first optical detector 14 includes a first light receiving section that receives the converged first beam and a second light receiving section that receives the converged second beam. The first optical detector 14 detects a relative inclination angle between the end face of the solid immersion lens 7b and the surface of the optical recording medium 8 based on a difference in quantities of received light between the first light receiving section and the second light receiving section.

Moreover, for example, the first beam is a main beam and the second beam is a sub-beam. There may be only one sub-beam or two or more sub-beams. The second beam splitter 5 reflects the main beam and the sub-beam reflected by the end face of the solid immersion lens 7b. The first optical detector 14 detects the main beam and the sub-beam converged by the convergence position modifying unit 16. The first beam splitter 3 reflects the main beam reflected by the optical recording medium 8. The second optical detector 11 detects the main beam reflected by the first beam splitter 3.

Operations of the optical pickup configured in this manner will now be described.

The light source 1 outputs a linearly-polarized light. The light outputted from the light source 1 is separated into five beams by the diffractive grating 9. The five beams consist of one main beam and four sub-beams. The five beams are converted into an approximately parallel light by the collimator lens 2 and are transmitted through the first beam splitter 3. The light transmitted through the first beam splitter 3 is incident to the emittance modifying unit 4. The emittance modifying unit 4 modifies an emittance of the incident light according to a position of a recording layer of the optical recording medium 8 on which the light is focused.

The light whose emittance is modified by the emittance modifying unit 4 is transmitted through the second beam splitter 5 and is incident to the quarter wavelength plate 6. The quarter wavelength plate 6 converts the incident linearly-polarized light into a circularly-polarized light. Light transmitted through the quarter wavelength plate 6 is focused by the objective lens optical system 7 on a predetermined recording layer of the optical recording medium 8.

Light reflected by the optical recording medium 8 is transmitted through the objective lens optical system 7, the quarter wavelength plate 6, the second beam splitter 5, and the emittance modifying unit 4 and is incident to the first beam splitter 3. Light reflected by the first beam splitter 3 is incident to the second detection lens 10. The light incident to the second detection lens 10 is imparted with an astigmatism. Light transmitted through the second detection lens 10 is focused on the second optical detector 11.

The second optical detector 11 outputs a focus error signal indicating an in-focus state of light on the optical recording medium 8. In addition, the second optical detector 11 outputs a tracking error signal indicating an irradiation position of light on the optical recording medium 8.

At this point, the focus error signal and the tracking error signal are detected by a known technique such as an astigmatic method and a push-pull method. In addition, based on the focus error signal from the second optical detector 11, a focus control unit (not shown) drives the actuator 4c to control a position of the convex lens 4b in the optical axis direction so that light is always focused on the optical recording medium 8 in an in-focus state. In other words, the actuator 4c moves the convex lens 4b in the optical axis direction according to a control signal from the focus control unit.

Furthermore, based on the tracking error signal from the second optical detector 11, a tracking control unit (not shown) drives the objective lens actuator 17 to control a position of the objective lens optical system 7 so that light is focused on a desired track on the optical recording medium 8. In other words, the objective lens actuator 17 moves the objective lens optical system 7 according to a control signal from the tracking control unit. Moreover, based on an electrical signal from the second optical detector 11, a reproduction control unit (not shown) acquires reproduction information recorded on the optical recording medium 8.

In addition, light reflected by the emission end face of the solid immersion lens 7b is transmitted through the objective lens optical system 7 and the quarter wavelength plate 6 and is reflected by the second beam splitter 5. The light reflected by the second beam splitter 5 is transmitted through the first detection lens 12 and the glass plate 13 and is focused on the first optical detector 14. At this point, the glass plate insertion section 15 inserts or removes the glass plate 13 according to a position of a recording layer on which light is focused among the plurality of recording layers. Moreover, when the glass plate 13 has not been inserted, the light reflected by the second beam splitter 5 is transmitted through the first detection lens 12 and is focused on the first optical detector 14.

Figure 3:
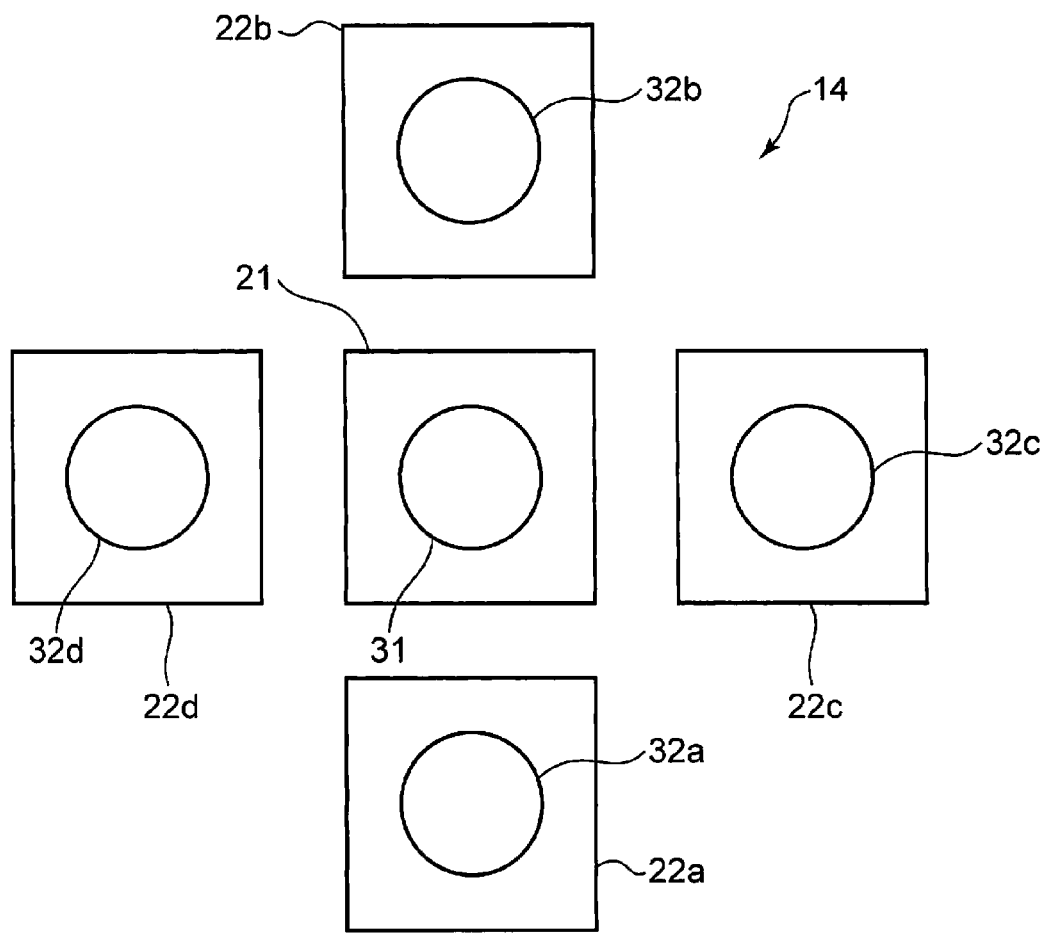
FIG. 3 is a diagram showing a configuration of a first optical detector shown in FIG. 1.

FIG. 3 is a diagram showing a configuration of the first optical detector shown in FIG. 1. As shown in FIG. 3, the first optical detector 14 has five light receiving sections (a first light receiving section 21, a second light receiving section 22a, a third light receiving section 22b, a fourth light receiving section 22c, and a fifth light receiving section 22d). Since a detailed description of the first optical detector 14 is provided in Patent Literature 2, a detailed description thereof will be omitted herein.

The first light receiving section 21 receives a reflected light (a main beam) 31 from the emission end face of the solid immersion lens 7b, the second light receiving section 22a receives a reflected light (a first sub-beam) 32a from the emission end face of the solid immersion lens 7b, the third light receiving section 22b receives a reflected light (a second sub-beam) 32b from the emission end face of the solid immersion lens 7b, the fourth light receiving section 22c receives a reflected light (a third sub-beam) 32c from the emission end face of the solid immersion lens 7b, and the fifth light receiving section 22c receives a reflected light (a fourth sub-beam) 32d from the emission end face of the solid immersion lens 7b.

Using a signal from the first light receiving section 21, a spacing (a gap signal) of an air gap is detected which exists between the emission end face of the solid immersion lens 7b and the surface of the optical recording medium 8, the surface opposing the emission end face. In addition, based on a difference signal between the fourth light receiving section 22c and the fifth light receiving section 22d, a relative inclination (a radial tilt signal) with respect to a radial direction of the optical recording medium 8 is detected between the emission end face of the solid immersion lens 7b and the surface of the optical recording medium 8, the surface opposing the emission end face. Furthermore, based on a difference signal between the second light receiving section 22a and the third light receiving section 22b, a relative inclination (a tangential tilt signal) with respect to a tangential direction of the optical recording medium 8 is detected between the emission end face of the solid immersion lens 7b and the surface of the optical recording medium 8, the surface opposing the emission end face.

Based on the gap signal from the first optical detector 14, a gap control unit (not shown) controls the objective lens optical system 7 so as to keep a constant spacing between the emission end face of the solid immersion lens 7b and the surface of the optical recording medium 8, the surface opposing the emission end face. In addition, based on the radial tilt signal and the tangential tilt signal from the first optical detector 14, a tilt control unit (not shown) controls the objective lens optical system 7 so that a relative angle becomes zero between the emission end face of the solid immersion lens 7b and the surface of the optical recording medium 8, the surface opposing the emission end face.

Furthermore, light quantity control of the light source 1 is performed by focusing 10% light reflected by the second beam splitter 5 on an optical detector (not shown) using a lens (not shown). In other words, based on a signal outputted from an optical detector (not shown), a light quantity control unit (not shown) monitors a quantity of emission light from the light source 1 and controls the light source 1 so that the quantity of light outputted from the light source 1 becomes constant.

Light outputted from the light source 1 and reflected by the optical recording medium 8 will now be described in greater detail. The light outputted from the light source 1 is focused on a predetermined recording layer of the optical recording medium 8 and reflected by a predetermined recording layer of the optical recording medium 8. The light reflected by the predetermined recording layer of the optical recording medium 8 is converted by the quarter wavelength plate 6 into a linearly-polarized light that is perpendicular to the light outputted from the light source 1. The linearly-polarized light converted by the quarter wavelength plate 6 is 100%-transmitted through the second beam splitter 5, 100%-reflected by the first beam splitter 3, and received by the second optical detector 11.

In addition, since the spacing between the emission end face of the solid immersion lens 7b and the surface of the optical recording medium 8 is not zero, a part of the light outputted from the light source 1 is reflected by the emission end face of the solid immersion lens 7b.

The light reflected by the emission end face of the solid immersion lens 7b is converted by the quarter wavelength plate 6 into a linearly-polarized light in a same direction of polarization as the light outputted from the light source 1. 90% of the linearly-polarized light converted by the quarter wavelength plate 6 is transmitted through the second beam splitter 5 and 10% of the linearly-polarized light is reflected by the second beam splitter 5. Transmitted light of the second beam splitter 5 is 100%-transmitted through the first beam splitter 3 and is therefore not incident to the second optical detector 11. In addition, the light reflected by the second beam splitter 5 is incident to the first optical detector 14.

Figure 4:
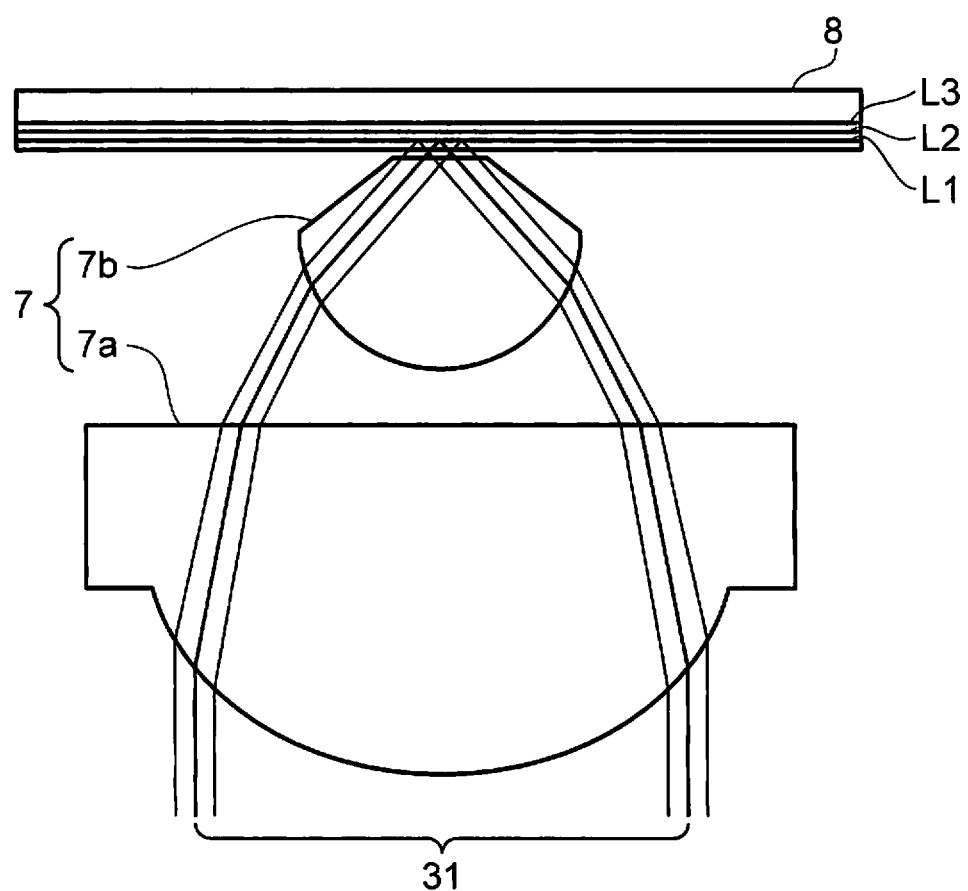
FIG. 4 is a schematic view showing a relationship between an objective lens optical system and respective recording layers of an optical recording medium.

Next, light separated by the diffractive grating 9 will be described. FIG. 4 is a schematic view showing a relationship between the objective lens optical system 7 and respective recording layers of the optical recording medium 8. A distance between a tip of the solid immersion lens 7b and the optical recording medium 8 is set to a distance over which light is efficiently propagated in the form of evanescent light. The distance between the tip of the solid immersion lens 7b and the optical recording medium 8 is kept at, for example, 25 nm. The optical recording medium 8 has three recording layers which will be referred to in a descending order of proximity to a beam incidence surface as a first recording layer L1, a second recording layer L2, and a third recording layer L3. A distance from the surface to the first recording layer L1 is denoted by t1, a distance between the first recording layer L1 and the second recording layer L2 is denoted by t2, and a distance between the second recording layer L2 and the third recording layer L3 is denoted by t3. In addition, the distance from the surface to the first recording layer L1 is denoted by d1, a distance from the surface to the second recording layer L2 is denoted by d2, and a distance from the surface to the third recording layer L3 is denoted by d3. Furthermore, among the light diffracted by the diffractive grating 9, the zero-order diffracted light is assumed to be the main beam 31 and ±first-order diffracted lights are assumed to be sub-beams.

A tip of the solid immersion lens 7b has a flat section (an end face) with a diameter D. The flat section of the solid immersion lens 7b has a coned peripheral shape. The main beam and the sub-beams pass through the flat section of the solid immersion lens 7b.

FIGS. 5A to 7B are diagrams showing a relationship between spot shapes of the main beam 31 and the first to fourth sub-beams 32a to 32d on the end face of the solid immersion lens 7b and recording layers reached by the main beam.

Figure 5A:
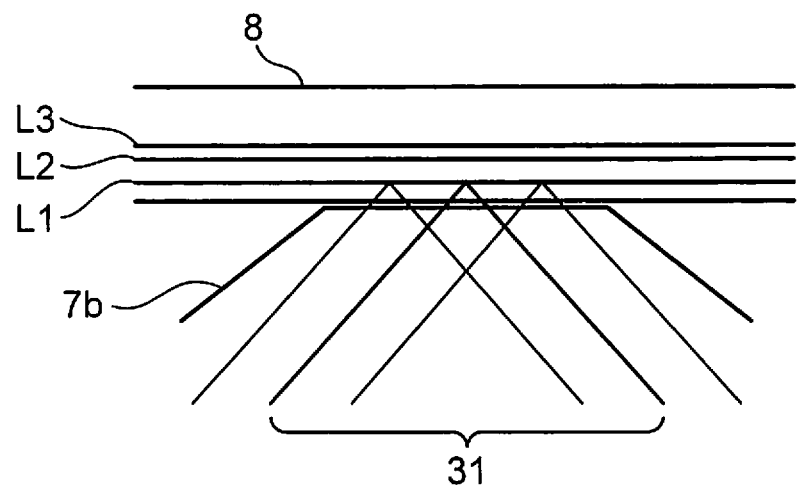
FIG. 5A is a diagram showing a main beam converging on a first recording layer of an optical recording medium.
Figure 5B:
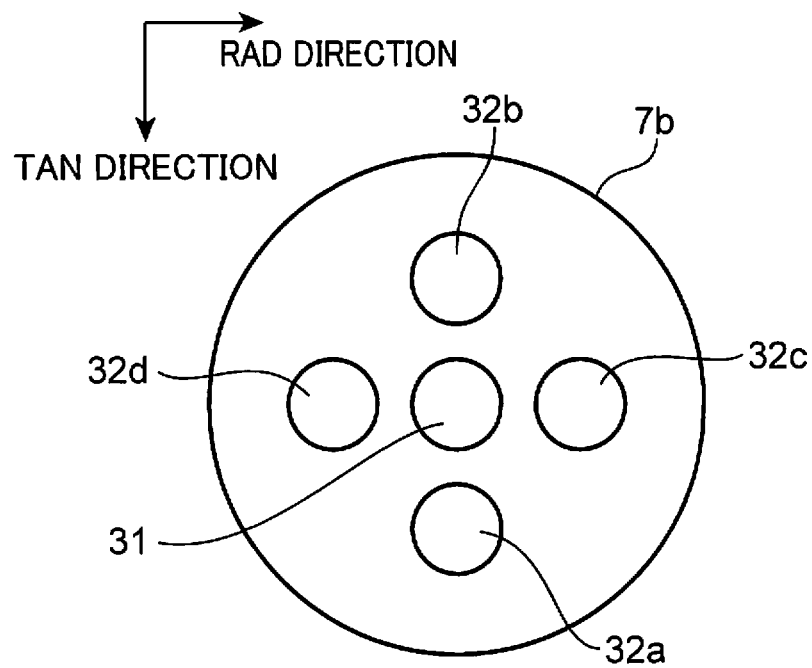
FIG. 5B is a diagram showing spot shapes of the main beam and first to fourth sub-beams on an end face of a solid immersion lens when the main beam is irradiated onto the first recording layer.

FIG. 5A is a diagram showing the main beam 31 converging on the first recording layer L1 of the optical recording medium 8, and FIG. 5B is a diagram showing spot shapes of the main beam 31 and the first to fourth sub-beams 32a to 32d on the end face of the solid immersion lens 7b when the main beam 31 is irradiated onto the first recording layer L1.

The main beam 31 is arranged at center of the end face of the solid immersion lens 7b, and the first to fourth sub-beams 32a to 32d are arranged around the main beam 31. The first sub-beam 32a and the second sub-beam 32b are arranged on opposite sides of the main beam 31 in a tangential direction of the optical recording medium 8. The third sub-beam 32c and the fourth sub-beam 32d are arranged on opposite sides of the main beam 31 in a radial direction of the optical recording medium 8.

For example, if the main beam 31 is assumed to be a first beam and the first sub-beam 32a is assumed to be a second beam, then a center of the second beam on the end face of the solid immersion lens 7b is at a position offset in the tangential direction of the optical recording medium 8 from a center of the first beam on the end face of the solid immersion lens 7b. In addition, for example, if the main beam 31 is assumed to be a first beam and the third sub-beam 32c is assumed to be a second beam, then a center of the second beam on the end face of the solid immersion lens 7b is at a position offset in the radial direction of the optical recording medium 8 from a center of the first beam on the end face of the solid immersion lens 7b.

For example, if the first to fourth sub-beams 32a to 32d are assumed to be first to fourth beams, then a center of the first beam, a center of the second beam, a center of the third beam, and a center of the fourth beam are at positions that differ from each other on the end face of the solid immersion lens 7b. In addition, on the end face of the solid immersion lens 7b, a straight line connecting the center of the first beam and the center of the second beam is perpendicular to a straight line connecting the center of the third beam and the center of the fourth beam.

The diffractive grating 9 generates the main beam 31 and the first to fourth sub-beams 32a to 32d. The objective lens optical system 7 converges the main beam 31 and the first to fourth sub-beams 32a to 32d on the optical recording medium 8. The second beam splitter 5 reflects the main beam 31 and the first to fourth sub-beams 32a to 32d reflected by the end face of the solid immersion lens 7b.

The convergence position modifying unit 16 converges the main beam 31 and the first to fourth sub-beams 32a to 32d reflected by the second beam splitter 5 on the first optical detector 14, and modifies convergence states of the main beam 31 and the first to fourth sub-beams 32a to 32d.

The first optical detector 14 detects the main beam 31 and the first to fourth sub-beams 32a to 32d converged by the convergence position modifying unit 16. At this point, a center of the first sub-beam 32a, a center of the second sub-beam 32b, a center of the third sub-beam 32c, and a center of the fourth sub-beam 32d are at positions that differ from each other on the end face of the solid immersion lens 7b.

On the end face of the solid immersion lens 7b, a straight line connecting the center of the first sub-beam 32a and the center of the second sub-beam 32b is perpendicular to a straight line connecting the center of the third sub-beam 32c and the center of the fourth sub-beam 32d.

The first recording layer L1 is arranged at the forefront. Therefore, beam diameters at the end face of the solid immersion lens 7b are small and the main beam 31 and the first to fourth sub-beams 32a to 32d do not overlap each other. When the end face of the solid immersion lens 7b and the surface of the optical recording medium 8 are inclined relative to each other, the spacing between the end face of the solid immersion lens 7b and the surface of the optical recording medium 8 differs at sub-beam positions. The narrower the spacing between the end face of the solid immersion lens 7b and the surface of the optical recording medium 8, the lower the reflectance at the end face of the solid immersion lens 7b. Moreover, if the spacing is zero, the reflectance at the end face of the solid immersion lens 7b is solely determined by a difference in refractive indexes. In addition, since the wider the spacing, the closer the incident light to total reflection, the reflectance at the end face of the solid immersion lens 7b approaches one and increases. Therefore, a difference in the spacing between the end face of the solid immersion lens 7b and the surface of the optical recording medium 8 is expressed as a difference in light quantity of a reflected light of a sub-beam. Accordingly, a relative inclination angle between the solid immersion lens 7b and the optical recording medium 8 can be detected based on the spacing of the sub-beams and a difference in light quantities of the reflected light.

Figure 6A:
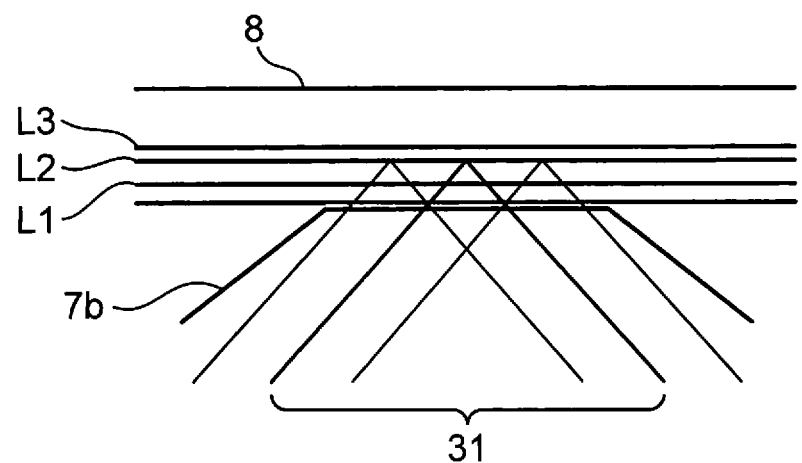
FIG. 6A is a diagram showing a main beam converging on a second recording layer of an optical recording medium.
Figure 6B:
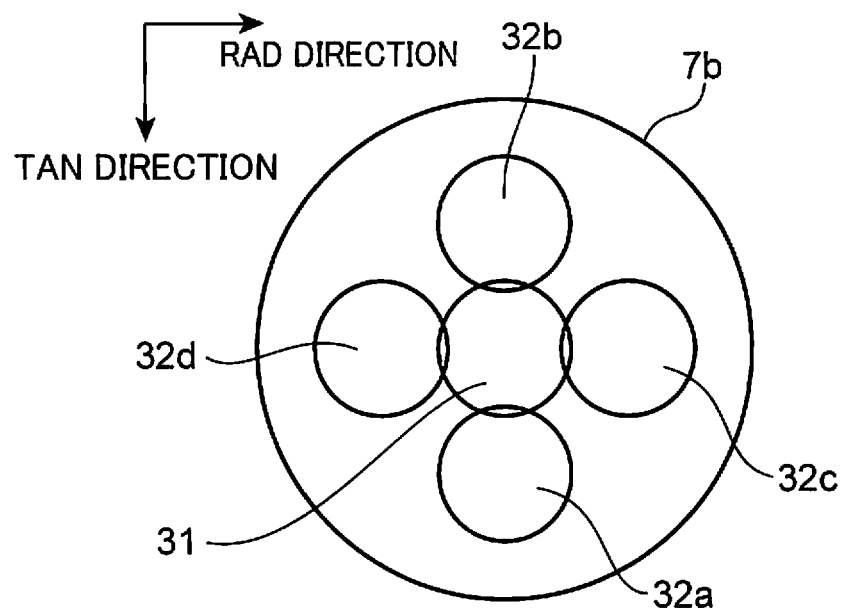
FIG. 6B is a diagram showing spot shapes of the main beam and first to fourth sub-beams on an end face of a solid immersion lens when the main beam is irradiated onto the second recording layer.

FIG. 6A is a diagram showing the main beam 31 converging on the second recording layer L2 of the optical recording medium 8, and FIG. 6B is a diagram showing spot shapes of the main beam 31 and the first to fourth sub-beams 32a to 32d on the end face of the solid immersion lens 7b when the main beam 31 is irradiated onto the second recording layer L2. The second recording layer L2 is intermediately positioned among the plurality of recording layers. The main beam 31 and a part of the first to fourth sub-beams 32a to 32d overlap each other on the end face of the solid immersion lens 7b.

Figure 7A:
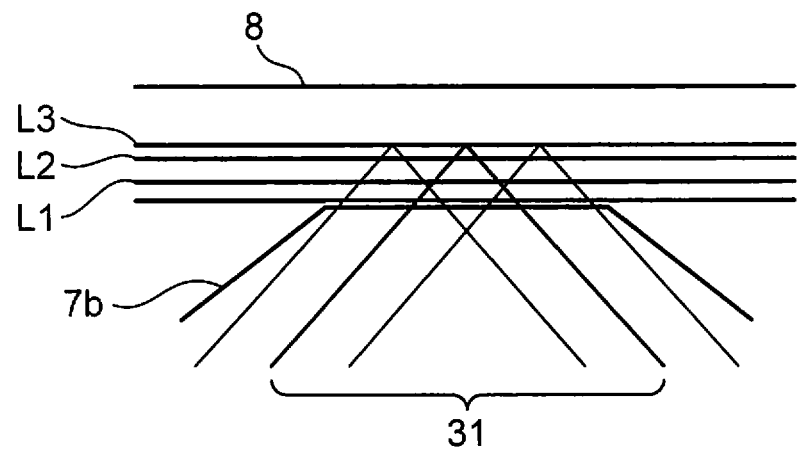
FIG. 7A is a diagram showing a main beam converging on a third recording layer of an optical recording medium.
Figure 7B:
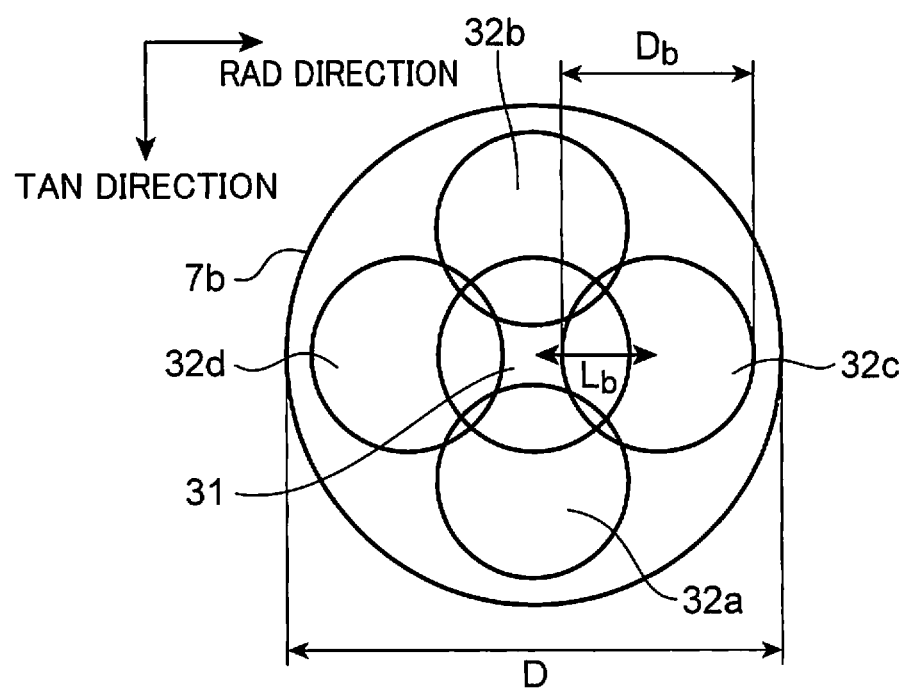
FIG. 7B is a diagram showing spot shapes of the main beam and first to fourth sub-beams on an end face of a solid immersion lens when the main beam is irradiated onto the third recording layer.

FIG. 7A is a diagram showing the main beam 31 converging on the third recording layer L3 of the optical recording medium 8, and FIG. 7B is a diagram showing spot shapes of the main beam 31 and the first to fourth sub-beams 32a to 32d on the end face of the solid immersion lens 7b when the main beam 31 is irradiated onto the third recording layer L3. The third recording layer L3 is arranged innermost. The main beam 31 and the first to fourth sub-beams 32a to 32d overlap each other on the end face of the solid immersion lens 7b at a greater overlap ratio than that shown in FIG. 6B.

The diameter D of the end face of the solid immersion lens 7b is configured so that sub-beams do not fail to be incident on the end face of the solid immersion lens 7b even when the main beam is focused on the innermost third recording layer L3. A spacing $L_b$ between a center of a sub-beam and a center of the main beam on the end face of the solid immersion lens 7b, a beam diameter $D_b$ on the end face of the solid immersion lens 7b when the main beam and the sub-beam are converged on the innermost layer of the optical recording medium 8, and the diameter D of the end face of the solid immersion lens 7b favorably satisfies a relationship expressed by Expression (2) below.

$$D > 2 \times L_b + D_b \quad (2)$$

With the configurations shown in FIGS. 5A to 7B, since two sub-beams are positioned on both sides of a main beam, the relationship expressed by Expression (2) is satisfied. With a configuration in which one sub-beam is positioned on one side of the main beam, the spacing $L_b$, the beam diameter $D_b$, and the diameter D may satisfy a relationship expressed by Expression (3) below.

$$D > L_b + D_b \quad (3)$$

In the example of the present first embodiment, the optical recording medium 8 is an optical recording medium having three recording layers. If a distance from the surface to the third recording layer L3 is denoted by d3, a numerical aperture of the objective lens optical system 7 in the optical recording medium 8 is denoted by NA, and a refractive index of the optical recording medium 8 is denoted by $n_{disk}$, then the beam diameter $D_b$ is expressed by Expression (4) below.

$$D_b = 2 \times d3 \times \tan(\sin^{-1}(NA/n_{disk})) \quad (4)$$

Figure 8A:
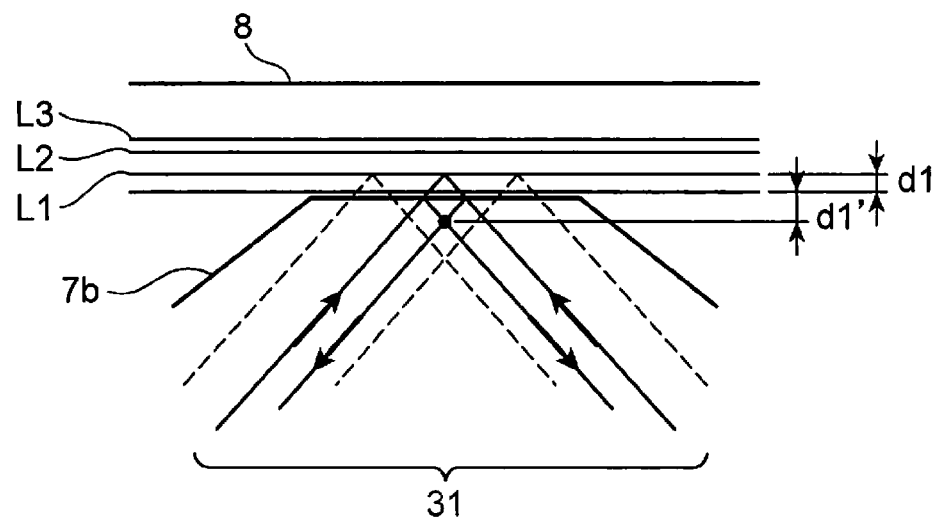
FIG. 8A is a diagram showing a main beam converging on a first recording layer of an optical recording medium.
Figure 8B:
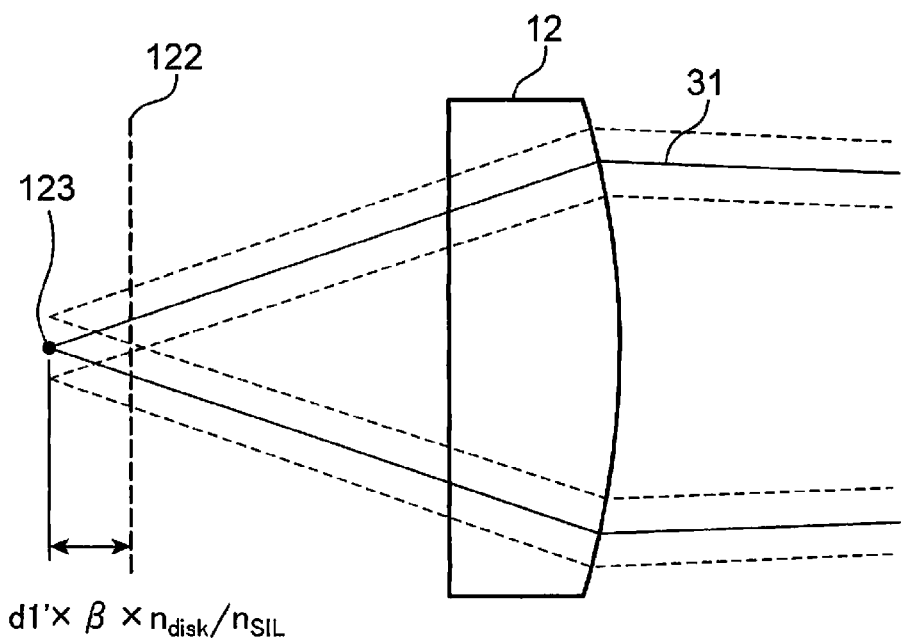
FIG. 8B is a diagram showing the main beam focused by a first detection lens when the main beam is converged on the first recording layer.

Next, an arrangement of a detection system the an optical pickup will be described. FIG. 8A is a diagram showing the main beam 31 converging on the first recording layer L1 of the optical recording medium 8, and FIG. 8B is a diagram showing the main beam 31 being focused by the first detection lens 12 when the main beam 31 is converged on the first recording layer L1.

The main beam 31 reflected by the end face of the solid immersion lens 7b first converges at a position separated from the surface of the optical recording medium 8 by a distance of d1', becomes a divergent light at the position, and is guided to the first detection lens 12. The distance d1' is expressed by Expression (5) below.

$$d1' = d1 \times n_{SIL}/n_{disk} \quad (5)$$

In Expression (5), d1' denotes a distance from the surface of the optical recording medium 8 to a convergence point of the main beam 31 reflected by the end face of the solid immersion lens 7b when the main beam 31 is converging on the first recording layer L1, d1 denotes a distance from the surface of the optical recording medium 8 to the first recording layer L1, $n_{disk}$ denotes the refractive index of the optical recording medium 8, and $n_{SIL}$ denotes a refractive index of the solid immersion lens 7b.

Therefore, light proceeding toward the first optical detector 14 from the optical recording medium 8 propagates with a virtual luminous point closer to the light source 1 than light proceeding toward the optical recording medium 8 from the light source 1. As a result, as shown in FIG. 8B, a point 123 at which the main beam 31 is converged by the first detection lens 12 is further than a focal position 122 when a parallel light is inputted to the first detection lens 12. A distance between the focal position 122 and the point 123 is a distance obtained by multiplying an atmospheric corresponding value of the distance d1' by a longitudinal magnification β of the detection system. In other words, the distance between the focal position 122 and the point 123 is expressed as d1'×β× $n_{disk}/n_{SIL}$. Moreover, the longitudinal magnification β of the detection system can be defined as $\beta = (NA_{disk}/NA_{det})^2$, where $NA_{disk}$ denotes a numerical aperture on the side of the optical recording medium and $NA_{det}$ denotes a numerical aperture on the detecting side.

Figure 9A:
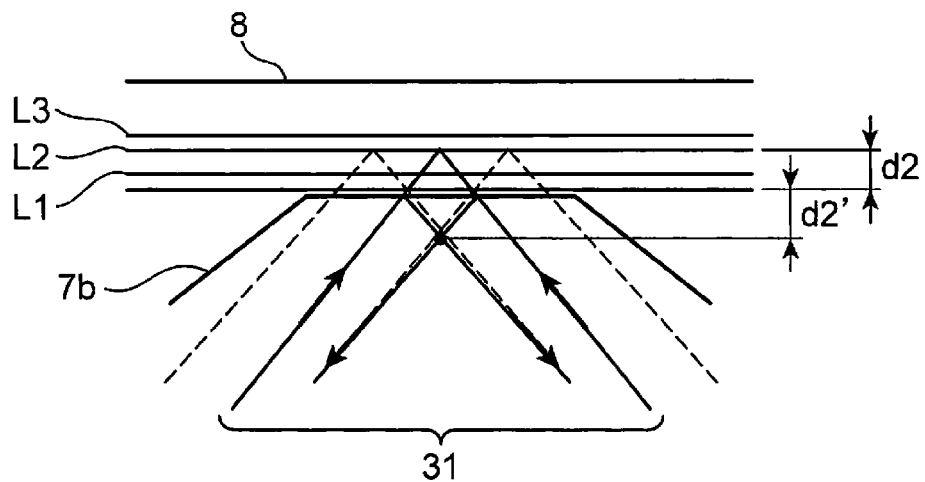
FIG. 9A is a diagram showing a main beam converging on a second recording layer of an optical recording medium.
Figure 9B:
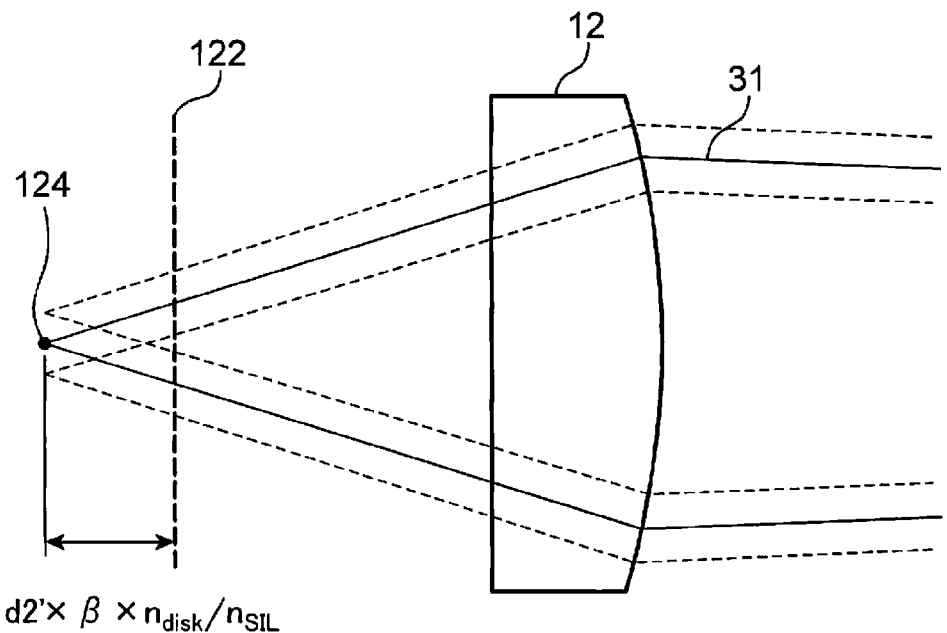
FIG. 9B is a diagram showing the main beam focused by a first detection lens when the main beam is converged on the second recording layer.

Furthermore, FIG. 9A is a diagram showing the main beam 31 converging on the second recording layer L2 of the optical recording medium 8, and FIG. 9B is a diagram showing the main beam 31 being focused by the first detection lens 12 when the main beam 31 is converged on the second recording layer L2.

The main beam 31 reflected by the end face of the solid immersion lens 7b first converges at a position separated from the surface of the optical recording medium 8 by a distance of d2', becomes a divergent light at the position, and is guided to the first detection lens 12. The distance d2' is expressed by Expression (6) below.

$$d2' = d2 \times n_{SIL}/n_{disk} \quad (6)$$

In Expression (6), d2' denotes a distance from the surface of the optical recording medium 8 to a convergence point of the main beam 31 reflected by the end face of the solid immersion lens 7b when the main beam 31 is converging on the second recording layer L2, d2 denotes a distance from the surface of the optical recording medium 8 to the second recording layer L2, $n_{disk}$ denotes the refractive index of the optical recording medium 8, and $n_{SIL}$ denotes the refractive index of the solid immersion lens 7b.

Therefore, in the same manner as described above, light proceeding toward the first optical detector 14 from the optical recording medium 8 propagates with a virtual luminous point closer to the light source 1 than light proceeding toward the optical recording medium 8 from the light source 1. As a result, as shown in FIG. 9B, a point 124 at which the main beam 31 is converged by the first detection lens 12 is further than the focal position 122 when a parallel light is inputted to the first detection lens 12. A distance between the focal position 122 and the point 124 is a distance obtained by multiplying an atmospheric corresponding value of the distance d2' by the longitudinal magnification β of the detection system. In other words, the distance between the focal position 122 and the point 124 is expressed as $d2' \times \beta \times n_{disk}/n_{SIL}$. Therefore, the point 124 at which the main beam 31 is converged by the first detection lens 12 is further than the point 123 shown in FIG. 8B.

Figure 10A:
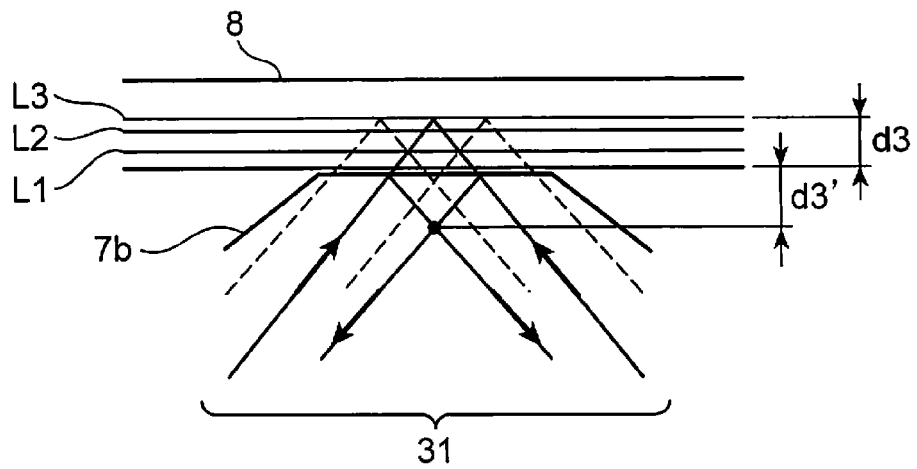
FIG. 10A is a diagram showing a main beam converging on a third recording layer of an optical recording medium.
Figure 10B:
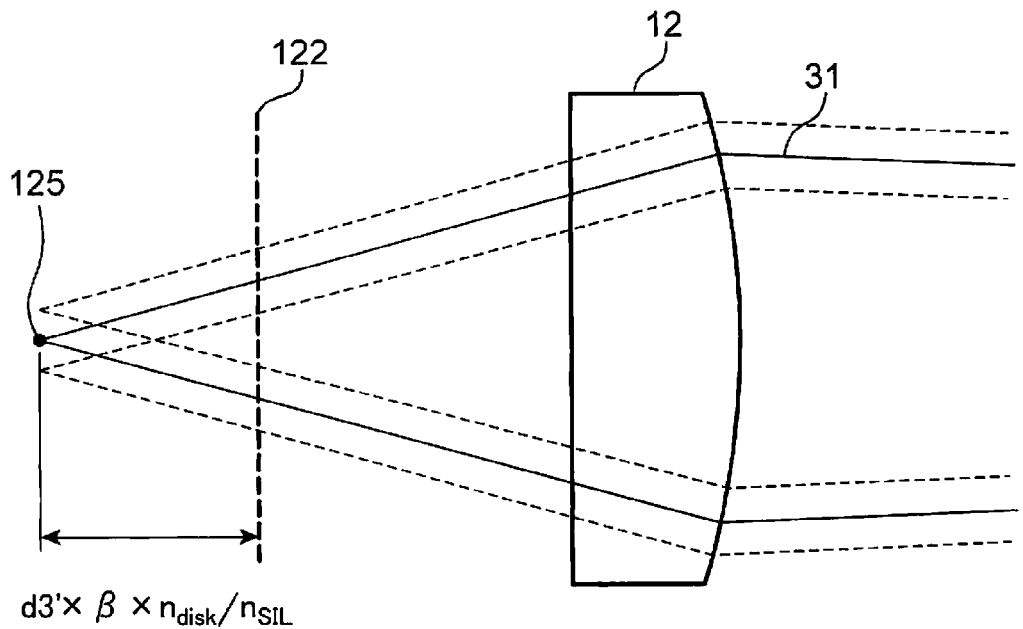
FIG. 10B is a diagram showing the main beam focused by a first detection lens when the main beam is converged on the third recording layer.

Furthermore, FIG. 10A is a diagram showing the main beam 31 converging on the third recording layer L3 of the optical recording medium 8, and FIG. 10B is a diagram showing the main beam 31 being focused by the first detection lens 12 when the main beam 31 is converged on the third recording layer L3.

The main beam 31 reflected by the end face of the solid immersion lens 7b first converges at a position separated from the surface of the optical recording medium 8 by a distance of d3', becomes a divergent light at the position, and is guided to the first detection lens 12. The distance d3' is expressed by Expression (7) below.

$$d3' = d3 \times n_{SIL}/n_{disk} \quad (7)$$

Therefore, in the same manner as described above, light proceeding toward the first optical detector 14 from the optical recording medium 8 propagates with a virtual luminous point closer to the light source 1 than light proceeding toward the optical recording medium 8 from the light source 1. As a result, as shown in FIG. 10B, a point 125 at which the main beam 31 is converged by the first detection lens 12 is further than the focal position 122 when a parallel light is inputted to the first detection lens 12. A distance between the focal position 122 and the point 125 is a distance obtained by multiplying an atmospheric corresponding value of the distance d3' by the longitudinal magnification β of the detection system. In other words, the distance between the focal position 122 and the point 125 is expressed as $d3' \times \beta \times n_{disk}/n_{SIL}$. Therefore, the point 125 at which the main beam 31 is converged by the first detection lens 12 is further than the point 123 shown in FIG. 8B and also further than the point 124 shown in FIG. 9B.

Figure 11:
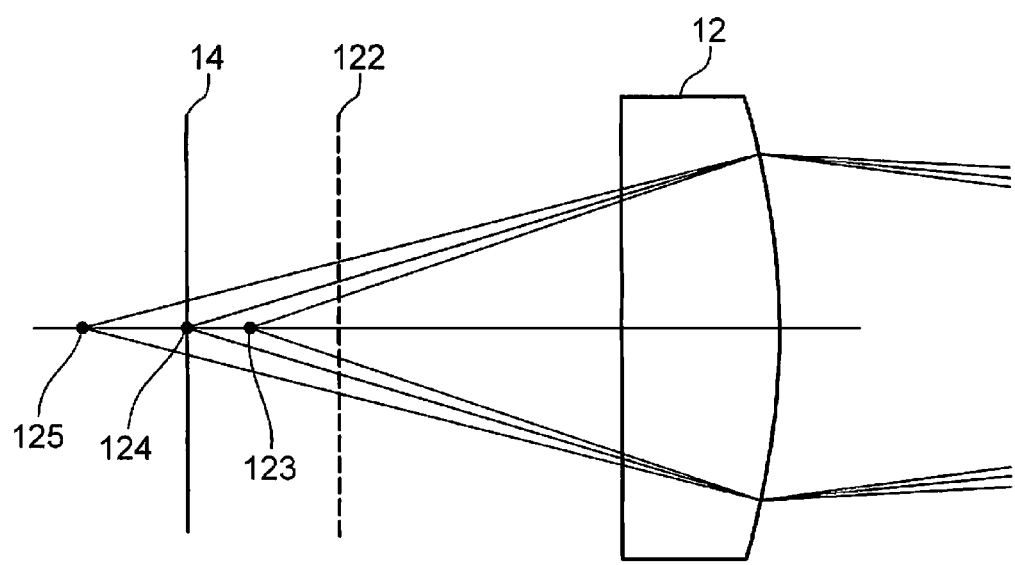
FIG. 11 is a diagram showing a reflected light from an end face of a solid immersion lens when a main beam is focused on each recording layer in the optical pickup shown in FIG. 1.

FIG. 11 is a diagram showing a reflected light from the end face of the solid immersion lens 7b when the main beam 31 is focused on each recording layer in the optical pickup shown in FIG. 1. The reflected light from the end face of the solid immersion lens 7b when focused on the first recording layer L1, the second recording layer L2, and the third recording layer L3 respectively converge at the point 123, the point 124, and the point 125. In addition, a light receiving section of the first optical detector 14 is arranged so as to coincide with the point 124. A relationship between arrangements of the respective light receiving sections 21 and 22a to 22d of the first optical detector 14 and spots of the main beam 31 and the first to fourth sub-beams 32a to 32d in this state is shown in FIGS. 12A to 12C.

Figure 12A:
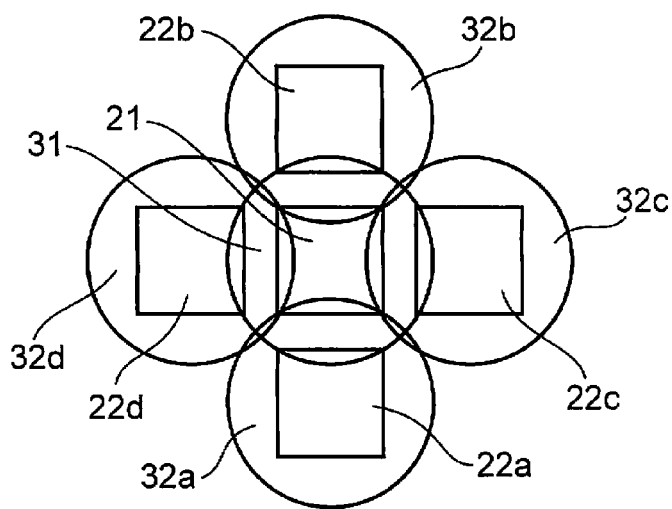
FIG. 12A is a diagram showing respective light receiving sections of a first optical detector, a spot of a main beam, and spots of first to fourth sub-beams when the main beam is focused on a first recording layer.

FIG. 12A is a diagram showing arrangements of the respective light receiving sections 21 and 22a to 22d of the first optical detector 14, a spot of the main beam 31, and spots of the first to fourth sub-beams 32a to 32d when the main beam 31 is being focused on the first recording layer L1. FIG. 12B is a diagram showing the respective light receiving sections 21 and 22a to 22d of the first optical detector 14, a spot of the main beam 31, and spots of the first to fourth sub-beams 32a to 32d when the main beam 31 is being focused on the second recording layer L2. FIG. 12C is a diagram showing the respective light receiving sections 21 and 22a to 22d of the first optical detector 14, a spot of the main beam 31, and spots of the first to fourth sub-beams 32a to 32d when the main beam 31 is being focused on the third recording layer L3.

The main beam 31 reflected by the end face of the solid immersion lens 7b is received by the central first light receiving section 21 and the first to fourth sub-beams 32a to 32d are respectively received by the second to fifth light receiving sections 22a to 22d. The second to fifth light receiving sections 22a to 22d are arranged so as to form a figure of a cross with the first light receiving section 21 at a center thereof.

Figure 12B:
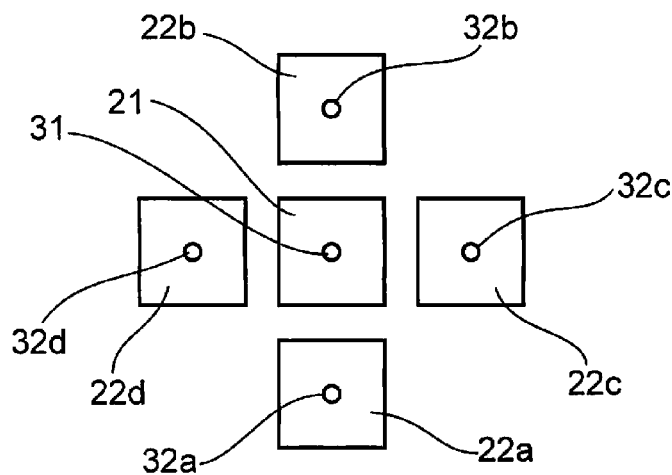
FIG. 12B is a diagram showing respective light receiving sections of the first optical detector, a spot of a main beam, and spots of first to fourth sub-beams when the main beam is focused on a second recording layer.
Figure 12C:
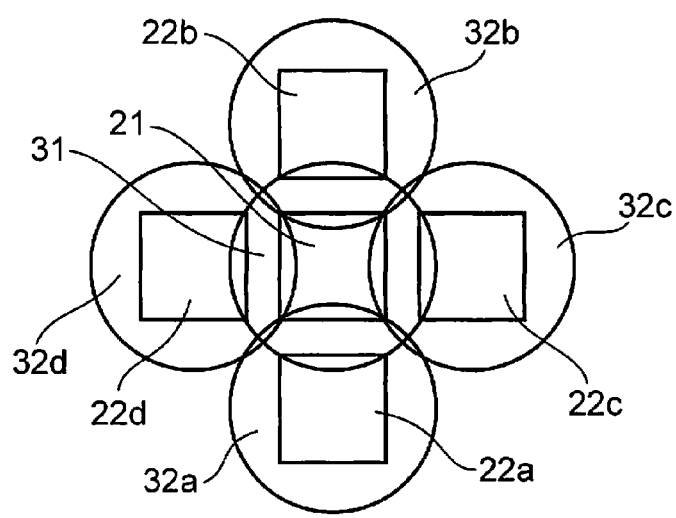
FIG. 12C is a diagram showing respective light receiving sections of the first optical detector, a spot of a main beam, and spots of first to fourth sub-beams when the main beam is focused on a third recording layer.

As shown in FIG. 12B, when the main beam 31 is focused on the second recording layer L2, the spot of the main beam 31 and the spots of the first to fourth sub-beams 32a to 32d reflected by the end face of the solid immersion lens 7b do not stray outside the respective light receiving sections. On the other hand, as shown in FIGS. 12A and 12C, when the main beam 31 is focused on the first recording layer L1 and the third recording layer L3, sizes of the spot of the main beam 31 and the spots of the first to fourth sub-beams 32a to 32d reflected by the end face of the solid immersion lens 7b increase significantly. Therefore, the spot of the main beam 31 and the spots of the first to fourth sub-beams 32a to 32d stray outside the respective light receiving sections 21 and 22a to 22d or edge into other light receiving sections. Consequently, the quality of the gap signal and the tilt signal deteriorate significantly.

In consideration thereof, the respective light receiving sections of the first optical detector 14 are arranged midway between the focus point 124 and the focus point 125 shown in FIGS. 9B and 10B. Due to such an arrangement, when focusing the main beam 31 on the first recording layer L1 and the third recording layer L3, the main beam 31 and the first to fourth sub-beams 32a to 32d reflected by the end face of the solid immersion lens 7b can be adjusted to sizes that do not stray outside the respective light receiving sections.

However, when focusing the main beam 31 on the first recording layer L1 in this state, spot diameters of the main beam 31 and the first to fourth sub-beams 32a to 32d reflected by the end face of the solid immersion lens 7b further increase from the spot diameters shown in FIG. 12A. In consideration thereof, the glass plate 13 is inserted on the optical path to further distance the focus point 123 shown in FIG. 8B. Accordingly, sizes of the spot of the main beam 31 and the spots of the first to fourth sub-beams 32a to 32d reflected by the end face of the solid immersion lens 7b can be prevented from straying outside the respective light receiving sections.

Figure 13:
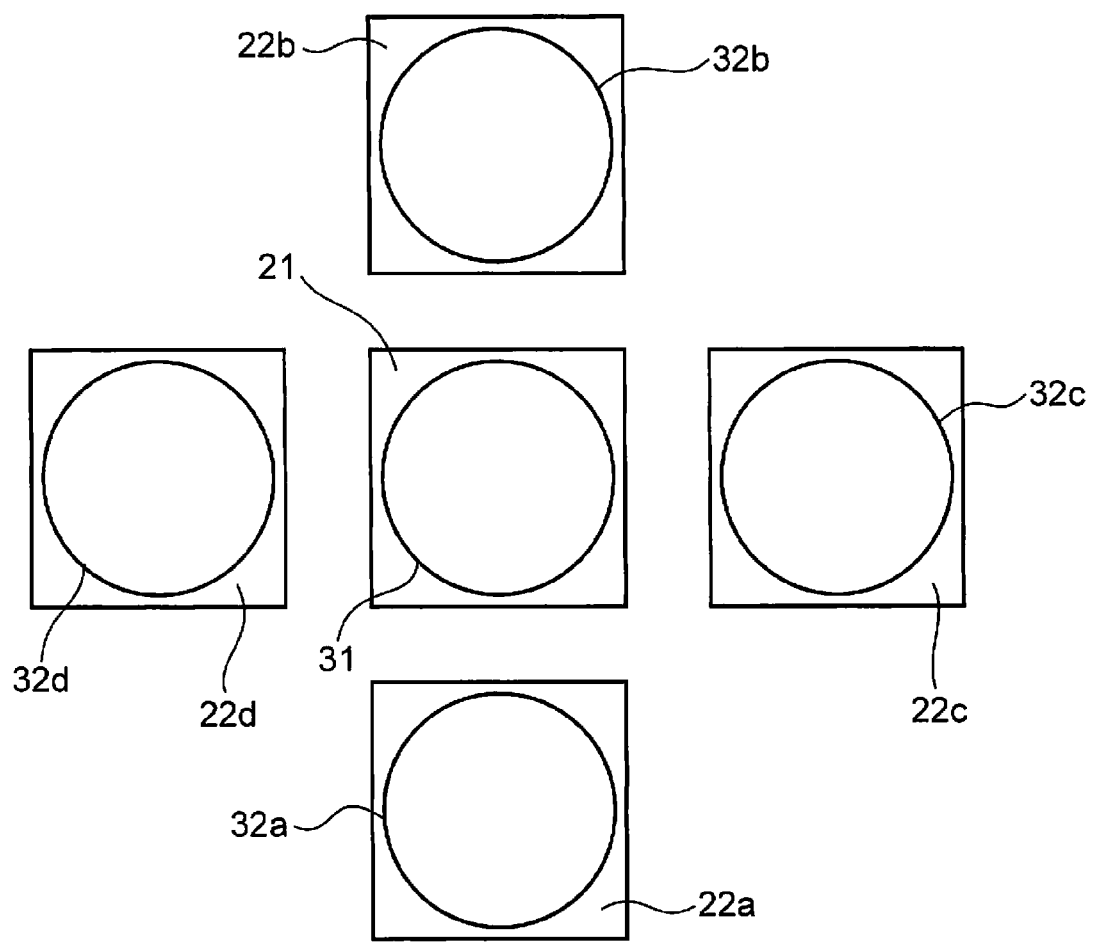
FIG. 13 is a diagram showing respective light receiving sections of a first optical detector, a spot of a main beam, and spots of first to fourth sub-beams when the main beam is focused on first to third recording layers according to the first embodiment of the present invention.

FIG. 13 is a diagram showing respective light receiving sections 21 and 22a to 22d of the first optical detector 14, a spot of the main beam 31, and spots of the first to fourth sub-beams 32a to 32d when the main beam 31 is focused on the first to third recording layers L1 to L3 according to the first embodiment of the present invention.

The respective light receiving sections 21 and 22a to 22d of the first optical detector 14 are arranged midway between the focus point 124 and the focus point 125 shown in FIGS. 9B and 10B. Therefore, as shown in FIG. 13, when focusing the main beam 31 on the second recording layer L2 and the third recording layer L3, the main beam 31 and the first to fourth sub-beams 32a to 32d reflected by the end face of the solid immersion lens 7b are all focused inside the respective light receiving sections 21 and 22a to 22d of the first optical detector 14.

In addition, when focusing the main beam 31 on the first recording layer L1, the glass plate 13 is inserted onto the optical path between the first detection lens 12 and the first optical detector 14. Therefore, as shown in FIG. 13, even when focusing the main beam 31 on the first recording layer L1, the main beam 31 and the first to fourth sub-beams 32a to 32d reflected by the end face of the solid immersion lens 7b are all focused inside the respective light receiving sections 21 and 22a to 22d of the first optical detector 14. Alternatively, when focusing the main beam 31 on the second recording layer L2 and the third recording layer L3, the glass plate 13 is not inserted onto the optical path between the first detection lens 12 and the first optical detector 14.

Consequently, since the main beam 31 and the first to fourth sub-beams 32a to 32d reflected by the end face of the solid immersion lens 7b do not stray outside the light receiving sections with respect to all recording layers, the gap signal and the tilt signal can be reliably and accurately detected.

According to the present first embodiment, even with a multilayered optical recording medium having a plurality of recording layers, a relative inclination angle between the surface of the optical recording medium 8 and the emission end face of the solid immersion lens 7b can be reliably and accurately detected and the solid immersion lens 7b can be prevented from colliding with the surface of the optical recording medium 8. As a result, in addition to reliably recording and reproducing information, the risk of damaging the important optical recording medium can be reduced.

Moreover, in the present first embodiment, while the second beam splitter 5 is arranged on the side of the objective lens optical system 7 with respect to the emittance modifying unit 4, arranging the second beam splitter 5 on the side of the light source 1 with respect to the emittance modifying unit 4 is also perfectly acceptable. In addition, while the first beam splitter 3 is arranged on the side of the light source 1 with respect to the emittance modifying unit 4, arranging the first beam splitter 3 on the side of the objective lens optical system 7 with respect to the emittance modifying unit 4 is also perfectly acceptable. Furthermore, either one of the first beam splitter 3 or the second beam splitter 5 may be arranged on the side of the light source 1. In addition, while the diffractive grating 9 is arranged on the side of the light source 1 with respect to the emittance modifying unit 4, arranging the diffractive grating 9 on the side of the objective lens optical system 7 with respect to the emittance modifying unit 4 is also perfectly acceptable.

(Second Embodiment)

Figure 14:
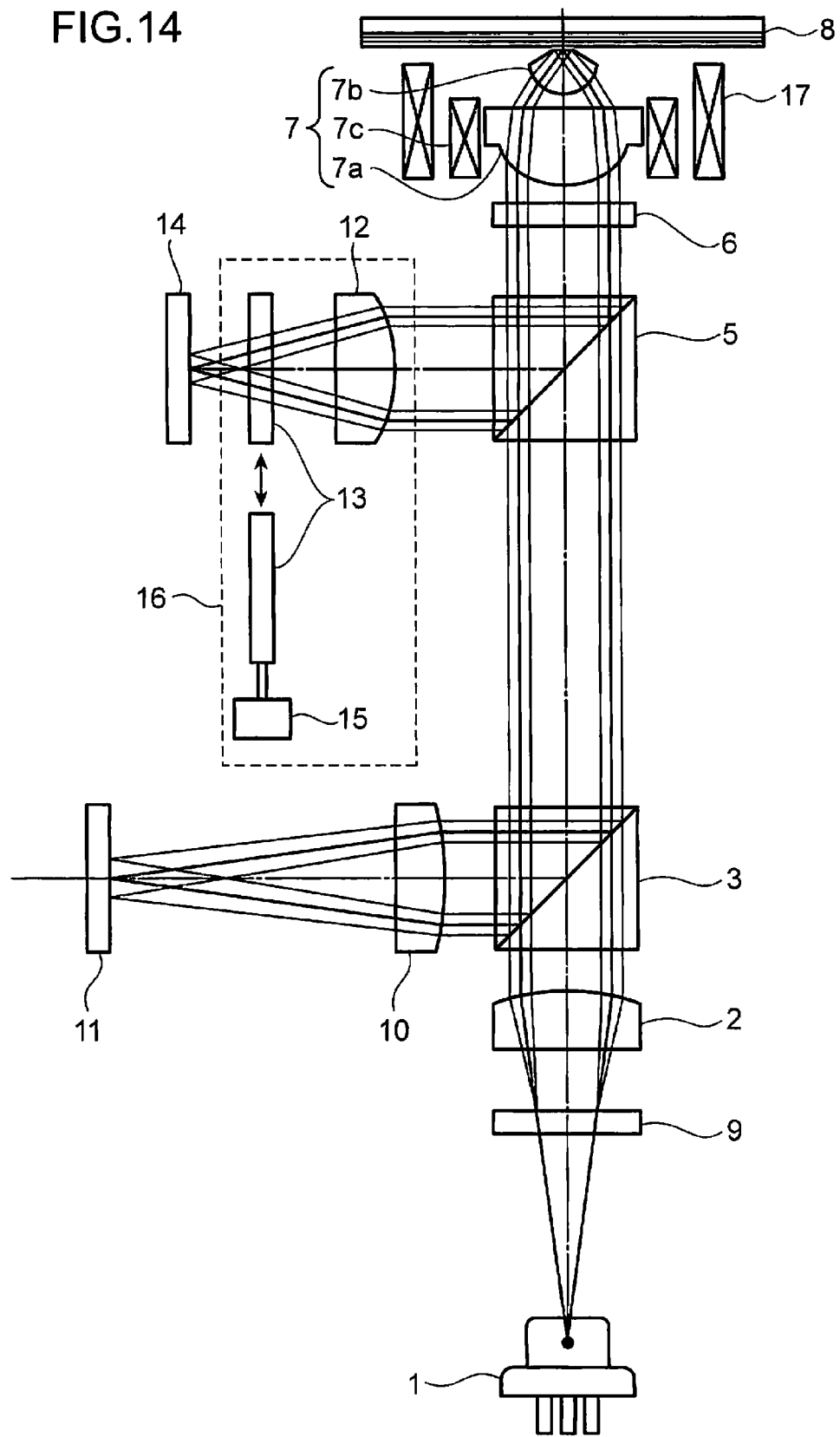
FIG. 14 is a diagram showing a configuration of an optical pickup according to a second embodiment of the present invention.

Next, an optical pickup according to a second embodiment of the present invention will be described with respect to the drawings. FIG. 14 is a diagram showing a configuration of an optical pickup according to the second embodiment of the present invention. The present second embodiment only differs from the first embodiment described above in that the emittance modifying unit 4 is not provided and that an actuator 7c for moving the diaphragm lens 7a in an optical axis direction is provided. Otherwise, the present second embodiment is the same as the first embodiment. Therefore, in the present second embodiment, it is assumed that components not particularly described are the same as those in the first embodiment and, unless specifically described, it is assumed that components denoted by same reference characters as used in the first embodiment have similar functions as their counterparts in the first embodiment.

The actuator 7c varies a distance between the diaphragm lens 7a and a solid immersion lens 7b in the optical axis direction. The actuator 7c is an example of an interlens distance modifying unit Operations of the optical pickup configured in this manner will now be described. The light source 1 outputs a linearly-polarized light. The light outputted from the light source 1 is separated into five beams by the diffractive grating 9. The five beams consist of one main beam and four sub-beams. The five beams are converted into an approximately parallel light by the collimator lens 2 and are transmitted through the first beam splitter 3. The light transmitted through the first beam splitter 3 is transmitted through the second beam splitter 5 and is incident to the quarter wavelength plate 6.

The quarter wavelength plate 6 converts the incident linearly-polarized light into a circularly-polarized light. Light transmitted through the quarter wavelength plate 6 is focused by the objective lens optical system 7 on a predetermined recording layer of the optical recording medium 8. Light reflected by the optical recording medium 8 is transmitted through the objective lens optical system 7, the quarter wavelength plate 6, and the second beam splitter 5 and is incident to the first beam splitter 3. Light reflected by the first beam splitter 3 is incident to the second detection lens 10. The light incident to the second detection lens 10 is imparted with an astigmatism. Light transmitted through the second detection lens 10 is focused on the second optical detector 11.

The second optical detector 11 outputs a focus error signal indicating an in-focus state of light on the optical recording medium 8. In addition, the second optical detector 11 outputs a tracking error signal indicating an irradiation position of light on the optical recording medium 8.

In this case, the focus error signal and the tracking error signal are detected by a known technique such as an astigmatic method and a push-pull method. In addition, based on the focus error signal from the second optical detector 11, a focus control unit (not shown) drives the actuator 7c to control a position of the diaphragm lens 7a in an optical axis direction thereof so that light is always focused on the optical recording medium 8 in an in-focus state. In other words, the actuator 7c moves the diaphragm lens 7a in the optical axis direction according to a control signal from the focus control unit.

Furthermore, based on the tracking error signal from the second optical detector 11, a tracking control unit (not shown) controls a position of the objective lens optical system 7 so that light is focused on a desired track on the optical recording medium 8. In other words, the objective lens actuator 17 moves the objective lens optical system 7 according to a control signal from the tracking control unit. Moreover, a reproduction control unit (not shown) acquires reproduction information recorded on the optical recording medium 8 from the second optical detector 11.

In addition, light reflected by the emission end face of the solid immersion lens 7b is transmitted through the objective lens optical system 7 and the quarter wavelength plate 6 and is reflected by the second beam splitter 5. The light reflected by the second beam splitter 5 is transmitted through the first detection lens 12 and the glass plate 13 and is focused on the first optical detector 14. At this point, the glass plate insertion section 15 inserts or removes the glass plate 13 according to a position of a recording layer on which light is focused among the plurality of recording layers. Moreover, when the glass plate 13 has not been inserted, the light reflected by the second beam splitter 5 is transmitted through the first detection lens 12 and is focused on the first optical detector 14.

The first optical detector 14 has the five light receiving sections (the first light receiving section 21, the second light receiving section 22a, the third light receiving section 22b, the fourth light receiving section 22c, and the fifth light receiving section 22d) shown in FIG. 3. Since a detailed description of the first optical detector 14 is provided in Patent Literature 2, a detailed description thereof will be omitted herein.

Using a signal from the first light receiving section 21, a spacing (a gap signal) of an air gap is detected which exists between the emission end face of the solid immersion lens 7b and the surface of the optical recording medium 8, the surface opposing the emission end face. In addition, based on a difference signal between the fourth light receiving section 22c and the fifth light receiving section 22d, a relative inclination (a radial tilt signal) with respect to a radial direction of the optical recording medium 8 is detected between the emission end face of the solid immersion lens 7b and the surface of the optical recording medium 8, the surface opposing the emission end face. Furthermore, based on a difference signal between the second light receiving section 22a and the third light receiving section 22b, a relative inclination (a tangential tilt signal) with respect to a tangential direction of the optical recording medium 8 is detected between the emission end face of the solid immersion lens 7b and the surface of the optical recording medium 8, the surface opposing the emission end face.

Based on the gap signal from the first optical detector 14, a gap control unit (not shown) controls the objective lens optical system 7 so as to keep a constant spacing between the emission end face of the solid immersion lens 7b and the surface of the optical recording medium 8, the surface opposing the emission end face. In addition, based on the radial tilt signal and the tangential tilt signal from the first optical detector 14, a tilt control unit (not shown) controls the objective lens optical system 7 so that a relative angle becomes zero between the emission end face of the solid immersion lens 7b and the surface of the optical recording medium 8, the surface opposing the emission end face.

Furthermore, light quantity control of the light source 1 is performed by focusing 10% light reflected by the second beam splitter 5 on an optical detector (not shown) using a lens (not shown). In other words, based on a signal outputted from an optical detector (not shown), a light quantity control unit (not shown) monitors a quantity of emission light from the light source 1 and controls the light source 1 so that the quantity of light outputted from the light source 1 becomes constant.

The optical pickup according to the present second embodiment modifies a position of a recording layer on which light is focused by varying a distance between the diaphragm lens 7a and the solid immersion lens 7b which constitute the objective lens optical system 7. In other words, the optical pickup according to the present second embodiment varies the distance between the diaphragm lens 7a and the solid immersion lens 7b according to the respective recording layers to correct a focus component and a spherical aberration at the same time. The function of varying the distance between the diaphragm lens 7a and the solid immersion lens 7b is the same as the function of varying the distance between the concave lens 4a and the convex lens 4b in the emittance modifying unit 4 according to the first embodiment.

In this case, the emittance modifying unit 4 according to the first embodiment defocuses and imparts a spherical aberration to light incident to the objective lens optical system 7. At this point, when the objective lens optical system 7 and the emittance modifying unit 4 are decentered from each other, the a spherical aberration to be corrected is converted into a coma aberration and diaphragm performance of the objective lens optical system 7 deteriorates. Particularly, when a significant spherical aberration is applied by the emittance modifying unit 4 in order to accommodate the multilayered optical recording medium 8, decentering between the objective lens optical system 7 and the emittance modifying unit 4 becomes a major issue. Therefore, when assembling the optical pickup, an adjustment is required in order to eliminate the decentering between the objective lens optical system 7 and the emittance modifying unit 4.

In contrast, in the present second embodiment, a spherical aberration is varied by changing the distance between the diaphragm lens 7a and the solid immersion lens 7b. In this case, since the distance between the diaphragm lens 7a and the solid immersion lens 7b is short, the decentering between the diaphragm lens 7a and the solid immersion lens 7b has little negative impact. Furthermore, in some cases, the objective lens optical system 7 may deviate from center of the optical axis as the objective lens optical system 7 follows a track of the optical recording medium 8 (this is referred to as a lens shift). When such a lens shift occurs, an issue may arise with the first embodiment in that a spherical aberration is converted into a coma aberration and diaphragm performance deteriorates. However, this issue does not occur in the present second embodiment.

Therefore, the optical pickup according to the present second embodiment is a highly reliable optical pickup which is more easily assembled than the optical pickup according to the first embodiment, and whose diaphragm performance does not deteriorate even when a lens shift occurs.

Next, simultaneous correction of a defocus component and a spherical aberration which is enabled by changing a distance between the diaphragm lens 7a and the solid immersion lens 7b will be described. A definitional identity of an aspheric surface of a lens is expressed by Expression (8) below.

$$z=(y^2/R)/[1+\{1-(K+1)(y/R)^2\}^{0.5}]+A\cdot y^4+B\cdot y^6+C\cdot y^8+D\cdot y^{10}+E\cdot y^{12}+F\cdot y^{14}+G\cdot y^{16}+H\cdot y^{18}+I\cdot y^{20}+J\cdot y^{22}+L\cdot y^{24}+M\cdot y^{26} \quad (8)$$

In Expression (8) above, "z" denotes a distance from a surface vertex of an aspheric surface in a direction along an optical axis, "y" denotes a distance from the optical axis, "R" denotes a radius of curvature, "K" denotes a conic coefficient, and "A", "B", "C", "D", "E", "F", "G", "H", "I", "J", "L", and "M" denote aspheric surface coefficients.

Table 1 below shows lens data of an incidence plane and an emission plane of the diaphragm lens 7a constituting the objective lens optical system 7. The incident light has a wavelength of 405 nm, and the diaphragm lens 7a has a refractive index of 1.6239 and a thickness in the optical axis direction of 2.076187 mm. The solid immersion lens 7b has a refractive index of 2.0681, a radius of curvature of 500 μm, and a thickness in the optical axis direction of 515 μm. The optical recording medium 8 to be reproduced has three recording layers. Base material thicknesses from the surface of the optical recording medium 8 to the recording layers are respectively 1 μm, 4 μm, and 7 μm, and regions between the surface of the optical recording medium 8 to the respective recording layers have a refractive index of 2.0. In addition, if the light incident to the objective lens optical system 7 has a diameter of 2.93 mm, then a numerical aperture NA of the objective lens optical system 7 within the optical recording medium 8 is 1.77.

TABLE 1

| | DIAPHRAGM LENS 7a | |
|---|---|---|
| | INCIDENCE PLANE | EMISSION PLANE |
| R | 1.217119E+00 | −3.472851E+00 |
| K | −5.423898E−01 | −2.287117E+02 |
| A | 9.864258E−03 | 9.412244E−02 |
| B | −9.660009E−04 | −7.048401E−02 |
| C | 1.517276E−03 | −2.578422E−02 |
| D | −2.728756E−04 | 2.107904E−02 |
| E | −2.198266E−05 | 2.834953E−02 |
| F | 8.616155E−05 | −5.128126E−03 |
| G | −8.717833E−06 | −2.644683E−02 |
| H | −1.838625E−05 | 2.742161E−03 |
| I | −5.440303E−06 | 8.259383E−03 |
| J | 7.537459E−07 | 4.205282E−03 |

TABLE 1-continued

| | DIAPHRAGM LENS 7a | |
|---|---|---|
| | INCIDENCE PLANE | EMISSION PLANE |
| L | 2.493839E−06 | −3.976803E−03 |
| M | −1.266341E−06 | 0.000000E+00 |

In the objective lens optical system 7 described above, a calculation result of a case where the distance between the diaphragm lens 7a and the solid immersion lens 7b is changed so that each recording layer of the optical recording medium 8 has a defocus component of 0 mλ is as follows.

Firstly, when light is focused on the recording layer having a base material thickness of 4 μm, the distance between the diaphragm lens 7a and the solid immersion lens 7b at which the defocus component becomes 0 mλ is 0.0589 mm, and the spherical aberration at this distance is 0 mλ. Next, when light is focused on the recording layer having a base material thickness of 1 μm, the distance between the diaphragm lens 7a and the solid immersion lens 7b at which the defocus component becomes 0 mλ is 0.0659 mm, and the spherical aberration at this distance is −14.6 mλ. Finally, when light is focused on the recording layer having a base material thickness of 7 μm, the distance between the diaphragm lens 7a and the solid immersion lens 7b at which the defocus component becomes 0 mλ is 0.0518 mm, and the spherical aberration at this distance is 14.1 mλ.

As shown, by varying the distance between the diaphragm lens 7a and the solid immersion lens 7b for each recording layer, the defocus component can be set to 0 mλ. In addition, since the spherical aberration is sufficiently smaller than 70 mλ that is the Marechal criterion which affects diaphragm performance, the diaphragm performance is not affected. In other words, signal quality when recording information onto or reproducing information from each recording layer is adequately good.

Next, a description will be given on beams separated by the diffractive grating 9 in a case where the distance between the diaphragm lens 7a and the solid immersion lens 7b constituting the objective lens optical system 7 is varied and light is focused on each recording layer.

In the present second embodiment, the focus component is changed by varying the distance between the diaphragm lens 7a and the solid immersion lens 7b. A positional relationship between a main beam and sub-beams in this case is the same as when light is focused on each recording layer using the emittance modifying unit 4 according to the first embodiment, and assumes the positional relationship between the main beam and the sub-beams shown in FIGS. 5A to 7B. In other words, when light reflected by the end face of the solid immersion lens 7b is focused on the first detection lens 12, a same result as the first detection lens 12 described in the first embodiment is obtained. The positional relationship between spots on the first optical detector 14 and the respective light receiving sections according to the second embodiment assumes the positional relationship shown in FIGS. 12A to 12C. Therefore, with the second embodiment, a same effect as the first embodiment can be obtained by inserting and removing the glass plate 13 according to the recording layer on which light is focused as described in the first embodiment.

According to the present second embodiment, even with a multilayered optical recording medium having a plurality of recording layers, a relative inclination angle between a surface of the optical recording medium 8 and an emission end face of the solid immersion lens 7b can be reliably and accurately detected and the solid immersion lens 7b can be prevented from colliding with the surface of the optical recording medium 8. As a result, in addition to reliably recording and reproducing information, the risk of damaging the important optical recording medium can be reduced.

As described above, the optical pickup and the inclination angle detection method according to the first and second embodiments are primarily configured as described below.

Specifically, the optical pickup according to the first embodiment comprises: an optical beam generating unit which generates a first beam and a second beam; an emittance modifying mechanism which modifies an emittance of the first beam and the second beam generated by the optical beam generating unit; an objective lens optical system which includes a solid immersion lens having an end face opposing a surface of an optical recording medium having a plurality of layers, and which converges the first beam and the second beam on the optical recording medium; a first branch element which reflects the first beam and the second beam reflected by the end face of the solid immersion lens; a convergence state modifying unit which converges the first beam and the second beam reflected by the first branch element and which modifies convergence states of the first beam and the second beam; and a first optical detector which detects the first beam and the second beam converged by the convergence state modifying unit. In this case, a center of the first beam and a center of the second beam are at positions that differ from each other on the end face of the solid immersion lens. In addition, the convergence state modifying unit modifies the convergence states of the first beam and the second beam according to layers of the optical recording medium. Furthermore, the first optical detector has a first light receiving section that receives the converged first beam and a second light receiving section that receives the converged second beam. In this case, the first optical detector detects a relative inclination angle between the end face of the solid immersion lens and the surface of the optical recording medium based on a difference in quantities of received light between the first light receiving section and the second light receiving section.

In addition, the optical pickup according to the second embodiment comprises, in place of the emittance modifying mechanism and the objective lens optical system of the optical pickup according to the first embodiment described above: an objective lens optical system including a solid immersion lens which converges a first beam and a second beam on an optical recording medium having a plurality of layers and which has an end face opposing a surface of the optical recording medium and a diaphragm lens which converges the first beam and the second beam on the solid immersion lens; and an interlens distance modifying unit which modifies a distance between the solid immersion lens and the diaphragm lens in an optical axis direction.

Furthermore, the inclination angle detection method adopted by the optical pickup according to the first and second embodiments comprise: an optical beam generating step of generating a first beam and a second beam; a converging step of converging the first beam and the second beam on an optical recording medium via a solid immersion lens; a reflecting step of reflecting the first beam and the second beam reflected by an end face of the solid immersion lens; a convergence state modifying step of converging the first beam and the second beam reflected in the reflecting step, and modifying convergence states of the first beam and the second beam; and an optical detection step of detecting the first beam and the second beam converged in the convergence state modifying step. In this case, a center of the first beam and a center of the second beam are at positions that differ from each other on the end face of the solid immersion lens. In addition, in the convergence state modifying step, the convergence states of the first beam and the second beam are modified according to layers of the optical recording medium. Furthermore, in the optical detection step, a relative inclination angle between the end face of the solid immersion lens and a surface of the optical recording medium is detected based on a difference in quantities of received light between the converged first beam and the converged second beam.

With the optical pickup and the inclination angle detection method according to the first and second embodiments described above, in an optical system mounted with a solid immersion lens, a relative inclination angle between an emission end face of the solid immersion lens and a surface of an optical recording medium can be reliably and accurately detected and a deviation in inclination angle can be suppressed. As a result, for example, even with an optical recording medium which has a plurality of recording layers and onto which information is recorded or from which information is reproduced using near-field light, the solid immersion lens can be prevented from colliding with the optical recording medium and information with high recording density can be recorded and reproduced in a reliable manner. In addition, the risk of damaging the optical recording medium can be reduced.

Furthermore, as described in the first and second embodiments, the convergence state modifying unit can be constituted by the convergence position modifying unit 16 which modifies convergence positions of the first beam and the second beam. Accordingly, the first beam and the second beam can be focused on the first optical detector 14 in individual correspondence to each recording layer. As a result, positional accuracy of the first optical detector 14 becomes less stringent and an optical pickup which is easy to assemble and which is highly reliable can be constructed.

Moreover, in the first and second embodiments, as an example, the glass plate insertion section 15 inserts and removes the glass plate 13 onto and from an optical path to binarily vary a focal position of the first detection lens 12. However, the glass plate insertion section 15 may selectively insert a plurality of glass plates that differ in thickness with respect to each recording layer.

Figure 15:
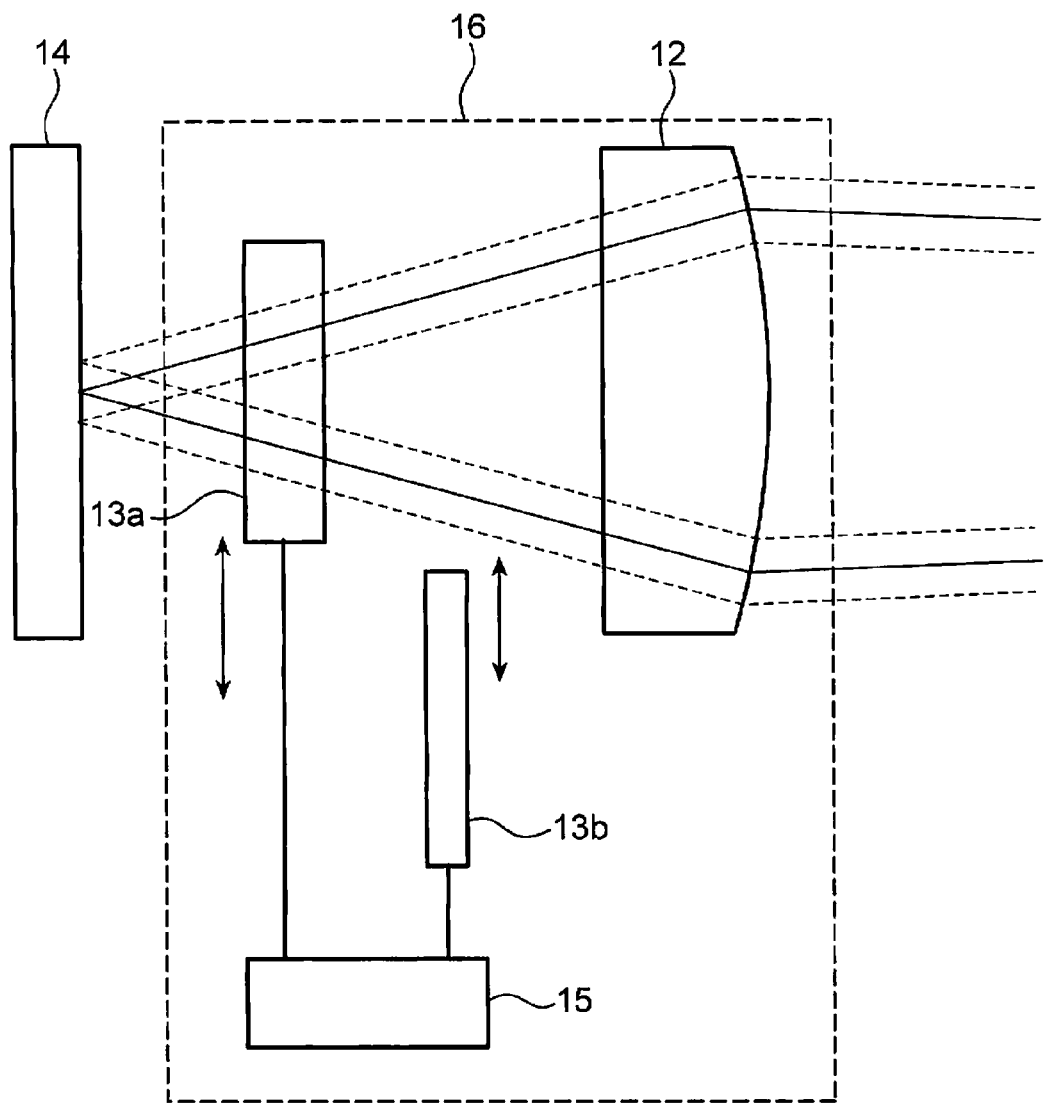
FIG. 15 is a diagram showing a configuration of a convergence position modifying unit according to a first modification of the first and second embodiments of the present invention.

FIG. 15 is a diagram showing a configuration of a convergence position modifying unit according to a first modification of the first and second embodiments of the present invention. In FIG. 15, components other than the convergence position modifying unit 16 are the same as those of the optical pickup according to the first and second embodiments and a description thereof will be omitted.

The convergence position modifying unit 16 shown in FIG. 15 comprises the first detection lens 12, a first glass plate 13*a*, a second glass plate 13*b*, and the glass plate insertion section 15. A thickness of the first glass plate 13*a* in an optical axis direction and a thickness of the second glass plate 13*b* in the optical axis direction differ from each other. The first glass plate 13*a* is thicker than the second glass plate 13*b*. The glass plate insertion section 15 selectively inserts the first glass plate 13*a* and the second glass plate 13*b* onto an optical path between the first detection lens 12 and the first optical detector 14 according to the recording layers of the optical recording medium 8.

Accordingly, even if the recording layer from which information is reproduced or onto which information is recorded changes, a position on the first detection lens 12 where light is focused can be kept constant. As a result, since a relationship between the optical detector and the spots can be kept the same for all recording layers, the positional accuracy of the first optical detector 14 becomes less stringent and assembly becomes easier. In addition, the reliability of the optical pickup is improved.

Moreover, while two glass plates with thicknesses that differ from each other are used in the first modification of the first and second embodiments, the present invention is not limited thereto and three or more glass plates may be used instead. In addition, while a plurality of glass plates with thicknesses that differ from each other are separately provided in the first modification of the first and second embodiments, the present invention is not limited thereto. Alternatively, a plurality of regions with thicknesses that differ from each other may be provided on a single glass plate and the regions may be selectively arranged on the optical path between the first detection lens 12 and the first optical detector 14 according to the recording layers of the optical recording medium 8.

Furthermore, the convergence position modifying unit may comprises a convertible lens which varies a focal position of a beam in place of the first detection lens, the glass plate, and the glass plate insertion section.

Figure 16:
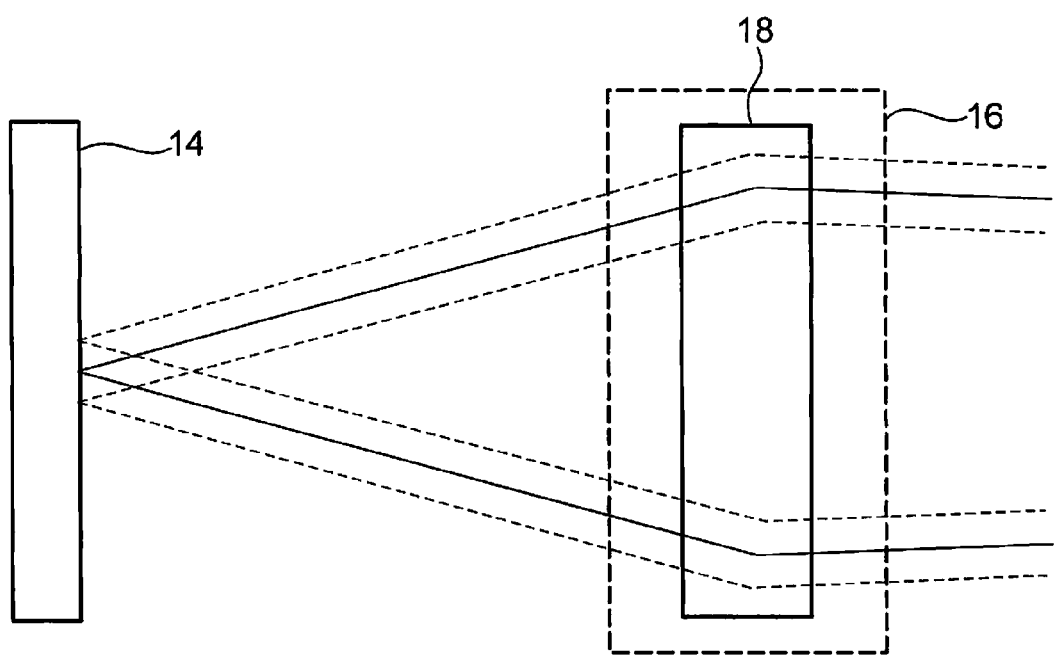
FIG. 16 is a diagram showing a configuration of a convergence position modifying unit according to a second modification of the first and second embodiments of the present invention.

FIG. 16 is a diagram showing a configuration of a convergence position modifying unit according to a second modification of the first and second embodiments of the present invention. In FIG. 16, components other than the convergence position modifying unit 16 are the same as those of the optical pickup according to the first and second embodiments and a description thereof will be omitted.

The convergence position modifying unit 16 shown in FIG. 16 comprises a liquid crystal lens 18. The liquid crystal lens 18 is an example of a convertible lens and varies the focal position of a beam according to the recording layers of the optical recording medium 8.

Accordingly, since a focal distance can be changed according to a recording layer on which light is focused, even if the recording layer from which information is reproduced or onto which information is recorded changes, a position on the liquid crystal lens 18 where light is focused can be kept constant. As a result, since a relationship between the optical detector and the spots can be kept the same for all recording layers, the positional accuracy of the first optical detector 14 becomes less stringent and assembly becomes easier. In addition, the reliability of the optical pickup is improved. Moreover, since a liquid crystal lens is used as a convertible lens, focal positions can be changed using electricity, the optical pickup can be downsized, and a highly reliable optical pickup can be constructed.

In addition, the convergence position modifying unit may comprise the first detection lens 12 and a lens position modifying mechanism which modifies a position of the first detection lens 12 in an optical axis direction in place of the glass plate and the glass plate insertion section.

Figure 17:
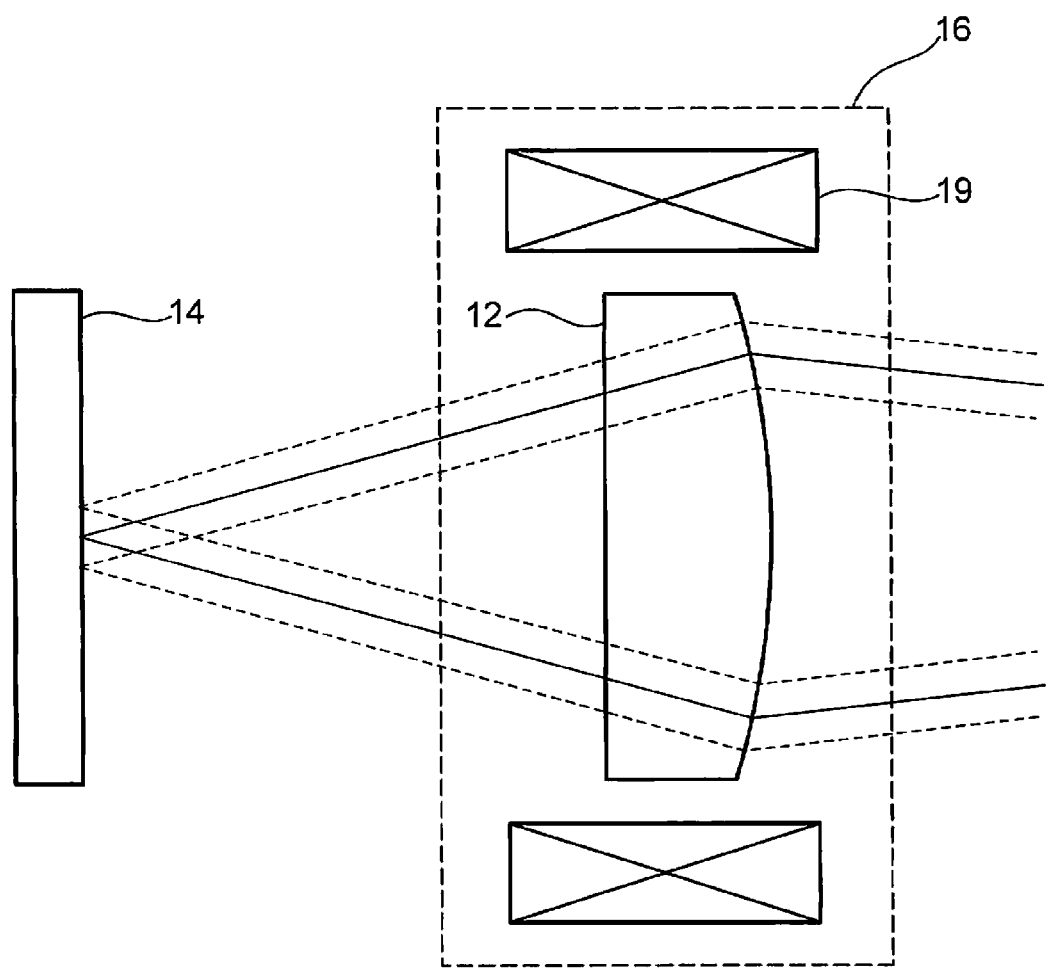
FIG. 17 is a diagram showing a configuration of a convergence position modifying unit according to a third modification of the first and second embodiments of the present invention.

FIG. 17 is a diagram showing a configuration of a convergence position modifying unit according to a third modification of the first and second embodiments of the present invention. In FIG. 17, components other than the convergence position modifying unit 16 are the same as those of the optical pickup according to the first and second embodiments and a description thereof will be omitted.

The convergence position modifying unit 16 shown in FIG. 17 comprises the first detection lens 12 and an actuator 19. The actuator 19 is an example of a lens position modifying mechanism and varies a position of the first detection lens 12 in an optical axis direction according to the recording layers of the optical recording medium 8.

Accordingly, since the position of the first detection lens 12 can be modified according to the respective recording layers, even when the recording layer from which information is reproduced or onto which information is recorded changes, the position on the first detection lens 12 at which light is focused can be kept constant. As a result, since a relationship between the optical detector and the spots can be kept the same for all recording layers, the positional accuracy of the first optical detector 14 becomes less stringent and assembly becomes easier.

Moreover, while the first optical detector 14 has five light receiving sections in order to detect inclinations in both a radial direction and a tangential direction in the first and second embodiments, an inclination in only the radial direction or an inclination in only the tangential direction may be detected instead. In this case, since adjustment of the first optical detector 14 need only be performed in one axis direction, adjustment becomes easier and reliability of the optical pickup increases.

Furthermore, a system in which the convergence state modifying unit is constituted by an astigmatism imparting unit in a case where a tilt is detected only in the radial direction or the tangential direction will be described below.

Figure 18:
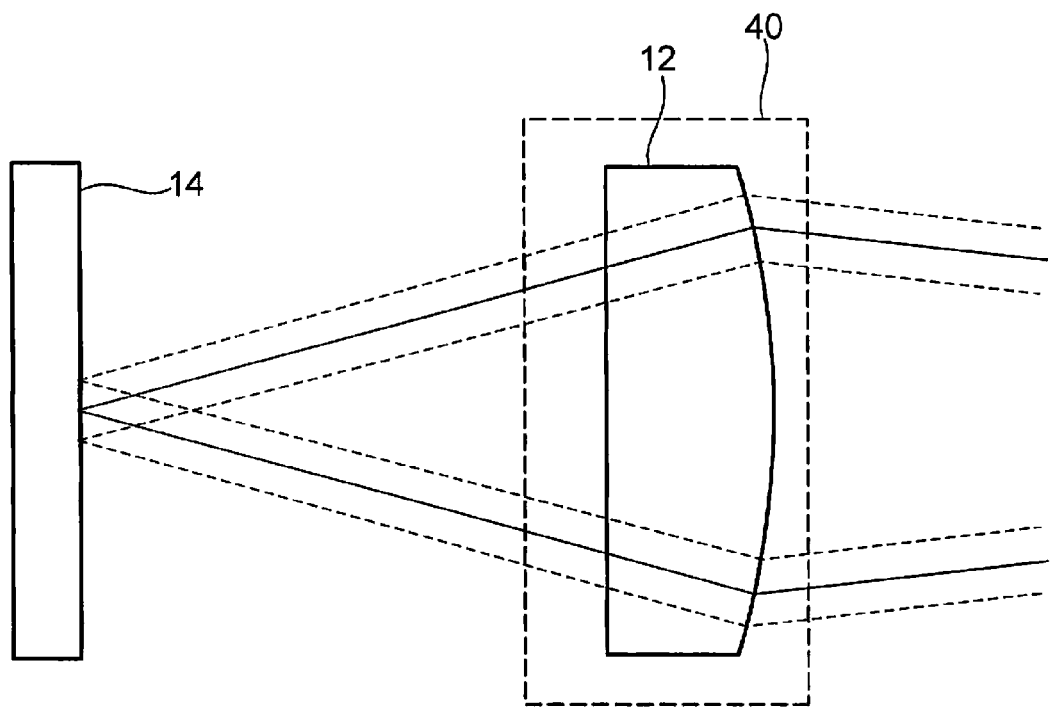
FIG. 18 is a diagram showing a configuration of an astigmatism imparting unit according to a fourth modification of the first and second embodiments of the present invention.

FIG. 18 is a diagram showing a configuration of an astigmatism imparting unit according to a fourth modification of the first and second embodiments of the present invention. In FIG. 18, components other than an astigmatism imparting unit 40 are the same as those of the optical pickup according to the first and second embodiments and a description thereof will be omitted.

The astigmatism imparting unit 40 imparts an astigmatism to a beam. The astigmatism imparting unit 40 comprises the first detection lens 12.

It is assumed that the optical recording medium 8 has three recording layers respectively having base material thicknesses of 1 μm, 4 μm, and 7 μm, an incidence plane of the first detection lens 12 is a cylindrical surface, an emission plane of the first detection lens 12 is a rotationally-symmetrical plane with respect to an optical axis of the lens, and the first detection lens 12 is capable of imparting an astigmatism to an incident light. In this case, light focused by the first detection lens 12 becomes a circle of least confusion or a focal line according to a position in an optical axis direction. In consideration thereof, the first optical detector 14 is arranged at a position where light focused by the first detection lens 12 becomes a circle of least confusion when light is focused on a recording layer having an intermediate base material thickness of 4 μm among the three base material thicknesses.

Spots on the first optical detector 14 of a main beam, a first sub-beam, and a second sub-beam reflected by an end face of the solid immersion lens 7b when the main beam is focused on each recording layer will now be shown in FIGS. 19A to 19C.

FIG. 19A shows spots on the first optical detector 14 of a main beam, a first sub-beam, and a second sub-beam reflected by an end face of the solid immersion lens 7b when the main beam is focused on a first recording layer having a base material thickness of 1 μm. FIG. 19B shows spots on the first optical detector 14 of a main beam, a first sub-beam, and a second sub-beam reflected by the end face of the solid immersion lens 7b when the main beam is focused on a second recording layer having a base material thickness of 4 μm. FIG. 19C shows spots on the first optical detector 14 of a main beam, a first sub-beam, and a second sub-beam reflected by the end face of the solid immersion lens 7b when the main beam is focused on a third recording layer having a base material thickness of 7 μm.

As shown in FIGS. 19A to 19C, a spot of a main beam 31, a spot of a first sub-beam 32a, and a spot of a second sub-beam 32b on the first optical detector 14 do not overlap each other regardless of which recording layer the main beam is focused on. Therefore, by increasing the number of fraction patterns of light receiving sections of the first optical detector 14, signals can be independently detected from spots of the main beam, the first sub-beam, and the second sub-beam. As shown, since the first detection lens 12 is capable of imparting an astigmatism, a movable section for moving the first detection lens 12 as described above is no longer required and an optical pickup which is highly reliable and which is suitable for downsizing can be realized.

As described above, the convergence state modifying unit may be constituted by the astigmatism imparting unit 40 which imparts astigmatisms to the first beam and the second beam. Accordingly, when the first and the second beams are recording information onto or reproducing information from any of the recording layers, the first and the second beams can be prevented from overlapping each other on the first optical detector 14 without having to use a mechanical section for moving a lens that focuses the first and the second beams on the first optical detector 14. Therefore, the optical pickup can be downsized. In addition, since a mechanical section for moving a lens that focuses the first and the second beams on the first optical detector 14 is no longer required, reliability of the optical pickup can be increased.

Furthermore, the astigmatism imparting unit 40 (the first detection lens 12) may be constituted by a lens in which at least one plane among a light incidence plane and a light emission plane is a cylindrical surface. Accordingly, since an astigmatism can be imparted by one optical component, the astigmatism imparting unit 40 is suitable for downsizing of the optical pickup.

Moreover, by arranging a glass plate in which at least one plane among a light incidence plane and a light emission plane has a predetermined angle with respect to a plane perpendicular to an optical axis in an optical path between the first detection lens 12 and the first optical detector 14, an astigmatism can be imparted to light converged by the first detection lens 12.

Figure 20:
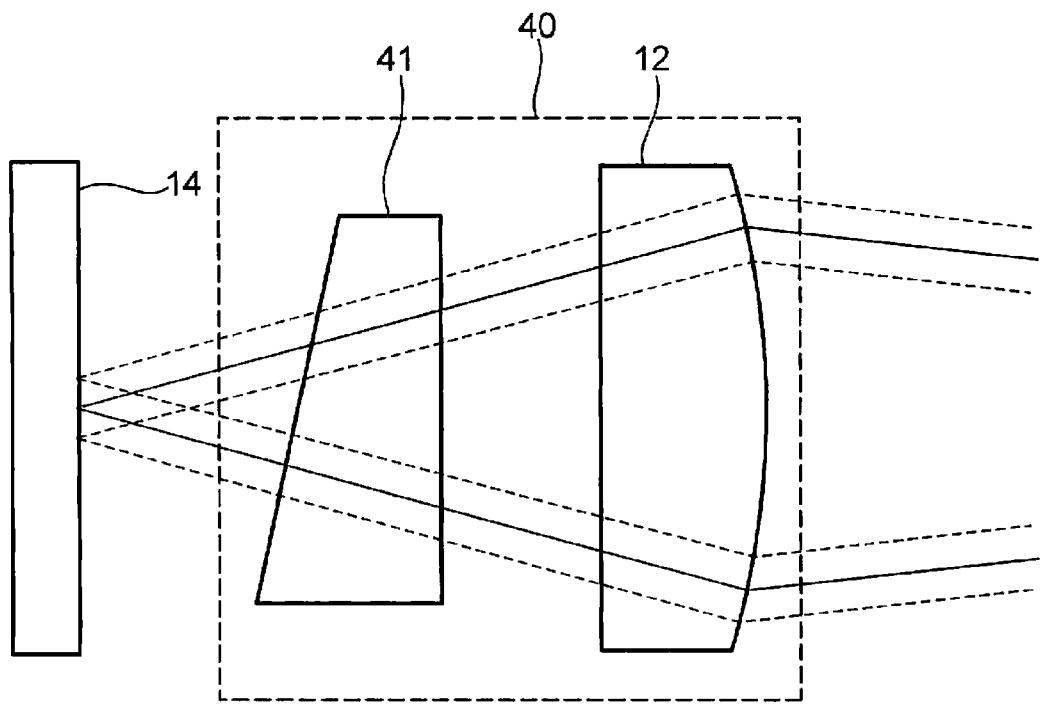
FIG. 20 is a diagram showing a configuration of an astigmatism imparting unit according to a fifth modification of the first and second embodiments of the present invention.

FIG. 20 is a diagram showing a configuration of an astigmatism imparting unit according to a fifth modification of the first and second embodiments of the present invention. In FIG. 20, components other than the astigmatism imparting unit 40 are the same as those of the optical pickup according to the first and second embodiments and a description thereof will be omitted.

The astigmatism imparting unit 40 comprises the first detection lens 12 and a wedge glass plate 41. The first detection lens 12 focuses beams (a first beam and a second beam). The wedge glass plate 41 is a wedge-shaped glass plate arranged in an optical path between a first detection lens 12 and the first optical detector 14. A light emission plane of the wedge glass plate 41 has a predetermined angle with respect to a plane perpendicular to an optical axis, and a light incidence plane of the wedge glass plate 41 is a plane perpendicular to the optical axis. Due to the wedge glass plate 41, an astigmatism can be imparted to light converged by the first detection lens 12 and a similar effect to those described above can be obtained.

Accordingly, since an astigmatism imparting unit can be constituted by a symmetrical and inexpensive component, cost reduction of an optical pickup can be realized, and since assembly accuracy becomes less stringent, a highly reliable optical pickup can be realized.

Moreover, while the light emission plane of the wedge glass plate 41 shown in FIG. 20 has a predetermined angle with respect to a plane perpendicular to the optical axis, the present invention is not limited thereto and the light emission plane of the wedge glass plate may alternatively be a plane perpendicular to the optical axis and the light incidence plane of the wedge glass plate may have a predetermined angle with respect to a plane perpendicular to the optical axis. In addition, both the light incidence plane and the light emission plane of the wedge glass plate may have a predetermined angle with respect to a plane perpendicular to the optical axis.

While a reflected light from the optical recording medium 8 is separated by the first beam splitter 3 and a reflected light from an end face of the solid immersion lens 7b is separated by the second beam splitter 5 in the first and second embodiments, a different configuration described below is also acceptable.

First, the first beam splitter 3 is arranged between the second beam splitter 5 and the first detection lens 12. An unpolarizing beam splitter having a property such that all linearly-polarized light have a transmittance of 50% and a reflectance of 50% is adopted as the second beam splitter 5. In addition, the first beam splitter 3 is given a property such that the first beam splitter 3 transmits 100% of a predetermined linearly-polarized light and reflects 100% of a linearly-polarized light perpendicular to the predetermined linearly-polarized light. Accordingly, both light reflected by the optical recording medium 8 and light reflected by the end face of the solid immersion lens 7b are reflected by the second beam splitter 5.

Next, light reflected by the optical recording medium 8 is transmitted through the first beam splitter 3, and light reflected by the end face of the solid immersion lens 7b is reflected by the first beam splitter 3. Therefore, light reflected by the optical recording medium 8 and light reflected by the end face of the solid immersion lens 7b can be separated from each other. Each light is focused on the first and second optical detectors 14 and 11 in the same manner as shown in FIG. 1.

Even with such a configuration, a relative inclination angle between a surface of the optical recording medium 8 and an emission end face of the solid immersion lens 7b can be reliably and accurately detected and the solid immersion lens 7b can be prevented from colliding with the surface of the optical recording medium 8 even in a case of a multilayered optical recording medium having a plurality of recording layers. As a result, in addition to reliably recording and reproducing information, the risk of damaging the important optical recording medium can be reduced.

Moreover, while one of two sub-beams is arranged on either side of a main beam in the first and second embodiments described above, it is needless to say that the same effect can be obtained by using only one of the two sub-beams. However, in this case, a tilt signal is a difference signal between a signal obtained from the main beam and a signal obtained from the sub-beam.

In addition, while the first beam splitter 3 is arranged on the side of the light source 1 and the second beam splitter 5 is arranged on the side of the objective lens optical system 7 in the second embodiment, reversing the arrangement order of the first beam splitter 3 and the second beam splitter 5 is also perfectly acceptable. Furthermore, any arrangement order of the diffractive grating 9, the first beam splitter 3, and the second beam splitter 5 is equally acceptable and does not negatively affect the present invention.

Moreover, while an astigmatic method has been exemplified as a focus detection method and a push-pull method has been exemplified as a tracking detection method in the first and second embodiments, such methods are not restrictive and these detection methods may be combined with other detection methods.

In addition, while the objective lens optical system 7 is inclined based on a radial tilt signal and a tangential tilt signal in the first and second embodiments, for example, a method of inclining the optical recording medium 8 by providing the motor unit with a tilting mechanism or a method of inclining the entire optical pickup by providing a shaft section that supports the entire optical pickup with a tilting mechanism is also perfectly acceptable.

Furthermore, while the optical recording medium 8 according to the first and second embodiments has three recording layers, it is needless to say that the optical pickup according to the present first and second embodiments is capable of reliably recording information onto or reliably reproducing information from an optical recording medium having two or more recording layers.

Moreover, while light reflected by the second beam splitter 5 is focused on an optical detector by a lens and a light quantity of the light source 1 is controlled using a signal outputted from the optical detector in the first and second embodiments, the light quantity of the light source 1 may be controlled using only a part of the light reflected by the second beam splitter 5 without focusing the light reflected by the second beam splitter 5 using a lens. Alternatively, controlling the light quantity of the light source 1 by extracting a part of light outputted from the light source 1 at another location is also perfectly acceptable. As shown, any conventionally described method may be used to control the light quantity of the light source 1.

Furthermore, while an actuator is used as an interlens distance modifying unit in the second embodiment, a distance between the diaphragm lens 7a and the solid immersion lens 7b may be modified using a piezoelectric element, and the use of any mechanism is also perfectly acceptable as long as the distance between the diaphragm lens 7a and the solid immersion lens 7b can be modified.

Mounting a metallic needle having minute protrusions on the emission end face of the solid immersion lens 7b causes a further minute near-field light to be outputted from the metallic needle, whereby recording density can be further increased using the near-field light. By mounting the metallic needle in this mariner on the optical pickup shown in the present first and second embodiments, information can be recorded at a higher density and information recorded at a higher density can be reproduced, and information can be recorded onto or reproduced from a multilayered optical recording medium in an even more reliable manner.

(Third Embodiment)

Figure 21:
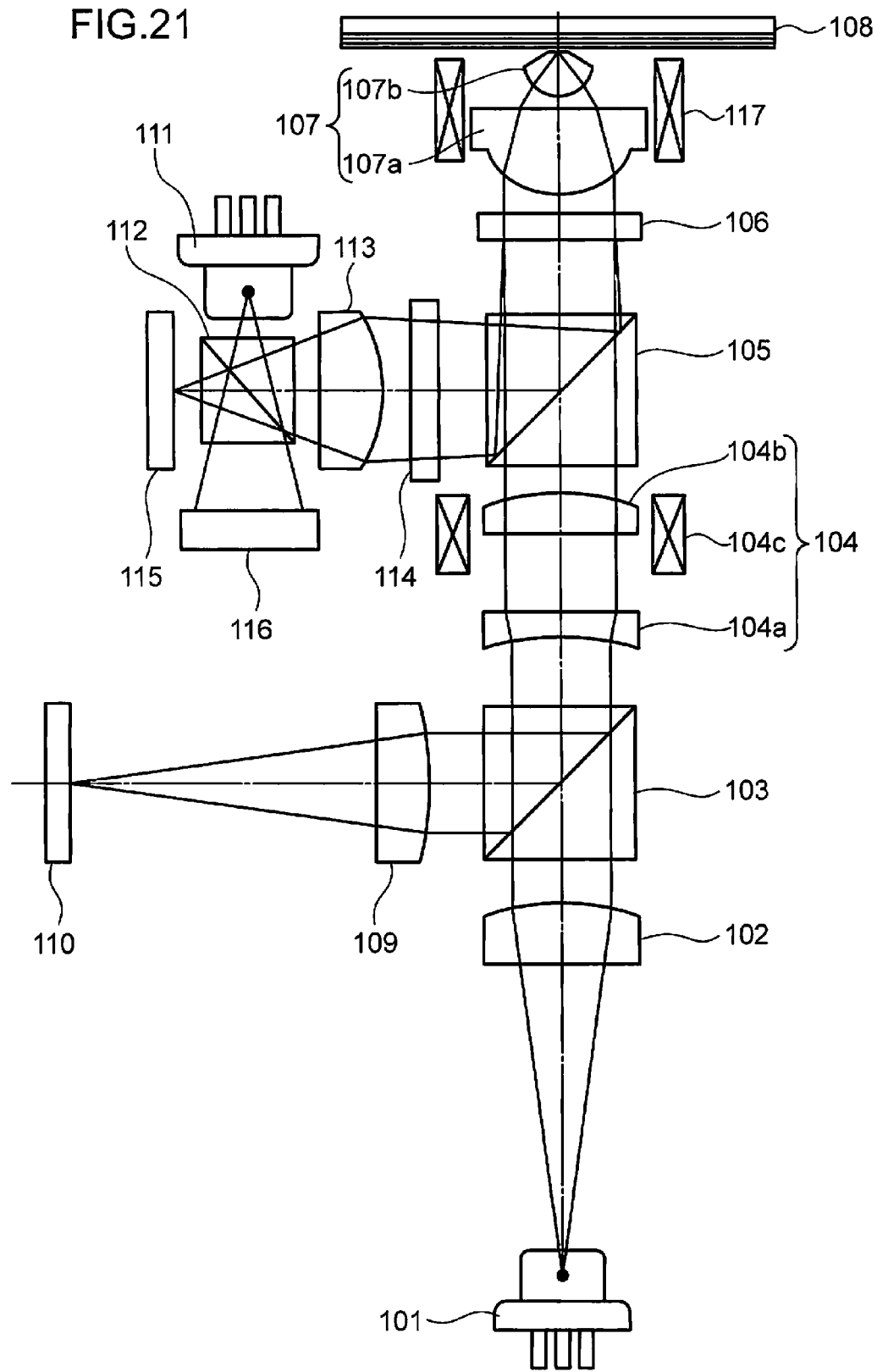
FIG. 21 is a diagram showing a configuration of an optical pickup according to a third embodiment of the present invention.

FIG. 21 is a diagram showing a configuration of an optical pickup according to a third embodiment of the present invention.

In FIG. 21, an optical pickup comprises a first light source 101, a first collimator lens 102, a first beam splitter 103, an emittance modifying unit 104, a second beam splitter 105, a quarter wavelength plate 106, an objective lens optical system 107, a detection lens 109, a first optical detector 110, a second light source 111, a third beam splitter 112, a second collimator lens 113, an analyzer 114, a second optical detector 115, a third optical detector 116, and an objective lens actuator 117.

The emittance modifying unit 104 is constituted by a concave lens 104a, a convex lens 104b, and an actuator 104c that moves the convex lens 104b in an optical axis direction. The objective lens optical system 107 is constituted by a diaphragm lens 107a and a solid immersion lens (SIL) 107b.

The first beam splitter 103 is an example of a first branch section and the second beam splitter 105 is an example of a second branch section.

In this case, the first light source 101 is constituted by, for example, a GaN-based semiconductor laser element and outputs a coherent light (with a wavelength of 390 to 450 nm) for recording or reproduction to each recording layer of an optical recording medium 108 having a plurality of recording layers (in the present embodiment, three layers). The first collimator lens 102 converts a divergent light outputted from the first light source 101 into a parallel light.

The first beam splitter 103 has a property such that a given linearly-polarized light has a transmittance of 100% and a linearly-polarized light perpendicular to the given linearly-polarized light has a reflectance of 100%. The first beam splitter 103 reflects light outputted from the first light source 101 and reflected by a recording layer of the optical recording medium 108.

The emittance modifying unit 104 modifies an emittance of light outputted from the first light source 101. In addition, the emittance modifying unit 104 comprises the concave lens 104a having negative power, the convex lens 104b having positive power, and the actuator 104c which moves the convex lens 104b in the optical axis direction. By varying a spacing between the concave lens 104a and the convex lens 104b using the actuator 104c, the emittance modifying unit 104 is able to convert an emittance of a incident light into a different emittance. By varying the emittance, a variation in thickness from a surface of the optical recording medium 108 to each recording layer can be accommodated.

The second beam splitter 105 has a property such that, with respect to a wavelength of light outputted from the first light source 101, a given linearly-polarized light has a transmittance of 90% and a reflectance of 10%, and a linearly-polarized light perpendicular to the given linearly-polarized light has a transmittance of 100%. Furthermore, the second beam splitter 105 has a property such that, with respect to a wavelength of light outputted from the second light source 111, all polarized light is 100% reflected. Light outputted from the second light source 111 is incident to the second beam splitter 105, and the second beam splitter 105 reflects light reflected by an end face of the solid immersion lens 107b.

The second beam splitter 105 (a branch element) is on the side of the objective lens optical system 107 (to be described later) with respect to the emittance modifying unit 104. The second beam splitter 105 is arranged between the emittance modifying unit 104 and the objective lens optical system 107. In other words, a configuration is provided such that light from the second light source 111 is not transmitted through the emittance modifying unit 104.

The quarter wavelength plate 106 is formed of a birefringent material and converts a linearly-polarized light into a circularly-polarized light.

The objective lens optical system 107 comprises the solid immersion lens 107b and converges light from the emittance modifying unit 104 on the optical recording medium 108 having a plurality of recording layers. The objective lens optical system 107 is constituted by the diaphragm lens 107a and the solid immersion lens (SIL) 107b. An air gap that exists between an emission end face of the solid immersion lens 107b and a surface of the optical recording medium 108, the surface opposing the emission end face, enables light propagation in the form of evanescent light to be performed shorter than an evanescent attenuation length. In addition, a gap spacing is set shorter than approximately 1/10 of the wavelength.

The solid immersion lens 107b has an end face that opposes the surface of the optical recording medium 108. A periphery of the end face favorably has a cone shape. Accordingly, even when the emission end face of the solid immersion lens 107b and the surface of the optical recording medium 108 become inclined relative to each other, the solid immersion lens 107b is less likely to collide with the optical recording medium 108. As a result, a permissible angle of the relative inclination between the emission end face of the solid immersion lens 107b and the surface of the optical recording medium 108 can be increased.

The objective lens actuator 117 moves the objective lens optical system 107 in an optical axis direction (a focusing direction) and a tracking direction (a radial direction) of the optical recording medium 108. In addition, the objective lens actuator 117 adjusts an angle of the objective lens optical system 107 so that the emission end face of the solid immersion lens 107b of the objective lens optical system 107 and the surface of the optical recording medium 108 become parallel to each other. Moreover, the objective lens actuator 117 integrally moves the diaphragm lens 107a and the solid immersion lens 107b.

The optical recording medium 108 is a multilayered optical recording medium having three recording layers.

The detection lens 109 has an incidence plane that is a cylindrical surface and an emission plane that is a rotationally-symmetrical surface with respect to an optical axis of the lens. The detection lens 109 imparts an astigmatism to an incident light which enables detection of a focus error signal according to a so-called astigmatic method.

The first optical detector 110 receives light reflected by a recording layer of the optical recording medium 108 and converts the received light into an electrical signal. The first optical detector 110 outputs an electrical signal corresponding to a quantity of received light. The first optical detector 110 outputs an electrical signal for reproducing information recorded on the optical recording medium 108.

The second light source 111 is a semiconductor laser light source which outputs light in a wavelength range of 640 nm to 680 nm. A wavelength of light outputted from the first light source 101 and a wavelength of light outputted from the second light source 111 differ from each other. The third beam splitter 112 is an unpolarizing beam splitter having a property such that transmittance is 50% and reflectance is 50%. The second collimator lens 113 is a lens that modifies an emittance of light outputted from the second light source 111. The analyzer 114 is an optical element which transmits linearly-polarized light in a given direction of polarization and which absorbs linearly-polarized light in a direction perpendicular to the linearly-polarized light in the given direction.

The second optical detector 115 receives light outputted from the second light source 111 and reflected by the emission end face of the solid immersion lens 107b, and converts the received light into an electrical signal. The second optical detector 115 has a light receiving section which has been divided into at least two fractions, receives light reflected by the second beam splitter 105, and outputs an electrical signal according to the quantity of received light. The second optical detector 115 outputs an electrical signal for detecting a relative inclination angle between the emission end face of the solid immersion lens 107b and the surface of the optical recording medium 108.

The third optical detector 116 receives light outputted from the second light source 111 and converts the received light into an electrical signal in order to monitor the quantity of light outputted from the second light source 111.

Operations of the optical pickup configured in this manner will now be described.

The first light source 101 outputs a linearly-polarized light. The light outputted from the first light source 101 is converted into an approximately parallel light by the first collimator lens 102 and is transmitted through the first beam splitter 103. The light transmitted through the first beam splitter 103 is incident to the emittance modifying unit 104. The emittance modifying unit 104 modifies an emittance of the incident light according to a position of a recording layer of the optical recording medium 108 on which the light is focused.

The light whose emittance is modified by the emittance modifying unit 104 is transmitted through the second beam splitter 105 and is incident to the quarter wavelength plate 106. The quarter wavelength plate 106 converts the incident linearly-polarized light into a circularly-polarized light. Light transmitted through the quarter wavelength plate 106 is focused by the objective lens optical system 107 on a predetermined recording layer of the optical recording medium 108.

Light reflected by the optical recording medium 108 is transmitted through the objective lens optical system 107, the quarter wavelength plate 106, the second beam splitter 105, and the emittance modifying unit 104 and is incident to the first beam splitter 103. Light reflected by the first beam splitter 103 is incident to the detection lens 109. The light incident to the detection lens 109 is imparted with an astigmatism. Light transmitted through the detection lens 109 is focused on the first optical detector 110.

The first optical detector 110 outputs a focus error signal indicating an in-focus state of light on the optical recording medium 108. In addition, the first optical detector 110 outputs a tracking error signal indicating an irradiation position of light on the optical recording medium 108.

At this point, the focus error signal and the tracking error signal are detected by a known technique such as an astigmatic method and a push-pull method. In addition, based on the focus error signal from the first optical detector 110, a focus control unit (not shown) drives the actuator 104c to control a position of the convex lens 104b in the optical axis direction so that light is always focused on the optical recording medium 108 in an in-focus state. In other words, the actuator 104c moves the convex lens 104b in the optical axis direction according to a control signal from the focus control unit.

Furthermore, based on the tracking error signal from the first optical detector 110, a tracking control unit (not shown) drives the objective lens actuator 117 to control a position of the objective lens optical system 107 so that light is focused on a desired track on the optical recording medium 108. In other words, the objective lens actuator 117 moves the objective lens optical system 107 according to a control signal from the tracking control unit. Moreover, based on an electrical signal from the first optical detector 110, a reproduction control unit (not shown) acquires reproduction information recorded on the optical recording medium 108.

In addition, the second light source 111 outputs a linearly-polarized light. The light outputted from the second light source 111 is reflected by the third beam splitter 112 and has its emittance modified by the second collimator lens 113. Light transmitted through the second collimator lens 113 is transmitted through the analyzer 114 and reflected by the second beam splitter 105, and is incident to the quarter wavelength plate 106.

The quarter wavelength plate 106 converts the incident linearly-polarized light into a circularly-polarized light. Light transmitted through the quarter wavelength plate 106 is incident to the objective lens optical system 107 and is reflected by the emission end face of the solid immersion lens (SIL) 107b.

The light reflected by the emission end face of the solid immersion lens 107b is transmitted through the objective lens optical system 107 and the quarter wavelength plate 106 and is reflected by the second beam splitter 105. The light reflected by the second beam splitter 105 is transmitted through the analyzer 114, the second collimator lens 113, and the third beam splitter 112, and is focused on the second optical detector 115.

Figure 22:
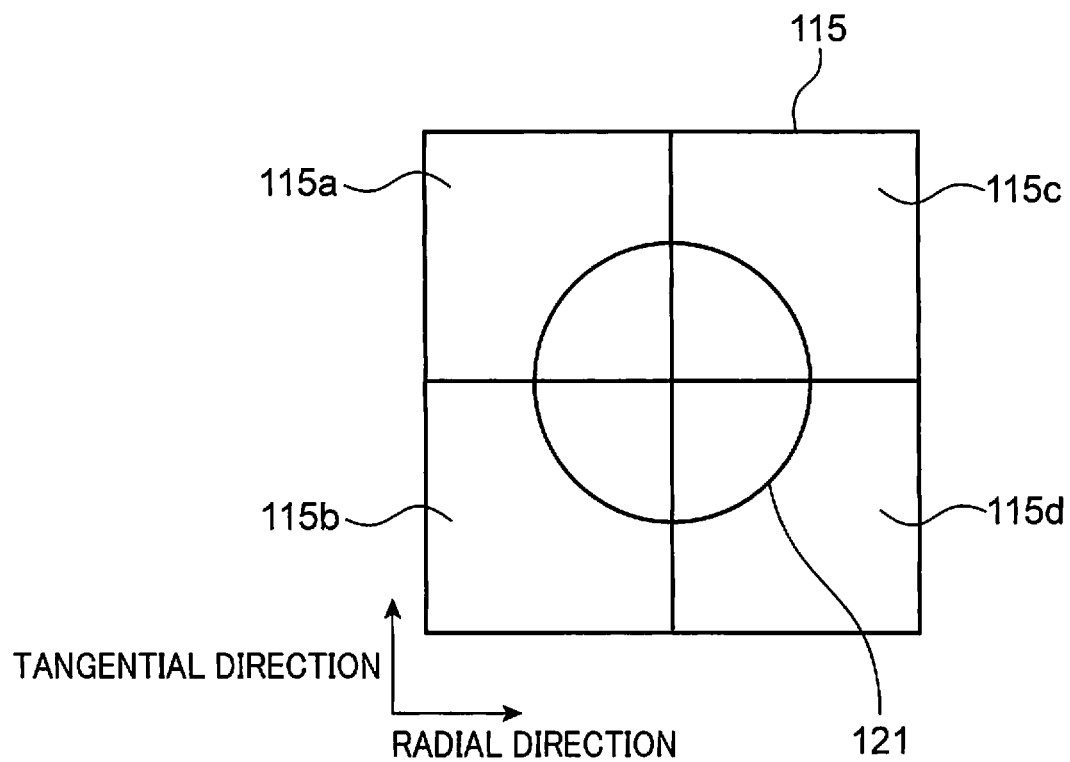
FIG. 22 is a diagram showing a configuration of a second optical detector shown in FIG. 21.

FIG. 22 is a diagram showing a configuration of the second optical detector shown in FIG. 21. The second optical detector 115 has a four-fraction light receiving section (a first light receiving section 115a, a second light receiving section 115b, a third light receiving section 115c, and a fourth light receiving section 115d) shown in FIG. 22, and a detailed description thereof is already provided in Patent Literature 1 and therefore will be omitted. The second optical detector 115 receives a spot 121 of a reflected light that is reflected by the emission end face of the solid immersion lens 107b. By adding up all signals from the four-fraction light receiving section (the first light receiving section 115a, the second light receiving section 115b, the third light receiving section 115c, and the fourth light receiving section 115d), a spacing (a gap signal) of an air gap is detected which exists between the emission end face of the solid immersion lens 107b and a surface of the optical recording medium 108, the surface opposing the emission end face.

In addition, based on a difference signal between a summation signal of the first light receiving section 115a and the second light receiving section 115b and a summation signal of the third light receiving section 115c and the fourth light receiving section 115d of the four-fraction light receiving section, a relative inclination (a radial tilt signal) with respect to a radial direction of the optical recording medium 108 is detected between the emission end face of the solid immersion lens 107b and the surface of the optical recording medium 108, the surface opposing the emission end face. Furthermore, based on a difference signal between a summation signal of the first light receiving section 115a and the third light receiving section 115c and a summation signal of the second light receiving section 115b and the fourth light receiving section 115d of the four-fraction light receiving section, a relative inclination (a tangential tilt signal) with respect to a tangential direction of the optical recording medium 108 is detected between the emission end face of the solid immersion lens 107b and the surface of the optical recording medium 108, the surface opposing the emission end face.

Based on the gap signal from the second optical detector 115, a focus control unit (not shown) controls the objective lens optical system 107 so as to keep a constant spacing between the emission end face of the solid immersion lens 107b and the surface of the optical recording medium 108, the surface opposing the emission end face.

In addition, based on the radial tilt signal and the tangential tilt signal from the second optical detector 115, a tilt control unit (not shown) controls the objective lens optical system 107 so that a relative angle becomes zero between the emission end face of the solid immersion lens 107b and the surface of the optical recording medium 108, the surface opposing the emission end face.

Furthermore, the third optical detector 116 receives a part of light outputted from the second light source 111. Based on a signal outputted from the third optical detector 116, a light quantity control unit (not shown) monitors a quantity of emission light from the second light source 111 and controls the second light source 111 so that the quantity of light outputted from the second light source 111 becomes constant.

Light outputted from the first light source 101 and the second light source 111 and reflected by the optical recording medium 108 will now be described in greater detail.

First, light outputted from the first light source 101 is focused on the optical recording medium 108 and reflected by a predetermined recording layer of the optical recording medium 108. The light reflected by the predetermined recording layer of the optical recording medium 108 is converted by the quarter wavelength plate 106 into a linearly-polarized light in a direction that is perpendicular to light outputted from the first light source 101. The linearly-polarized light converted by the quarter wavelength plate 106 is 100%-transmitted through the second beam splitter 105, 100%-reflected by the first beam splitter 103, and received by the first optical detector 110.

In addition, since the spacing between the emission end face of the solid immersion lens 107*b* and the surface of the optical recording medium 108 is not zero, a part of the light outputted from the first light source 101 is reflected by the emission end face of the solid immersion lens 107*b*.

The light reflected by the emission end face of the solid immersion lens 107*b* is converted by the quarter wavelength plate 106 into a linearly-polarized light in a same direction of polarization as the light outputted from the first light source 101. 90% of the linearly-polarized light converted by the quarter wavelength plate 106 is transmitted through the second beam splitter 105 and 10% of the linearly-polarized light is reflected by the second beam splitter 105. Transmitted light of the second beam splitter 105 is 100%-transmitted through the first beam splitter 103 and is therefore not incident to the first optical detector 110.

At this point, if light reflected by the second beam splitter 105 reaches the second optical detector 115, detection of the gap signal and the tilt signal is obstructed. For this reason, a film which reflects light outputted from the first light source 101 and which transmits light outputted from the second light source 111 and having a wavelength that differs from the light outputted from the first light source 101 is formed on a surface of the analyzer 114 on the side of the objective lens optical system. Accordingly, light outputted from the first light source 101 is prevented from reaching the second optical detector 115.

Next, among light outputted from the second light source 111, a reflected light from the optical recording medium 108 is converted by the quarter wavelength plate 106 into a linearly-polarized light in a direction that is perpendicular to the light outputted from the second light source 111. The linearly-polarized light is 100%-reflected by the second beam splitter 105 and 100%-absorbed by the analyzer 114. Accordingly, light outputted from the second light source 111 and reflected by the optical recording medium 108 is prevented from reaching the second optical detector 115.

In addition, since the spacing between the emission end face of the solid immersion lens 107*b* and the surface of the optical recording medium 108 is not zero, a part of the light outputted from the second light source 111 is reflected by the emission end face of the solid immersion lens 107*b*.

The reflected light from the emission end face of the solid immersion lens 107*b* passes through the quarter wavelength plate 106 and is then converted into a linearly-polarized light in a same direction of polarization as the light outputted from the second light source 111. Therefore, the reflected light from the emission end face of the solid immersion lens 107*b* is 100%-reflected by the second beam splitter 105 and is 100%-transmitted through the analyzer 114. As a result, only light which is outputted by the second light source 111 and which is reflected by the emission end face of the solid immersion lens 107*b* is received by the second optical detector 115.

Since the optical recording medium 108 has a multilayered structure, the emittance modifying unit 104 is driven in correspondence with each recording layer. However, even if the emittance modifying unit 104 is driven, since the light outputted from the second light source 111 is not transmitted through the emittance modifying unit 104, a spot diameter of light focused on the second optical detector 115 does not change regardless of which recording layer is being reproduced. Therefore, a reliable gap signal and a reliable tilt signal can be detected. Furthermore, since unnecessary light does not exist as described above, reliable signals can be detected.

This effect will be described in greater detail.

Figure 23:
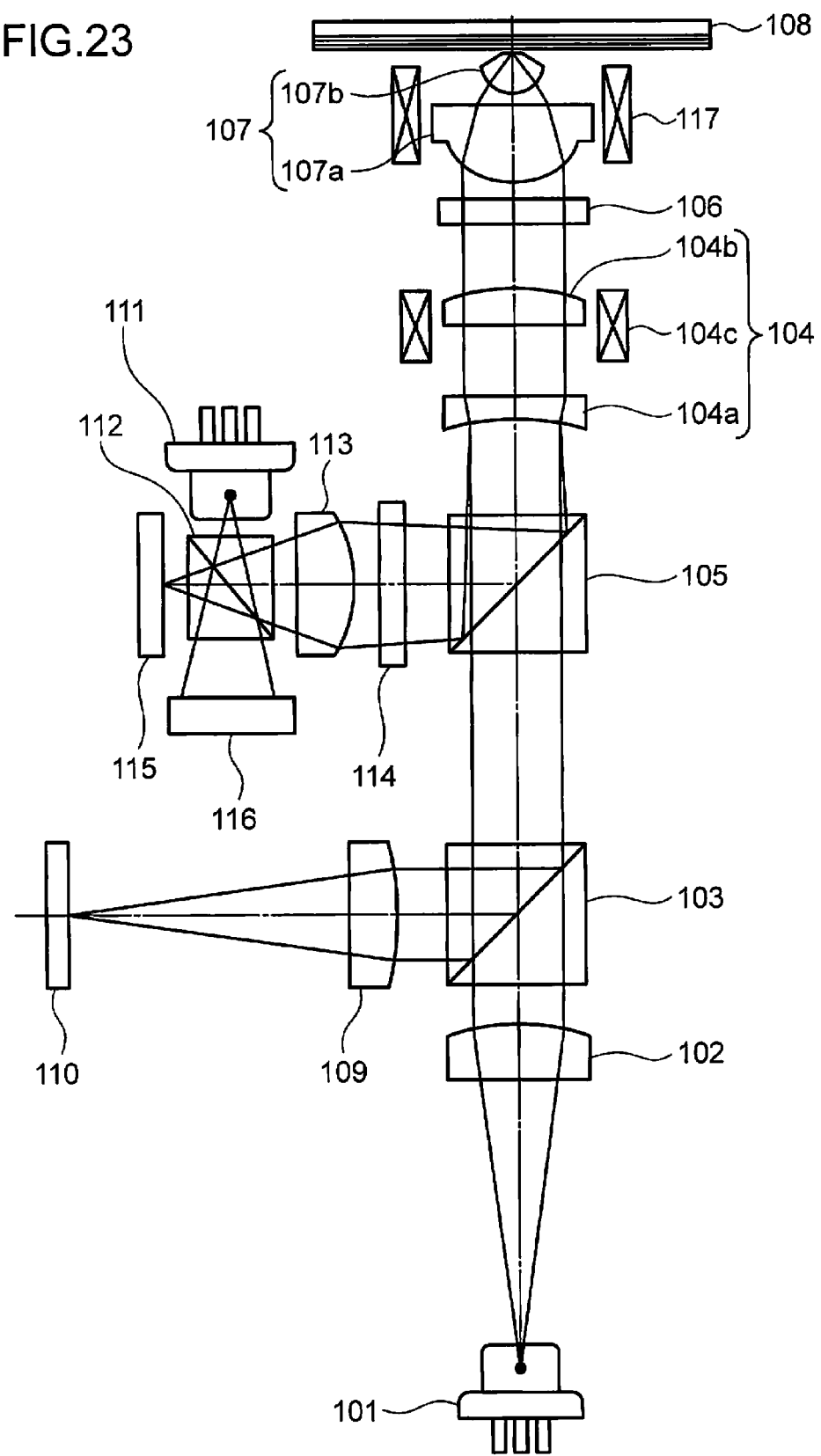
FIG. 23 is a diagram showing a configuration of an optical pickup according to a comparative example of the third embodiment of the present invention.

FIG. 23 is a diagram showing a configuration of an optical pickup according to a comparative example of the third embodiment of the present invention. In FIG. 23, components with the same functions as those of the optical pickup shown in FIG. 21 are denoted by same reference characters.

In the optical pickup according to the comparative example shown in FIG. 23, a second beam splitter 105 (a branch element) is positioned further away from the objective lens optical system 107 than the emittance modifying unit 104. In other words, a configuration is provided such that light from the second light source 111 is transmitted through the emittance modifying unit 104. This is the difference of the optical pickup according to the comparative example shown in FIG. 23 from the optical pickup shown in FIG. 21.

FIGS. 24A to 24C are diagrams showing light from the second light source 111 being incident to respective recording layers of an optical recording medium 108 from an end face of the solid immersion lens 107*b* and a spot 121 which is formed on the second optical detector 115 and which varies according to a position of a recording layer on which light is focused in the optical pickup shown in FIG. 23.

The optical recording medium 108 shown in FIGS. 24A to 24C has, for example, three recording layers. The optical recording medium 108 comprises, in an ascending order of proximity to the solid immersion lens 107*b*, a substrate 118, a first recording layer L0, a second recording layer L1, and a third recording layer L2.

FIG. 24A is a diagram showing light being incident to the first recording layer L0 of the optical recording medium 108 from the end face of the solid immersion lens 107*b* and a spot 121 formed on the second optical detector 115 when light from the second light source 111 is focused on the first recording layer L0 in the optical pickup shown in FIG. 23. FIG. 24B is a diagram showing light being incident to the second recording layer L1 of the optical recording medium 108 from the end face of the solid immersion lens 107*b* and the spot 121 formed on the second optical detector 115 when light from the second light source 111 is focused on the second recording layer L1 in the optical pickup shown in FIG. 23. FIG. 24C is a diagram showing light being incident to the third recording layer L2 of the optical recording medium 108 from the end face of the solid immersion lens 107*b* and the spot 121 formed on the second optical detector 115 when light from the second light source 111 is focused on the third recording layer L2 in the optical pickup shown in FIG. 23.

As is apparent from FIGS. 24A to 24C, with the optical pickup shown in FIG. 23, since a spacing between the concave lens 104*a* and the convex lens 104*b* in the emittance modifying unit 104 is varied by the actuator 104*c*, a shape of light from the second light source 111 on the end face of the solid immersion lens 107b also varies. Accordingly, a spot size on the second optical detector 115 varies.

When the spot size on the second optical detector 115 varies, the following issues arise.

First, let us assume that a detection optical system has been configured such that a spot size on the second optical detector 115 assumes an optimum size when a focusing position is changed to the first recording layer L0. Then, a spot size on the second optical detector 115 assumes a minimum size when the focusing position is changed to the third recording layer L2. As this point, if the spot size on the second optical detector 115 is too small, obtaining a practical tilt detection sensitivity becomes difficult.

Next, let us assume that the detection optical system has been configured such that a spot size on the second optical detector 115 assumes an optimum size when the focusing position is changed to the third recording layer L2. Then, a spot size on the second optical detector 115 when the focusing position is changed to the first recording layer L0 or the second recording layer L1 on the side of a substrate 118 with respect to the third recording layer L2 relatively increases. In order to accommodate this increase, an optical detector with a larger size may conceivably be used. However, with optical detectors, the greater the size, the lower the frequency characteristics thereof. Therefore, when the size of the optical detector is increase, rapid variations in light quantity can no longer be detected as an electrical signal, which makes it difficult to perform servocontrol at desired frequency characteristics.

As described above, when the spot size on the second optical detector 115 varies, an issue arises in that obtaining a reliable gap signal and a reliable tilt signal becomes difficult.

On the other hand, unlike the optical pickup shown in FIG. 23 described above, with the optical pickup according to the present third embodiment shown in FIG. 21, the second beam splitter 105 (a branch element) is on the side of the objective lens optical system 107 with respect to the emittance modifying unit 104. In other words, a configuration is provided such that light from the second light source 111 is not transmitted through the emittance modifying unit 104.

Due to this configuration, for example, even when the emittance modifying unit 104 is operated in order to vary a focusing position of the first light source 101 in an optical axis direction according to the recording layers that is a target of recording or reproduction, a shape of light from the second light source 111 on the end face of the solid immersion lens 107b does not vary. In other words, the spot size on the second optical detector 115 does not vary. Therefore, a reliable gap signal and a reliable tilt signal can be detected.

Next, light outputted from the second collimator lens 113 will be described.

A wavelength of light outputted from the second light source 111 is longer than a wavelength of light outputted from the first light source 101. Therefore, when the objective lens optical system 107 is designed such that light outputted from the first light source 101 focuses on a recording layer of the optical recording medium 108, light outputted from the second light source 111 which has a longer wavelength than light outputted from the first light source 101 is significantly defocused due to a chromatic aberration of the objective lens optical system 107.

As a result, when light outputted from the second light source 111 is converted into a parallel light and then incident to the objective lens optical system 107, light reflected by the emission end face of the solid immersion lens 107b returns with a significantly large spot size. Therefore, when a distance between the objective lens optical system 107 and the second optical detector 115 is long, sizes of optical components between the objective lens optical system 107 and the second optical detector 115 must be dramatically increased.

In consideration thereof, the second collimator lens 113 is arranged at a position where light outputted from the second collimator lens 113 becomes a convergent light. The light outputted from the second light source 111 is incident to the objective lens optical system 107 as a convergent light. Accordingly, a chromatic aberration due to the objective lens optical system 107 can be corrected, and since the optical components between the objective lens optical system 107 and the second optical detector 115 can be downsized, the optical pickup can be downsized.

Moreover, in the present third embodiment, while a convergent light is formed due to a position of the second collimator lens 113, forming a convergent light using a convex lens by providing the convex lens between the second collimator lens 113 and the objective lens optical system 107 and first converting light into a parallel light by the second collimator lens 113 is also acceptable.

While the objective lens optical system 107 is inclined based on a radial tilt signal and a tangential tilt signal in the present third embodiment, for example, a method of inclining the optical recording medium 108 by providing the motor unit with a tilting mechanism or a method of inclining the entire optical pickup by providing the shaft section that supports the entire optical pickup with a tilting mechanism is also perfectly acceptable.

According to the present third embodiment, even with a multilayered optical recording medium, a relative inclination angle between a surface of the optical recording medium 108 and an emission end face of the solid immersion lens 107b can be reliably and accurately detected and the solid immersion lens 107b can be prevented from colliding with the surface of the optical recording medium 108. As a result, in addition to reliably recording and reproducing information, the risk of damaging the important optical recording medium can be reduced.

Moreover, while the second optical detector 115 has a four-fraction light receiving section in order to detect inclinations in both a radial direction and a tangential direction in the present third embodiment, the second optical detector 115 may alternatively have a two-fraction light receiving section and detect an inclination in only a radial direction or only a tangential direction. In this case, since adjustment of the optical detector need only be performed in one axis direction, adjustment becomes easier and reliability of the optical pickup increases.

In addition, while an astigmatic method has been exemplified as a focus detection method and a push-pull method has been exemplified as a tracking detection method in the present third embodiment, such methods are not restrictive and these detection methods may be combined with other detection methods.

Furthermore, while the optical pickup according to the present third embodiment comprises the analyzer 114 which transmits linearly-polarized light in a given direction of polarization and which absorbs linearly-polarized light in a direction perpendicular to the linearly-polarized light in the given direction, the optical pickup may alternatively comprise a polarizing hologram which transmits linearly-polarized light in a given direction of polarization and which diffracts linearly-polarized light in a direction perpendicular to the linearly-polarized light in the given direction or a polarizing beam splitter which transmits linearly-polarized light in a given direction of polarization and which reflects linearly-polarized light in a direction perpendicular to the linearly-polarized light in the given direction. Unnecessary linearly-polarized light can be prevented from being incident to the second optical detector 115 using any optical element among an analyzer, a polarizing hologram, and a polarizing beam splitter.

Moreover, while a film which reflects light outputted from the first light source 101 and which transmits light outputted from the second light source 111 is formed on the analyzer 114 in the present third embodiment, a film having this property may alternatively be provided on an optical component positioned between the second beam splitter 105 and the second optical detector 115 or an optical component having this property may be separately provided. In addition, a light incidence plane of the optical component on which is formed the film having the property described above is favorably inclined with respect to a plane perpendicular to an optical axis. Accordingly, since an incident reflected light proceeds in a direction that differs from an optical axis direction, unnecessary stray light can be prevented from being incident to the second optical detector 115.

Figure 25:
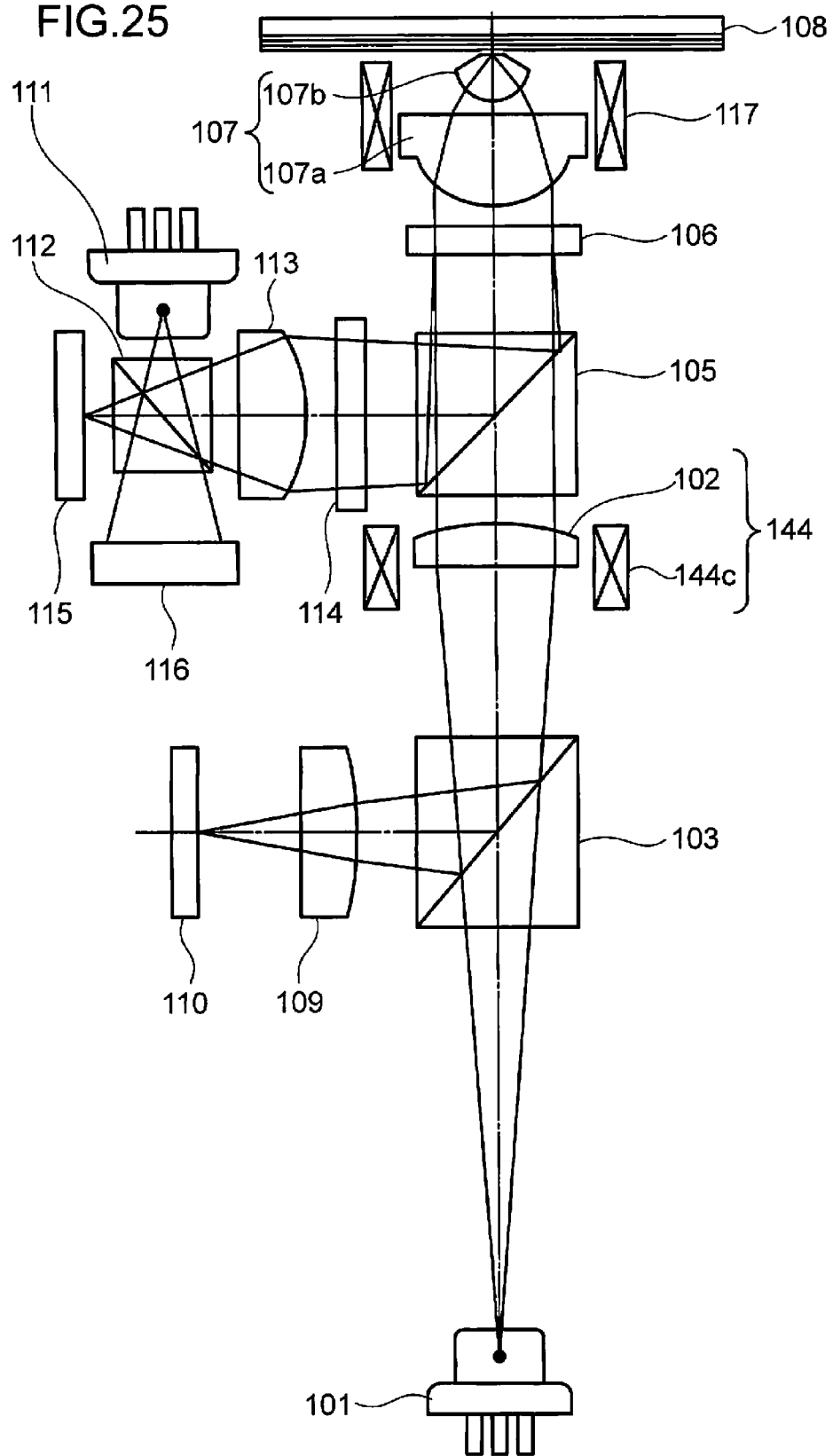
FIG. 25 is a diagram showing a configuration of an optical pickup according to a modification of the third embodiment of the present invention.

FIG. 25 is a diagram showing a configuration of an optical pickup according to a modification of the third embodiment of the present invention. In FIG. 25, components with the same functions as those of the third embodiment are denoted by same reference characters. While the emittance modifying unit 104 is constituted by two lenses, namely, the concave lens 104a and the convex lens 104b, and the actuator 104c in the present third embodiment, alternatively configuring an emittance modifying unit 144 with the first collimator lens 102 and an actuator 144c as shown in FIG. 25 is also perfectly acceptable.

The first collimator lens 102 is arranged between the first beam splitter 103 and the second beam splitter 105 and converts light from the first light source 101 into a parallel light. The actuator 144c moves the first collimator lens 102 in an optical axis direction according to a position of a recording layer on which light is focused.

In this case, the emittance modifying unit 144 concurrently functions as a collimator lens. Therefore, the number of constituents of the optical components is reduced and assembly of the optical pickup becomes easier, which results in reducing cost of the optical pickup.

Figure 26A:
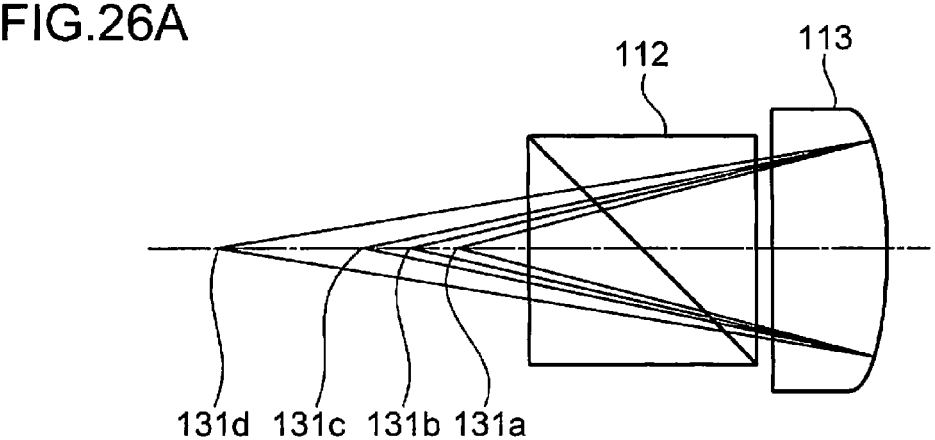
FIG. 26A is a diagram showing a spot position of light focused on a second optical detector from a second collimator lens according to the third embodiment.

FIG. 26A is a diagram showing a spot position of light focused on the second optical detector 115 from the second collimator lens 113 according to the third embodiment.

Let us assume that light outputted from the second light source 111 is reflected by the emission end face of the solid immersion lens 107b and is focused on a spot position 131d. Now, for example, assuming that the optical recording medium 108 has three recording layers, the light outputted from the second light source 111 is also respectively reflected by the three recording layers and is therefore focused at three spot positions 131a, 131b, and 131c in addition to the spot position 131d.

In other words, in the present third embodiment, the optical recording medium 108 comprises three recording layers which include, in an ascending order of proximity to a light incidence side, a first recording layer L0, a second recording layer L1, and a third recording layer L2. In this case, the spot position 131a is a spot position where light outputted from the second light source 111 and reflected by the first recording layer L0 is focused. In addition, the spot position 131b is a spot position where light outputted from the second light source 111 and reflected by the second recording layer L1 is focused. Furthermore, the spot position 131c is a spot position where light outputted from the second light source 111 and reflected by the third recording layer L2 is focused.

As described above, even with a configuration in which light outputted from the second light source 111 is not transmitted through the emittance modifying unit 104, when the optical recording medium 108 has a plurality of recording layers, a plurality of spot positions 131a, 131b, 131c, and 131d exist.

In consideration thereof, the second optical detector 115 is favorably arranged in a vicinity of the spot position 131d where light reflected by the emission end face of the solid immersion lens 107b is focused as shown in FIG. 26A.

Accordingly, a spot of light outputted from the second light source 111 and reflected by the emission end face of the solid immersion lens 107b becomes smaller than a light receiving section of the second optical detector 115 and all reflected light from the emission end face of the solid immersion lens 107b can now be received by the light receiving section.

In contrast, the reflected light from the recording layers which is respectively focused at the spot positions 131a, 131b, and 131c become spots that are significantly large with respect to the light receiving section of the second optical detector 115.

Therefore, output from the light receiving section of light outputted from the second light source 111 and reflected by the respective recording layers becomes significantly small. In other words, a signal outputted from the second optical detector 115 substantially becomes a signal due to light which is outputted by the second light source 111 and which is reflected by the emission end face of the solid immersion lens 107b.

Furthermore, the second optical detector 115 is favorably arranged at a position further away from the second collimator lens 113 than the spot position 131d shown in FIG. 26A.

Accordingly, a spot of light outputted from the second light source 111 and reflected by the emission end face of the solid immersion lens 107b becomes smaller than the light receiving section of the second optical detector 115 and is able to assume an optimum size.

Figure 26B:
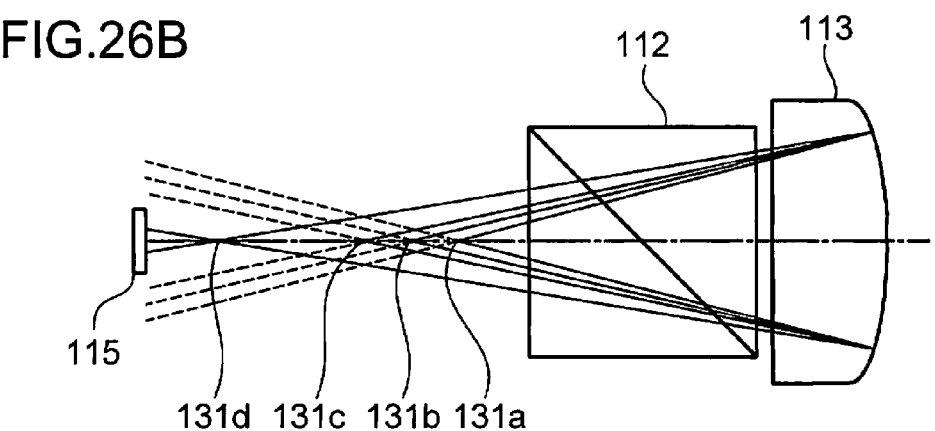
FIG. 26B is a diagram showing a configuration of the second optical detector in a case where the second optical detector is arranged at a position more separated from the second collimator lens than a spot position at which light reflected by an emission end plane of a solid immersion lens focuses according to the third embodiment.
Figure 26C:
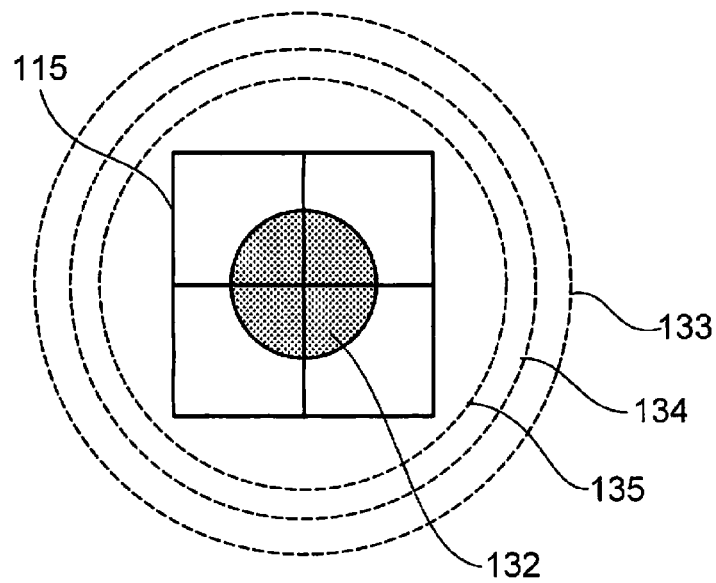
FIG. 26C is a diagram showing spots on the second optical detector shown in FIG. 26B.

FIG. 26B is a diagram showing a configuration of the second optical detector 115 in a case where the second optical detector 115 is arranged at a position further away from the second collimator lens 113 than the spot position 131d at which light reflected by the emission end face of the solid immersion lens 107b is focused according to the third embodiment. FIG. 26C is a diagram showing spots on the second optical detector 115 shown in FIG. 26B.

As shown in FIG. 26C, a spot 132 on the second optical detector 115 of light outputted from the second light source 111 and reflected by the emission end face of the solid immersion lens 107b can be fitted into the light receiving section of the second optical detector 115. In addition, spots 133, 134, and 135 on the second optical detector 115 of light outputted from the second light source 111 and reflected by the respective recording layers can be further increased with respect to the light receiving section of the second optical detector 115.

Moreover, the spot 133 represents a spot on the second optical detector 115 of light reflected by the first recording layer L0, the spot 134 represents a spot on the second optical detector 115 of light reflected by the second recording layer L1, and the spot 135 represents a spot on the second optical detector 115 of light reflected by the third recording layer L2.

Accordingly, the effect of light outputted from the second light source 111 and reflected by the respective recording layers on the light receiving section of the second optical detector 115 can be further reduced. In other words, light outputted from the second light source 111 and reflected by the emission end face of the solid immersion lens 107b can be detected with higher accuracy.

Moreover, while the optical recording medium 108 has three recording layers In the present third embodiment, the structure of the optical recording medium 108 is not limited thereto. The optical recording medium 108 may have two or more recording layers.

(Fourth Embodiment)

Next, an optical pickup according to a fourth embodiment of the present invention will be described with respect to the drawings.

Figure 27:
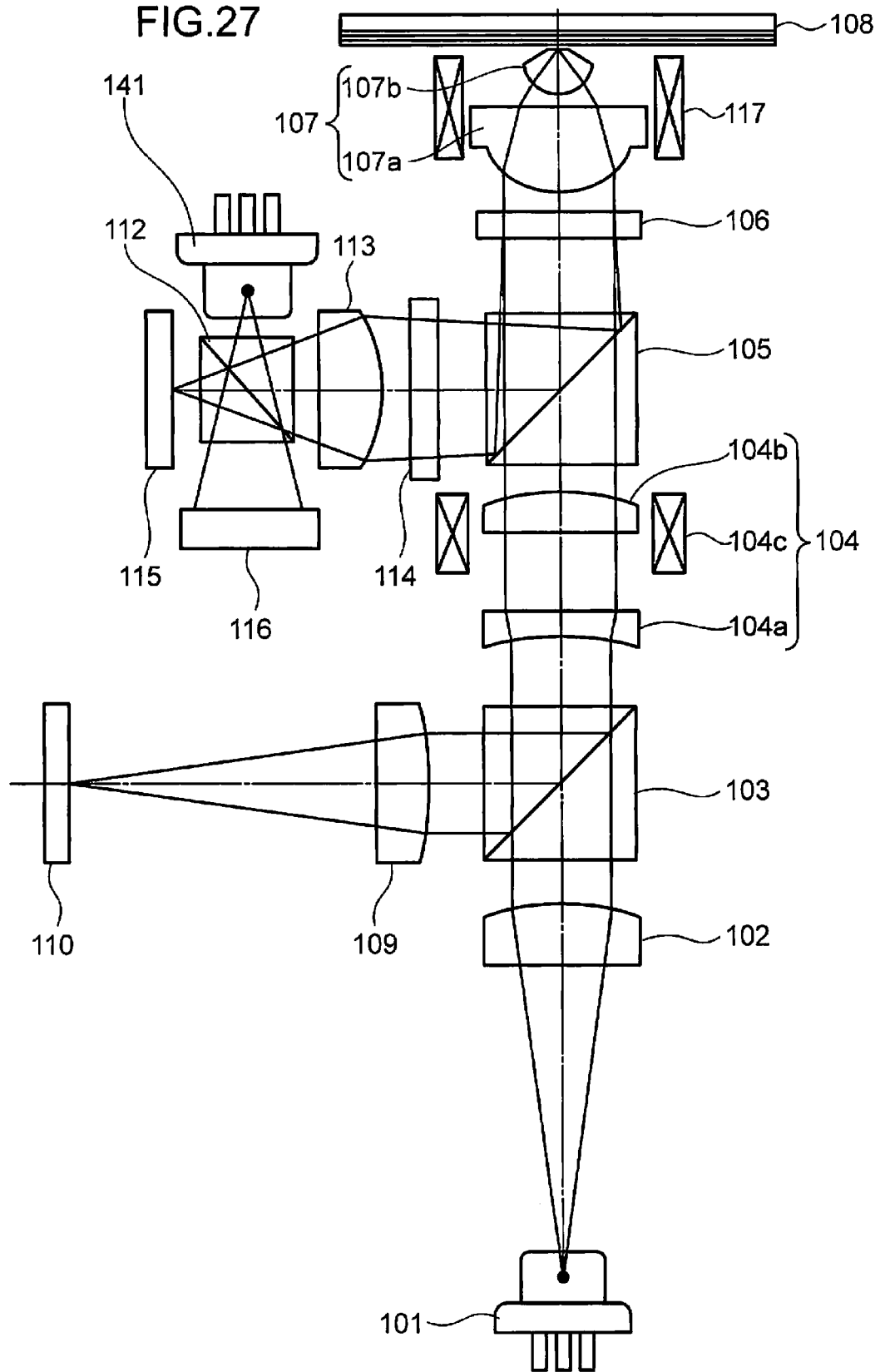
FIG. 27 is a diagram showing a configuration of an optical pickup according to a fourth embodiment of the present invention.

FIG. 27 is a diagram showing a configuration of an optical pickup according to the fourth embodiment of the present invention.

The present fourth embodiment only differs from the third embodiment described above in that a wavelength of light outputted from a second light source 141 is the same as the wavelength of light outputted from the first light source 101. Otherwise, the present fourth embodiment is the same as the third embodiment. Therefore, in the present fourth embodiment, it is assumed that components not particularly described are the same as those in the third embodiment and, unless specifically described, it is assumed that components denoted by same reference characters as used in the third embodiment have similar functions as their counterparts in the third embodiment.

In the present fourth embodiment, the wavelength of light outputted from the first light source 101 and the wavelength of light outputted from the second light source 141 are the same. Therefore, with a polarization property of a beam splitter or an analyzer, light outputted from the first light source 101 and reflected by an emission end face of the solid immersion lens 107b and light outputted from the second light source 141 and reflected by the emission end face of the solid immersion lens 107b cannot be separated from each other.

In consideration thereof, the two lights are separated from each other using a difference between a degree of emittance of light outputted from the first light source 101 and incident to the objective lens optical system 107 and a degree of emittance of light outputted from the second light source 141 and incident to the objective lens optical system 107.

Figure 28A:
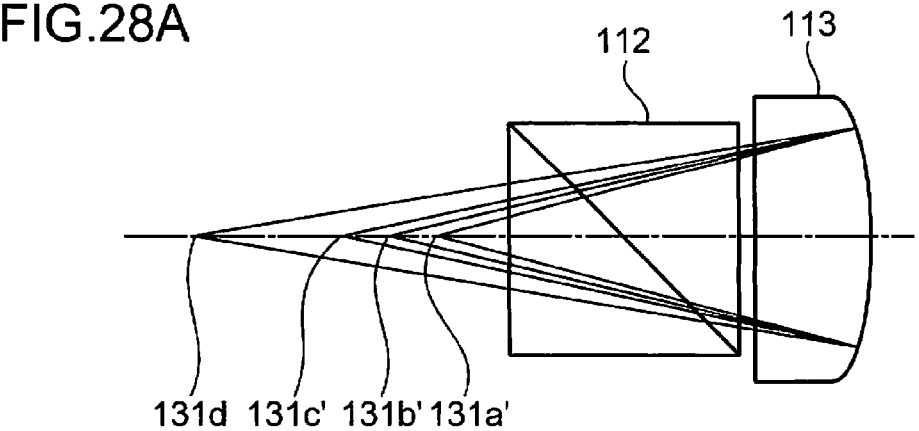
FIG. 28A is a diagram showing a spot position of light focused on a second optical detector from a second collimator lens according to the fourth embodiment.

This method will now be described in detail with reference to FIGS. 28A to 28C. FIG. 28A is a diagram showing a spot position of light focused on the second optical detector 115 from the second collimator lens 113 according to the fourth embodiment.

In the present fourth embodiment, the optical recording medium 108 has three recording layers. In this case, light outputted from the first light source 101 is focused on three spot positions 131a', 131b', and 131c' according to a position of the emittance modifying unit 104 corresponding to respective recording layers of the optical recording medium 108.

In other words, in the present fourth embodiment, the optical recording medium 108 comprises three recording layers which include, in an ascending order of proximity to a light incidence side, a first recording layer L0, a second recording layer L1, and a third recording layer L2. In this case, the spot position 131a' is a spot position where light outputted from the first light source 101 and reflected by the emission end face of the solid immersion lens 107b is focused in a case where the light outputted from the first light source 101 is focused on the first recording layer L0. In addition, the spot position 131b' is a spot position where light outputted from the first light source 101 and reflected by the emission end face of the solid immersion lens 107b is focused in a case where the light outputted from the first light source 101 is focused on the second recording layer L1. Furthermore, the spot position 131c' is a spot position where light outputted from the first light source 101 and reflected by the emission end face of the solid immersion lens 107b is focused in a case where the light outputted from the first light source 101 is focused on the third recording layer L2.

Since light outputted from the second light source 141 is not transmitted through the emittance modifying unit 104, the light is focused at a spot position 131d that differs from the spot positions 131a', 131b', and 131c' regardless of the recording layers.

In consideration thereof, the second optical detector 115 is favorably arranged in a vicinity of the spot position 131d where light reflected by the emission end face of the solid immersion lens 107b is focused as shown in FIG. 28A.

Accordingly, a spot of light outputted from the second light source 141 and reflected by the emission end face of the solid immersion lens 107b becomes smaller than a four-fraction light receiving section of the second optical detector 115 and all reflected light from the emission end face of the solid immersion lens 107b can now be received by the four-fraction light receiving section. Light outputted from the first light source 101 and reflected by the emission end face of the solid immersion lens 107b becomes a significantly large spot with respect to the light receiving section of the second optical detector 115.

Therefore, output from the light receiving section of light outputted from the first light source 101 and reflected by the emission end face of the solid immersion lens 107b becomes significantly small. In other words, a signal outputted from the second optical detector 115 substantially becomes a signal due to light which is outputted by the second light source 141 and which is reflected by the emission end face of the solid immersion lens 107b.

Furthermore, the second optical detector 115 is favorably arranged at a position further away from the second collimator lens 113 than the spot position 131d shown in FIG. 28A.

Accordingly, a spot of light outputted from the second light source 141 and reflected by the emission end face of the solid immersion lens 107b becomes smaller than the four-fraction light receiving section of the second optical detector 115 and is able to assume an optimum size.

Figure 28B:
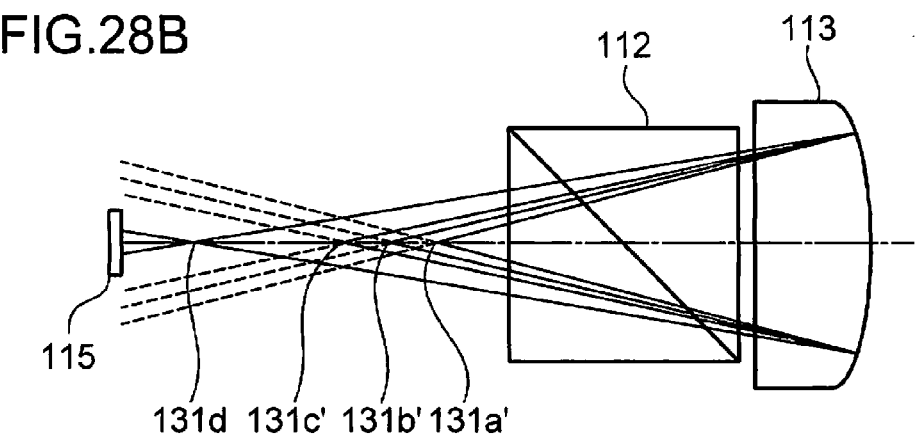
FIG. 28B is a diagram showing a configuration of the second optical detector in a case where the second optical detector is arranged at a position more separated from the second collimator lens than a spot position at which light reflected by an emission end plane of a solid immersion lens focuses according to the fourth embodiment.

FIG. 28B is a diagram showing a configuration of the second optical detector 115 in a case where the second optical detector 115 is arranged at a position further away from the second collimator lens 113 than the spot position 131d at which light reflected by the emission end face of the solid immersion lens 107b is focused according to the fourth embodiment. FIG. 28C is a diagram showing a spot on the second optical detector 115 shown in FIG. 28B.

Figure 28C:
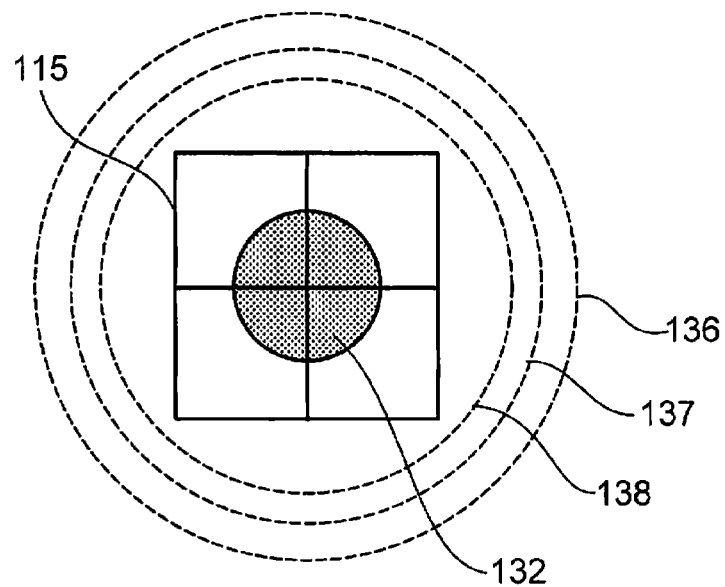
FIG. 28C is a diagram showing spots on the second optical detector shown in FIG. 28B.

As shown in FIG. 28C, a spot 132 on the second optical detector 115 of light outputted from the second light source 141 and reflected by the emission end face of the solid immersion lens 107b can be fitted into the light receiving section of the second optical detector 115. In addition, spots 136, 137, and 138 on the second optical detector 115 of light outputted from the first light source 101 and reflected by the emission end face of the solid immersion lens 107b can be further increased with respect to the light receiving section of the second optical detector 115.

Moreover, the spot 136 is a spot on the second optical detector 115 of light outputted from the first light source 101 and reflected by the emission end face of the solid immersion lens 107b in a case where the light outputted from the first light source 101 is focused on the first recording layer L0, the spot 137 is a spot on the second optical detector 115 of light outputted from the first light source 101 and reflected by the emission end face of the solid immersion lens 107b in a case where the light outputted from the first light source 101 is focused on the second recording layer L1, and the spot 138 is a spot on the second optical detector 115 of light outputted from the first light source 101 and reflected by the emission end face of the solid immersion lens 107b in a case where the light outputted from the first light source 101 is focused on the third recording layer L2.

Accordingly, the effect of light outputted from the first light source 101 and reflected by the emission end face of the solid immersion lens 107b on the light receiving section of the second optical detector 115 can be further reduced. In other words, light outputted from the second light source 141 and reflected by the emission end face of the solid immersion lens 107b can be detected with higher accuracy.

In addition, as already described in the third embodiment, the effect of light outputted from the second light source 141 and reflected by the respective recording layers on the light receiving section of the second optical detector 115 can also be further reduced.

According to the present fourth embodiment, even when the wavelength of light outputted from the second light source 141 is the same as the wavelength of light outputted from the first light source 101, a relative inclination angle between a surface of the multilayered optical recording medium 108 and the emission end face of the solid immersion lens 107b can be reliably and accurately detected using an output from the second optical detector 115, and the solid immersion lens 107b can be prevented from colliding with the surface of the optical recording medium 108. As a result, in addition to reliably recording and reproducing information, the risk of damaging the important optical recording medium can be reduced.

In addition, since only a single wavelength is used, the number of layers of a film configuration of a beam splitter that is a branch section is reduced and a permissible amount of variation in film thickness further increases. Therefore, since a beam splitter which is readily produced at low cost can be used, an inexpensive optical pickup can be realized.

Moreover, while the optical recording medium 108 according to the present fourth embodiment has three recording layers, the optical recording medium 108 may alternatively have two or more recording layers. By using the optical pickup according to the present fourth embodiment, information can be reliably recorded onto or information can be reliably reproduced from the optical recording medium having two or more recording layers.

Mounting a metallic needle having minute protrusions on the emission end face of the solid immersion lens 107b causes a further minute near-field light to be outputted from the metallic needle, whereby recording density can be further increased using the near-field light. By mounting the metallic needle in this manner on the optical pickup shown in the present third and fourth embodiments, information can be recorded at a higher density and information recorded at a higher density can be reproduced, and information can be recorded onto or information can be reproduced from a multilayered optical recording medium in an even more reliable manner.

(Fifth Embodiment)

Figure 29A:
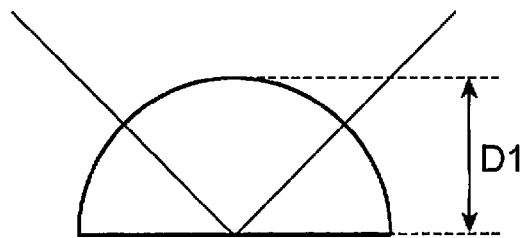
FIG. 29A is a diagram showing a cross-sectional shape of an objective lens including a hemispherical lens.
Figure 29B:
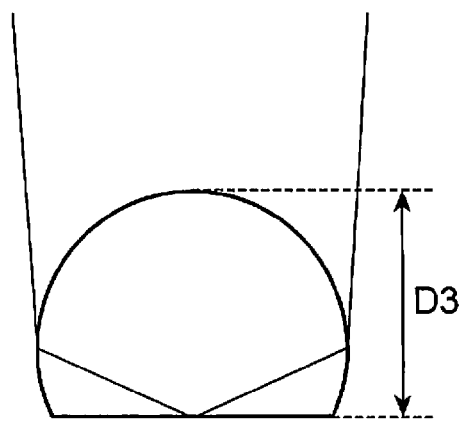
FIG. 29B is a diagram showing a cross-sectional shape of an objective lens including a hyper-hemispherical lens.

An objective lens used for near-field optical recording/reproduction will now be described. FIG. 29A is a diagram showing a cross-sectional shape of an objective lens including a hemispherical lens, and FIG. 29B is a diagram showing a cross-sectional shape of an objective lens including a hyper-hemispherical lens. There are two types of objective lenses used for near-field optical recording/reproduction according to a thickness of a solid immersion lens included in the objective lens: a hemispherical lens (with a thickness of D1 in an optical axis direction) shown in FIG. 29A; and a hyper-hemispherical lens (with a thickness of D3 in an optical axis direction) shown in FIG. 29B. The thicknesses of the hemispherical lens and the hyper-hemispherical lens are both thicknesses at which an aplanatic point without a spherical aberration is formed.

Next, features of objective lenses having a hemispherical lens and a hyper-hemispherical lens will be described. First, an objective lens having a hemispherical lens has an issue of a relatively low numerical aperture. If n denotes a refractive index of a medium of an optical recording medium and $\theta$ denotes a maximum angle of incident light with respect to an optical axis, then a numerical aperture NA of an objective lens having a hemispherical lens can be defined by $NA = n \cdot \sin\theta$. In contrast, a numerical aperture NA of an objective lens having a hyper-hemispherical lens can be defined by $NA = n^2 \cdot \sin\theta$.

Therefore, compared to an objective lens having a hemispherical lens, an objective lens having a hyper-hemispherical lens has a larger numerical aperture and therefore offers an advantage in near-field optical recording/reproduction. However, a permissible amount of a hyper-hemispherical lens with respect to a deviation in thickness is significantly smaller than that of a hemispherical lens. Therefore, although an objective lens having a hyper-hemispherical lens is advantageous in that the numerical aperture can be increased, manufacturing tolerance is stringent and productivity is low. In contrast, although a hemispherical lens offers high productivity, there is an issue that the numerical aperture cannot be increased as much as an objective lens having a hyper-hemispherical lens.

Figure 30:
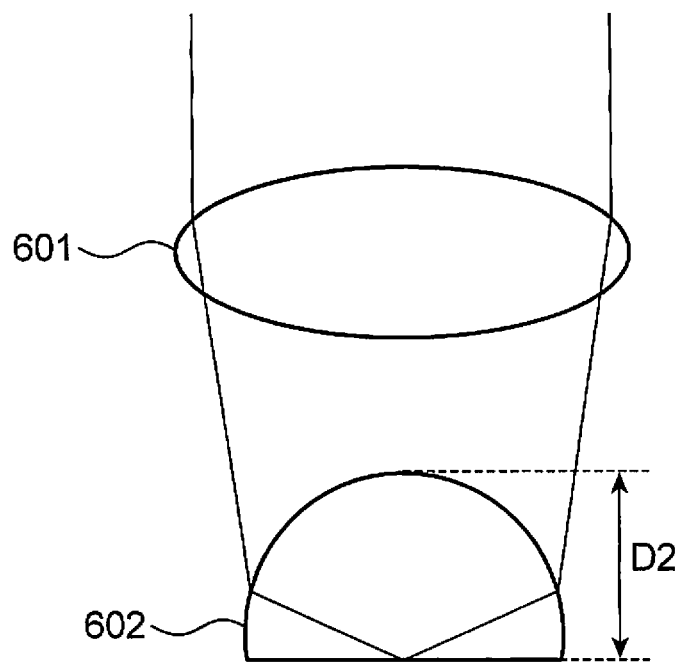
FIG. 30 is a diagram showing a configuration of a conventional objective lens.
Figure 31:
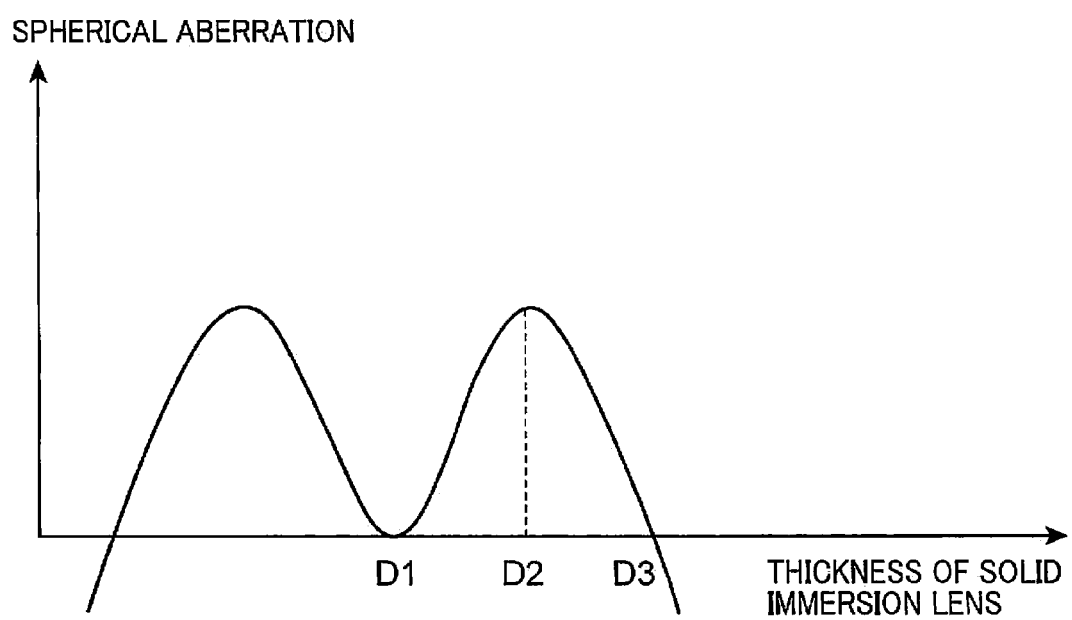
FIG. 31 is a diagram showing a variation in a spherical aberration of an objective lens according to a thickness of a solid immersion lens.

In consideration thereof, an objective lens that solves these issues is proposed in Japanese Translation of PCT Application No. 2009-522712. FIG. 30 is a diagram showing a configuration of a conventional objective lens. The objective lens shown in FIG. 30 is constituted by a condensing lens 601, and a solid immersion lens 602 having a thickness of D2. FIG. 31 is a diagram showing a variation in a spherical aberration of the objective lens according to a thickness of the solid immersion lens. The spherical aberration of solid immersion lenses with thicknesses of D1 and D3 is zero. By setting the thickness D2 of the solid immersion lens 602 used in the objective lens shown in FIG. 30 to an intermediate thickness between the thickness D1 and the thickness D3, the respective features of the hemispherical lens and the hyper-hemispherical lens described above can be combined. Although a spherical aberration occurs, since the spherical aberration created due to deviation of the thickness of the solid immersion lens from a hemispherical shape and a hyper-hemispherical shape can be corrected by imparting a spherical aberration to the condensing lens 601 itself, the entire objective lens has a spherical aberration of zero.

However, with a conventional configuration, since the thickness D2 of the solid immersion lens has an extremely wide range from the thickness D1 of the hemispherical lens to the thickness D3 of the hyper-hemispherical lens, the following issues arise. First, when the thickness is close to a hemispherical shape, a reflected light from an incidence plane of the solid immersion lens and a reflected light from an emission plane of the solid immersion lens pass through approximately a same optical path. As a result, there is an issue of light overlapping on a light receiver which receives light and converts the light into a signal, resulting in significant interference and, in turn, resulting in deterioration of reproduction signals. In addition, increasing the thickness of the solid immersion lens has an issue in that a significant coma aberration occurs when light is incident from an angle and similarly causes deterioration of reproduction signals.

In consideration thereof, the optical pickup according to the fifth embodiment of the present invention reduces the effect of interference between a reflected light from an incidence plane and a reflected light from an emission plane of the solid immersion lens, and suppresses the generation of a coma aberration even when light is incident from an angle to the solid immersion lens.

Figure 32:
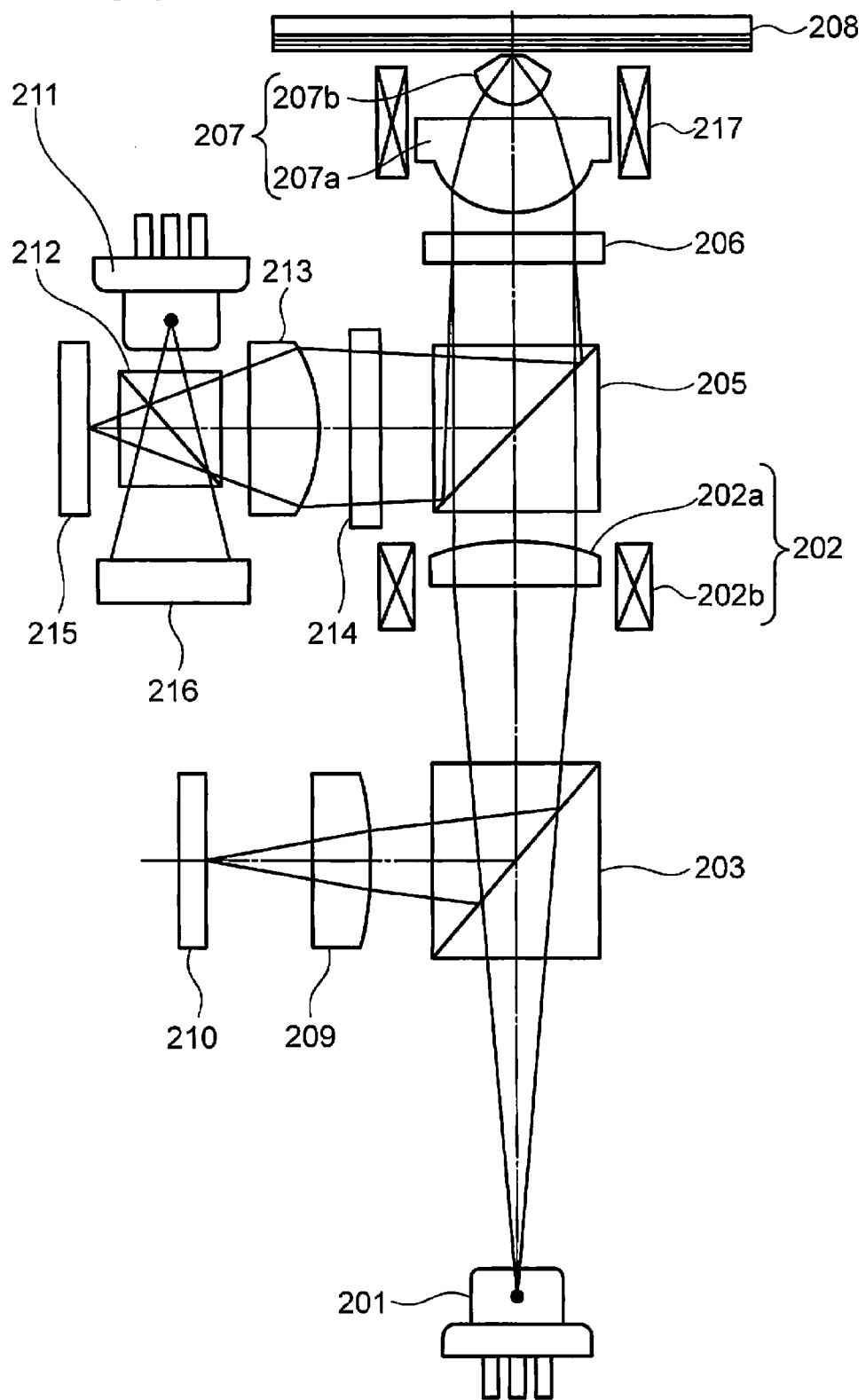
FIG. 32 is a diagram showing a configuration of an optical pickup according to a fifth embodiment of the present invention.

FIG. 32 is a diagram showing a configuration of the optical pickup according to the fifth embodiment of the present invention.

In FIG. 32, the optical pickup comprises a first light source 201, an emittance modifying unit 202, a first beam splitter 203, a second beam splitter 205, a quarter wavelength plate 206, an objective lens optical system 207, a detection lens 209, a first optical detector 210, a second light source 211, a third beam splitter 212, a second collimator lens 213, an analyzer 214, a second optical detector 215, a third optical detector 216, and an objective lens actuator 217.

The emittance modifying unit 202 is constituted by a first collimator lens 202a and an actuator 202b that moves the first collimator lens 202a in an optical axis direction. The objective lens optical system 207 is constituted by a diaphragm lens 207a and a solid immersion lens 207b. The first beam splitter 203 is an example of a first branch section and the second beam splitter 205 is an example of a second branch section. A detection system which focuses light reflected by a recording layer of the optical recording medium 208 on the first optical detector is constituted by the first collimator lens 202a and the detection lens 209.

In this case, the first light source 201 is constituted by, for example, a GaN-based semiconductor laser element and outputs a coherent light (with a wavelength of 390 to 450 nm) for recording or reproduction to the recording layer of the optical recording medium 208.

The first collimator lens 202a is a convex lens having positive power which modifies an emittance of a divergent light outputted from the first light source 201. The emittance modifying unit 202 is constituted by the first collimator lens 202a having positive power and the actuator 202b that moves the first collimator lens 202a in the optical axis direction. By varying a spacing between the first light source 201 and the first collimator lens 202a using the actuator 202b, the emittance modifying unit 202 is able to convert an emittance of the incident light into a different emittance. By varying the emittance, focus control can be performed.

The first beam splitter 203 reflects light outputted from the first light source 201 and reflected by the recording layer of the optical recording medium 208. The first beam splitter 203 has a property such that a given linearly-polarized light has a transmittance of 100% and a linearly-polarized light perpendicular to the given linearly-polarized light has a reflectance of 100%.

Light outputted from the second light source 211 is incident to the second beam splitter 205, and the second beam splitter 105 reflects light reflected by an end face of the solid immersion lens 207b. The second beam splitter 205 has a property such that, with respect to a wavelength of light outputted from the first light source 201, a given linearly-polarized light has a transmittance of 90% and a reflectance of 10% and a linearly-polarized light perpendicular to the given linearly-polarized light has a transmittance of 100%, and with respect to a wavelength of light outputted from the second light source 211, all polarized light has a reflectance of 100%.

The quarter wavelength plate 206 is formed of a birefringent material and converts a linearly-polarized light into a circularly-polarized light.

The objective lens optical system 207 comprises the solid immersion lens 207b and a diaphragm lens 207a which focuses light from the first light source 201 on the solid immersion lens 207b, and converges light from the first light source 201 on the recording layer of the optical recording medium 208. The objective lens optical system 207 is constituted by the diaphragm lens 207a and the solid immersion lens 207b. An air gap that exists between an emission end face of the solid immersion lens 207b and a surface of the optical recording medium 208, the surface opposing the emission end face, enables light propagation in the form of evanescent light to be performed shorter than an evanescent attenuation length. A gap spacing is set shorter than approximately ¹⁄₁₀ of the wavelength.

The end face of the solid immersion lens 207b, the end face opposing the optical recording medium 208, has a coned peripheral shape.

The detection lens 209 has an incidence plane that is a cylindrical surface and an emission plane that is a rotationally-symmetrical surface with respect to an optical axis of the lens. The detection lens 209 imparts an astigmatism to an incident light which enables detection of a focus error signal according to a so-called astigmatic method.

The first optical detector 210 receives light reflected by the recording layer of the optical recording medium 208 and converts the received light into an electrical signal. The first optical detector 210 receives light focused by the detection lens 209 and outputs an electrical signal according to a quantity of received light.

The second light source 211 is a semiconductor laser light source which outputs light in a wavelength range of 640 nm to 680 nm. A wavelength of light outputted from the first light source 201 and a wavelength of light outputted from the second light source 211 differ from each other. The third beam splitter 212 is an unpolarizing beam splitter having a property such that transmittance is 50% and reflectance is 50%. The second collimator lens 213 is a lens that modifies an emittance of light outputted from the second light source 211. The analyzer 214 is an optical element which transmits linearly-polarized light in a given direction of polarization and which absorbs linearly-polarized light in a direction perpendicular to the linearly-polarized light in the given direction.

The second optical detector 215 receives light outputted from the second light source 211 and reflected by the emission end face of the solid immersion lens 207b, and converts the received light into an electrical signal. The second optical detector 215 receives light reflected by the second beam splitter 205 and outputs an electrical signal according to a quantity of received light. The second optical detector 215 outputs an electrical signal for detecting a distance between the end face of the solid immersion lens 207b and the surface of the optical recording medium 208.

In addition, the second optical detector 215 has at least two light receiving sections. The second optical detector 215 outputs an electrical signal for detecting a relative inclination angle between the end face of the solid immersion lens 207b and the surface of the optical recording medium 208.

The third optical detector 216 receives light outputted from the second light source 211 and converts the received light into an electrical signal in order to monitor the quantity of light outputted from the second light source 211.

Operations of the optical pickup configured in this manner will now be described.

The first light source 201 outputs a linearly-polarized light. The light outputted from the first light source 201 is transmitted through the first beam splitter 203 and has its emittance modified by the first collimator lens 202a. The light whose emittance is modified by the first collimator lens 202a is transmitted through the second beam splitter 205 and is incident to the quarter wavelength plate 206. The quarter wavelength plate 206 converts the incident linearly-polarized light into a circularly-polarized light. Light transmitted through the quarter wavelength plate 206 is focused by the objective lens optical system 207 on the recording layer of the optical recording medium 208.

Light reflected by the optical recording medium 208 is transmitted through the objective lens optical system 207, the quarter wavelength plate 206, the second beam splitter 205, and the first collimator lens 202a, and is incident to the first beam splitter 203. Light reflected by the first beam splitter 203 is incident to the detection lens 209. The light incident to the detection lens 209 is imparted with an astigmatism. Light transmitted through the detection lens 209 is focused on the first optical detector 210.

The first optical detector 210 outputs a focus error signal indicating an in-focus state of light on the optical recording medium 208. In addition, the first optical detector 210 outputs a tracking error signal indicating an irradiation position of light on the optical recording medium 208.

At this point, the focus error signal and the tracking error signal are detected by a known technique such as an astigmatic method and a push-pull method. In addition, based on the focus error signal from the first optical detector 210, a focus control unit (not shown) drives the actuator 202b to control a position of the first collimator lens 202a in the optical axis direction so that light is always focused on the optical recording medium 208 in an in-focus state. In other words, the actuator 202b moves the first collimator lens 202a in the optical axis direction according to a control signal from the focus control unit.

Furthermore, based on the tracking error signal from the first optical detector 210, a tracking control unit (not shown) drives the objective lens actuator 217 to control a position of the objective lens optical system 207 so that light is focused on a desired track on the optical recording medium 208. In other words, the objective lens actuator 217 moves the objective lens optical system 207 according to a control signal from the tracking control unit. Moreover, based on an electrical signal from the first optical detector 210, a reproduction control unit (not shown) acquires reproduction information recorded on the optical recording medium 208.

In addition, the second light source 211 outputs a linearly-polarized light. The light outputted from the second light source 111 is reflected by the third beam splitter 212 and has its emittance modified by the second collimator lens 213. Light transmitted through the second collimator lens 213 is transmitted through the analyzer 214, reflected by the second beam splitter 205, and is incident to the quarter wavelength plate 206.

The quarter wavelength plate 206 converts the incident linearly-polarized light into a circularly-polarized light. Light transmitted through the quarter wavelength plate 206 is incident to the objective lens optical system 207 and is reflected by the emission end face of the solid immersion lens 207b.

The light reflected by the emission end face of the solid immersion lens 207b is transmitted through the objective lens optical system 207 and the quarter wavelength plate 206 and is reflected by the second beam splitter 205. The light reflected by the second beam splitter 205 is transmitted through the analyzer 214, the second collimator lens 213, and the third beam splitter 212, and is focused on the second optical detector 215.

Figure 33:
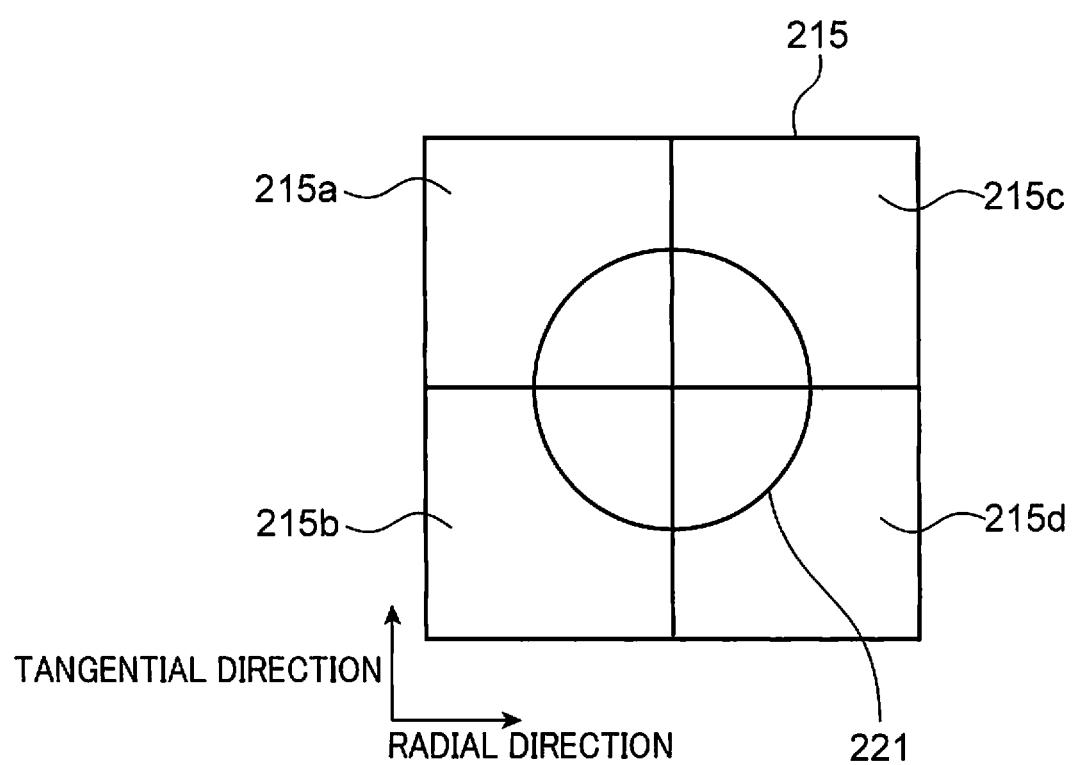
FIG. 33 is a diagram showing a configuration of a second optical detector shown in FIG. 32.

FIG. 33 is a diagram showing a configuration of the second optical detector shown in FIG. 32. The second optical detector 215 has a four-fraction light receiving section (a first light receiving section 215a, a second light receiving section 215b, a third light receiving section 215c, and a fourth light receiving section 215d) shown in FIG. 33, and a detailed description thereof is already provided in Patent Literature 1 and therefore will be omitted. The second optical detector 215 receives a reflected light 221 that is reflected by the emission end face of the solid immersion lens 207b. By adding up all signals from the four-fraction light receiving section (the first light receiving section 215a, the second light receiving section 215b, the third light receiving section 215c, and the fourth light receiving section 215d), a spacing (a gap signal) of an air gap is detected which exists between the emission end face of the solid immersion lens 207b and the surface of the optical recording medium 208, the surface opposing the emission end face.

In addition, based on a difference signal between a summation signal of the first light receiving section 215a and the second light receiving section 215b and a summation signal of the third light receiving section 215c and the fourth light receiving section 215d of the four-fraction light receiving section, a relative inclination (a radial tilt signal) with respect to a radial direction of the optical recording medium 208 is detected between the emission end face of the solid immersion lens 207b and the surface of the optical recording medium 208, the surface opposing the emission end face. Furthermore, based on a difference signal between a summation signal of the first light receiving section 215a and the third light receiving section 215c and a summation signal of the second light receiving section 215b and the fourth light receiving section 215d of the four-fraction light receiving section, a relative inclination (a tangential tilt signal) with respect to a tangential direction of the optical recording medium 208 is detected between the emission end face of the solid immersion lens 207b and the surface of the optical recording medium 208, the surface opposing the emission end face.

Based on the gap signal from the second optical detector 215, a gap control unit (not shown) controls the objective lens optical system 207 so as to keep a constant spacing between the emission end face of the solid immersion lens 207b and the surface of the optical recording medium 208, the surface opposing the emission end face.

In addition, based on the radial tilt signal and the tangential tilt signal from the second optical detector 215, a tilt control unit (not shown) controls the objective lens optical system 207 so that a relative angle becomes zero between the emission end face of the solid immersion lens 207b and the surface of the optical recording medium 208, the surface opposing the emission end face.

Furthermore, the third optical detector 216 receives a part of light outputted from the second light source 211. Based on a signal outputted from the third optical detector 216, a light quantity control unit (not shown) monitors a quantity of emission light from the second light source 211 and controls the second light source 211 so that the quantity of light outputted from the second light source 211 becomes constant.

Light outputted from the first light source 201 and the second light source 211 and reflected by the optical recording medium 208 will now be described in greater detail.

First, light outputted from the first light source 201 is focused on the optical recording medium 208 and reflected by the recording layer of the optical recording medium 208. The light reflected by the recording layer of the optical recording medium 208 is converted by the quarter wavelength plate 206 into a linearly-polarized light in a direction that is perpendicular to light outputted from the first light source 201. The linearly-polarized light converted by the quarter wavelength plate 206 is 100%-transmitted through the second beam splitter 205, 100%-reflected by the first beam splitter 203, and received by the first optical detector 210.

In addition, since the spacing between the emission end face of the solid immersion lens 207b and the surface of the optical recording medium 208 is not zero, a part of the light outputted from the first light source 201 is reflected by the emission end face of the solid immersion lens 207b.

The light reflected by the emission end face of the solid immersion lens 207b is converted by the quarter wavelength plate 206 into a linearly-polarized light in a same direction of polarization as the light outputted from the first light source 201. 90% of the linearly-polarized light converted by the quarter wavelength plate 206 is transmitted through the second beam splitter 205 and 10% of the linearly-polarized light is reflected by the second beam splitter 205. Transmitted light of the second beam splitter 205 is 100%-transmitted through the first beam splitter 203 and is therefore not incident to the first optical detector 210.

At this point, if light reflected by the second beam splitter 205 reaches the second optical detector 215, detection of the gap signal and the tilt signal is obstructed. For this reason, a film which reflects light outputted from the first light source 201 and which transmits light outputted from the second light source 211 and having a wavelength that differs from the light outputted from the first light source 201 is formed on a surface of the analyzer 214 on the side of the objective lens optical system. Accordingly, light outputted from the first light source 201 is prevented from reaching the second optical detector 215.

Next, among light outputted from the second light source 211, the reflected light from the optical recording medium 208 is converted by the quarter wavelength plate 206 into a linearly-polarized light in a direction that is perpendicular to the light outputted from the second light source 211. The linearly-polarized light is 100%-reflected by the second beam splitter 205 and 100%-absorbed by the analyzer 214. Accordingly, light outputted from the second light source 211 and reflected by the optical recording medium 208 is prevented from reaching the second optical detector 215.

In addition, since the spacing between the emission end face of the solid immersion lens 207b and the surface of the optical recording medium 208 is not zero, a part of the light outputted from the second light source 211 is reflected by the emission end face of the solid immersion lens 207b.

The reflected light from the emission end face of the solid immersion lens 207b passes through the quarter wavelength plate 206 and is then converted into a linearly-polarized light in a same direction of polarization as the light outputted from the second light source 211. Therefore, the reflected light from the emission end face of the solid immersion lens 207b is 100%-reflected by the second beam splitter 205 and is 100%-transmitted through the analyzer 214. As a result, only light which is outputted by the second light source 211 and which is reflected by the emission end face of the solid immersion lens 207b is received by the second optical detector 215.

Next, light outputted from the second collimator lens 213 will be described.

A wavelength of light outputted from the second light source 211 is longer than a wavelength of light outputted from the first light source 201. Therefore, when the objective lens optical system 207 is designed such that light outputted from the first light source 201 is focused on the recording layer of the optical recording medium 208, light outputted from the second light source 211 which has a longer wavelength than light outputted from the first light source 201 is significantly defocused due to a chromatic aberration of the objective lens optical system 207.

As a result, when light outputted from the second light source 211 is converted into a parallel light and then incident to the objective lens optical system 207, light reflected by the emission end face of the solid immersion lens 207b returns with a significantly large spot size. Therefore, when a distance between the objective lens optical system 207 and the second optical detector 215 is long, sizes of optical components between the objective lens optical system 207 and the second optical detector 215 must be dramatically increased.

In consideration thereof, the second collimator lens 213 is arranged at a position where light outputted from the second collimator lens 213 becomes a convergent light. The light outputted from the second light source 211 is incident to the objective lens optical system 207 as a convergent light. Accordingly, a chromatic aberration due to the objective lens optical system 207 can be corrected, and since the sizes of optical components between the objective lens optical system 207 and the second optical detector 215 need not be increased, the optical pickup can be downsized.

Moreover, in the present fifth embodiment, while a convergent light is formed due to a position of the second collimator lens 213, forming a convergent light using a convex lens by providing the convex lens between the second collimator lens 213 and the objective lens optical system 207 and first converting light into a parallel light by the second collimator lens 213 is also acceptable.

Figure 34:
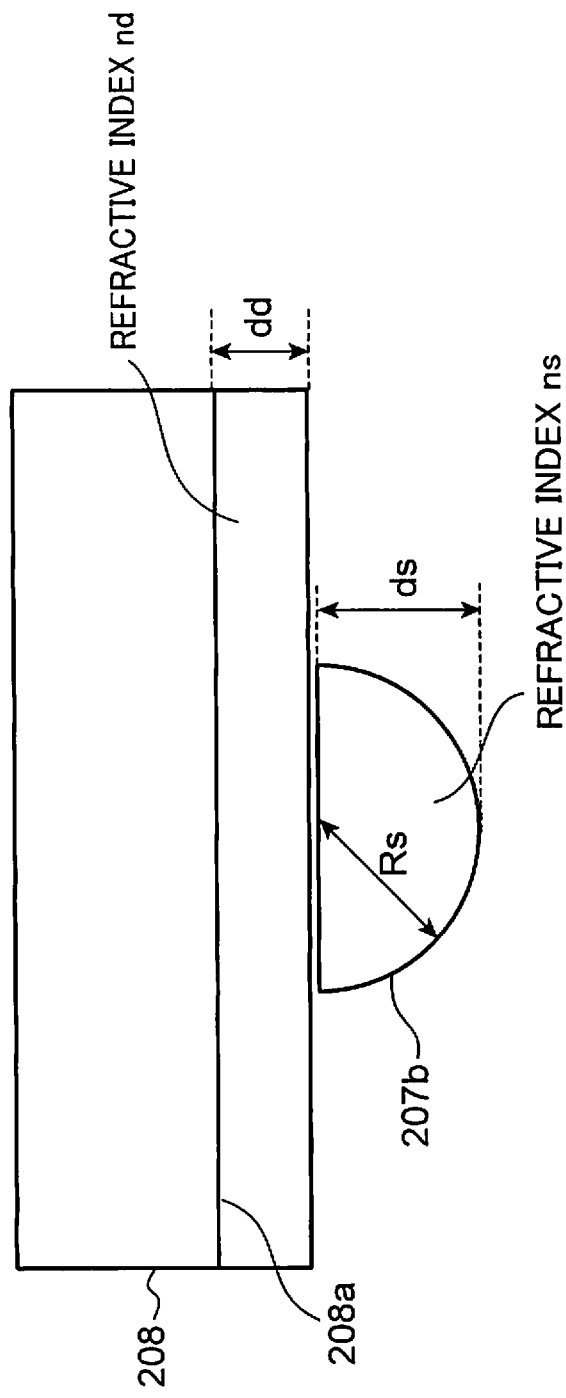
FIG. 34 is a diagram for explaining a thickness of a solid immersion lens according to the fifth embodiment of the present invention.

Next, a thickness of the solid immersion lens 207b constituting the objective lens optical system 207 will be described in detail. FIG. 34 is a diagram for explaining the thickness of the solid immersion lens 207b according to the fifth embodiment of the present invention.

First, let us assume that ds ($\mu$m) denotes the thickness, ns denotes a refractive index, and Rs ($\mu$m) denotes a radius of curvature of the solid immersion lens 207b, dd ($\mu$m) denotes a distance (a base material thickness) from the surface of the optical recording medium 208 to a recording layer 208a on which information is recorded, and nd denotes a refractive index of a layer interposed between the surface of the optical recording medium 208 and the recording layer 208a.

In this case, if dd=0 and ds=Rs, a center of the radius of curvature Rs coincides with the recording layer 208a, and the shape of the solid immersion lens 207b is a hemispherical shape that causes light to perpendicularly enter an incidence plane of the solid immersion lens 207b. In addition, in a case where the distance from the surface of the optical recording medium 208 to the recording layer 208a is not zero or, in other words, in a case where ns×(ds−Rs)+nd×dd=0, the center of the radius of curvature Rs similarly coincides with the recording layer 208a. Therefore, the solid immersion lens 207b assumes a hemispherical shape that causes light to perpendicularly enter the incidence plane of the solid immersion lens 207b. First, this condition will be considered.

As described above, the reflected light from the recording layer 208a of the optical recording medium 208 is incident to the first optical detector 210. In addition, since light is perpendicularly incident to the incidence plane of the solid immersion lens 207b, light reflected by the incidence plane of the solid immersion lens 207b proceeds along a same optical path as the reflected light from the recording layer 208a of the optical recording medium 208 and is incident to the first optical detector 210. Therefore, on the first optical detector 210, the light reflected by the incidence plane of the solid immersion lens 207b completely overlaps with the reflected light from the recording layer 208a of the optical recording medium 208.

In this case, an optical path difference between the reflected light from the recording layer 208a of the optical recording medium 208 and the light reflected by the incidence plane of the solid immersion lens 207b is twice the thickness of the solid immersion lens 207b and is significantly greater than the wavelength of light. Consequently, even the slightest variation in wavelength may cause interference of light on the first optical detector 210 and, in a worst condition, may result in total disappearance of a spot. Therefore, with the objective lens optical system 207 having the hemispherical solid immersion lens 207b described above, signal quality becomes significantly inferior. Now, the greater the value of ns×(ds−Rs)+nd×dd, the larger the spot on the first optical detector 210 of the light reflected by the incidence plane of the solid immersion lens 207b and the relatively smaller the overlapping with the reflected light from the recording layer 208a of the optical recording medium 208. Therefore, coherency declines and ceases to pose an issue. This condition will now be described in detail.

Japanese Patent Application Laid-open No. 2008-117513 describes a relationship between a thickness between recording layers of a multilayered optical recording medium having a plurality of recording layers and a jitter that is a signal reproduction index. According to the relationship described in Japanese Patent Application Laid-open No. 2008-117513, in a case where an objective lens has a focal distance of 2 mm and a numerical aperture NA of 0.85, and a detection system that focuses light on an optical detector has a focal distance of 30 mm (a lateral magnification from the objective lens to the detection system is 30/2=15), a reproduction signal assumes an acceptable level if an interlayer thickness of adjacent recording layers is 8 μm or greater. This means that as long as a distance between the respective recording layers is equal to or greater than 8 μm, interference of the reflected light from the respective recording layers does not pose an issue. In addition, interference is heavily dependent on a spot diameter on the optical detector.

Figure 35:
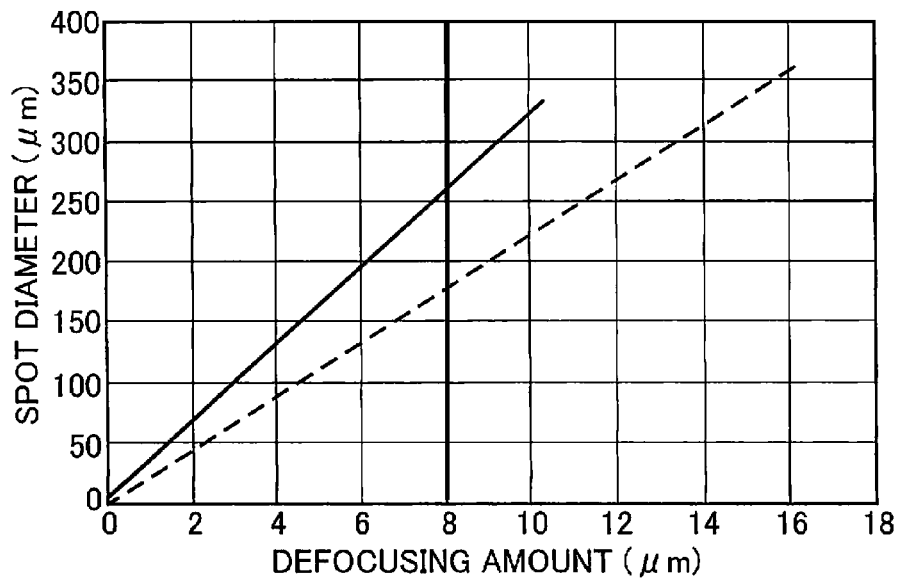
FIG. 35 is a diagram showing a relationship between a spot diameter on a first optical detector and a defocus amount on an optical recording medium according to the fifth embodiment of the present invention.

In consideration thereof, FIG. 35 shows a relationship between a spot diameter on an optical detector and a defocus amount on an optical recording medium in a case where an objective lens optical system used for near-field optical recording has a numerical aperture NA of 1.74 and a lateral magnification from the objective lens optical system to a detection system is 15 as well as a relationship between a spot diameter on the optical detector and a defocus amount on the optical recording medium in a case where the numerical aperture NA is 0.85 and the lateral magnification from the objective lens optical system to the detection system is 15. Moreover, a defocus amount on the optical recording medium is an amount obtained by multiplying a refractive index of a region from a surface to a recording layer of the optical recording medium by a difference between a distance from the surface of the optical recording medium to a focus position and a distance from the surface to the recording layer of the optical recording medium.

FIG. 35 is a diagram showing a relationship between a spot diameter on the first optical detector and a defocus amount on the optical recording medium according to the fifth embodiment of the present invention. In FIG. 35, a solid line represents a calculation result in the case where the numerical aperture NA is 1.74 and the lateral magnification from the objective lens optical system to the detection system is 15, and a dotted line represents a calculation result in the case where the numerical aperture NA is 0.85 and the lateral magnification from the objective lens optical system to the detection system is 15. Since a ratio of a spot diameter to the defocus amount under each condition is approximately 1.4, a spot area ratio is 2, which is equivalent to a ratio of the numerical aperture NA. In other words, even if the defocus amount is the same, the larger the numerical aperture NA, the smaller the influence of interference, which means that coherence is inversely proportional to the numerical aperture NA.

First, the following calculation is performed in a case where the numerical aperture NA is 0.85, an optical magnification is 15, and a refractive index of an intermediate layer among the recording layers is 1.62. In a case where a reflected light from a recording layer on which light is focused (a first layer) and a reflected light from a recording layer (a second layer) that differs from the recording layer on which light is focused are received on an optical detector and, in this state, the second layer varies within a range of ±0.5 μm, a maximum signal and a minimum signal outputted from the optical detector are respectively denoted as Vmax and Vmin. A relationship between (Vmax−Vmin)/(Vmax+Vmin) and a thickness (a base material thickness) of the second layer in this case is shown in FIG. 36.

Figure 36:
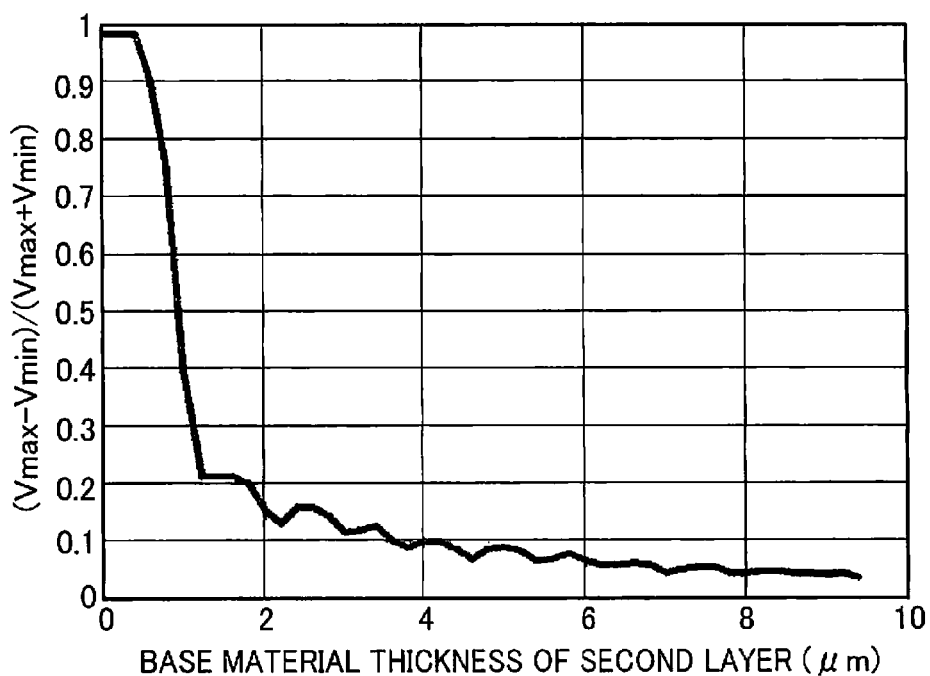
FIG. 36 is a diagram showing a relationship between a degree of interference between a reflected light from a first layer and a reflected light from a second layer and a base material thickness of the second layer on a conventional optical detector.

FIG. 36 is a diagram showing a relationship between a degree of interference between a reflected light from a first layer and a reflected light from a second layer, and a base material thickness of the second layer on a conventional optical detector. (Vmax−Vmin)/(Vmax+Vmin) is a parameter representing an amount of variation of a signal due to interference between the reflected light from the first layer and the reflected light from the second layer. When the intermediate layer has a thickness of 8 μm, (Vmax−Vmin)/(Vmax+Vmin) takes a value of 0.045. This means that a signal variation equal to or less than 0.045 does not cause deterioration of a reproduction signal.

Next, the following calculation is performed in a case where the numerical aperture NA is 1.74, an optical magnification is 15, and a refractive index of a solid immersion lens (SIL) is 2.07. In a case where a distance from the surface of the optical recording medium 208 to a recording layer is zero or, in other words, in a case where a recording layer is on the surface of the optical recording medium 208 and, in this state, a reflected light from an incidence plane and a reflected light from an emission plane of the solid immersion lens 207b are received on the first optical detector 210, a maximum signal and a minimum signal outputted from the first optical detector 210 when the wavelength of light outputted from the first light source 201 varies slightly are respectively denoted as Vmax and Vmin. A relationship between (Vmax−Vmin)/(Vmax+Vmin) and a deviation (ds−Rs) between a thickness ds and a radius of curvature Rs of the solid immersion lens is shown in FIG. 37.

Figure 37:
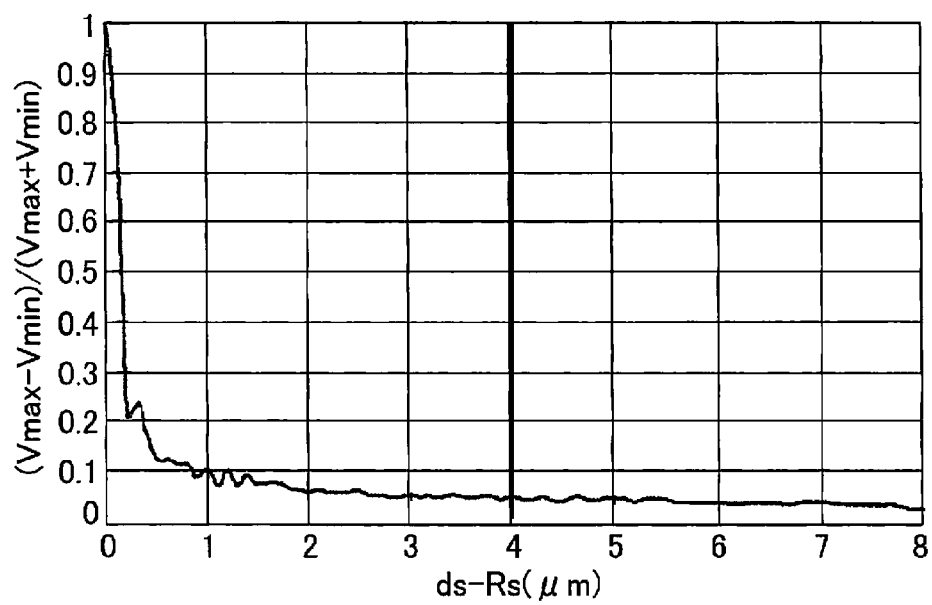
FIG. 37 is a diagram showing a relationship between a degree of interference between a reflected light from an incidence plane and a reflected light from an emission plane of a solid immersion lens on an optical detector and a deviation (ds−Rs) between a thickness ds and a radius of curvature Rs of the solid immersion lens according to the fifth embodiment of the present invention.

FIG. 37 is a diagram showing a relationship between a degree of interference between the reflected light from an incidence plane and the reflected light from an emission plane of a solid immersion lens on an optical detector and a deviation (ds−Rs) between a thickness ds and a radius of curvature Rs of the solid immersion lens according to the fifth embodiment of the present invention. As shown in FIG. 37, (Vmax−Vmin)/(Vmax+Vmin) is equal to or lower than 0.045 when the deviation (ds−Rs) is 3.1 μm.

Using a ratio of a refractive index of the intermediate layer of the optical recording medium, a refractive index of a solid immersion lens (SIL), and a numerical aperture NA described above, 8 μm is converted into 8×1.62/2.06/2=3.1 μm, thereby showing that a thickness with a same coherence is inversely proportional to the numerical aperture NA. In addition, since a spot diameter on a light receiving section is proportional to a lateral magnification from an objective lens optical system to a detection system, an area of a spot on the light receiving section is proportional to the square of the lateral magnification from the objective lens optical system to the detection system. In this case, since the effect of coherence when the defocus amount is the same becomes smaller as spot area increases, coherency is inversely proportional to the square of the lateral magnification from the objective lens optical system to the detection system.

From the above, if m denotes the lateral magnification from the objective lens optical system to the detection system, then an interference permissible value is equal to or lower than $8/(NA/0.85)/(m/15)^2$. Therefore, an interference permissible range is expressed by Expression (9) below.

$$ns \times (ds-Rs) + nd \times dd > 8/(NA/0.85)/(m/15)^2 \qquad (9)$$

Next, a tilt of the optical recording medium 208 will be considered. When the optical recording medium 208 itself is warped or a surface supporting the optical recording medium 208 is inclined, the optical recording medium 208 tilts with respect to the objective lens optical system 207. The amount of this tilt is around 0.3 deg at maximum.

With an optical system using the solid immersion lens 207b, light is propagated in the form of evanescent light. Therefore, a spacing between the solid immersion lens and the optical recording medium must be set sufficiently shorter than the wavelength of light (approximately 1/10 or less), which means that when using light with a wavelength of 405 nm, the spacing between the solid immersion lens and the optical recording medium must be kept to around 25 nm. However, when there is a relative inclination between the solid immersion lens 207b and the optical recording medium 208 in such a state with narrow spacing, an end of the solid immersion lens 207b and the optical recording medium 208 collide with each other. Therefore, a margin of error for inclination is extremely small. In consideration thereof, by machining a peripheral shape of an end face of the solid immersion lens 207b which faces the optical recording medium 208 so as to have a cone shape, a margin with respect to inclination is increased. However, when the peripheral shape of an emission end face of the solid immersion lens 207b is machined in a cone shape, if a diameter D of a tip of the solid immersion lens 207b is set to 40 μm and the gap spacing is set to 25 nm, then a permissible angle θ is calculated as around 0.07 from Expression (10) below.

$$\theta = \sin^{-1}(g/2D) \qquad (10)$$

However, as described above, the tilt of the optical recording medium 208 is 0.3 degrees at maximum and is greater than 0.07 degrees. Therefore, tilt detection is performed and the objective lens optical system 207 is inclined so as to become parallel with the optical recording medium 208. Accordingly, although the solid immersion lens 207b and the optical recording medium 208 can be prevented from colliding with each other, light is incident to the objective lens optical system 207 with an inclination of 0.3 degrees at maximum and causes a coma aberration.

This will be calculated using a lens described below. A definitional identity of an aspheric surface of a lens is expressed by Expression (11) below.

$$z = (y^2/R)/[1+\{1-(K+1)(y/R)^2\}^{0.5}] + A \cdot y^4 + B \cdot y^6 + C \cdot y^8 + D \cdot y^{10} + E \cdot y^{12} + F \cdot y^{14} + G \cdot y^{16} + H \cdot y^{18} + I \cdot y^{20} + J \cdot y^{22} + L \cdot y^{24} + M \cdot y^{26} \qquad (11)$$

In Expression (11) above, "z" denotes a distance from a surface vertex of an aspheric surface in a direction along an optical axis, "y" denotes a distance from the optical axis, "R" denotes a radius of curvature, "K" denotes a conic coefficient, and "A", "B", "C", "D", "E", "F", "G", "H", "I", "J", "L", and "M" denote aspheric surface coefficients.

Table 2 below shows lens data of an incidence plane and an emission plane of the diaphragm lens 207a constituting the objective lens optical system 207. In addition, the incident light has a wavelength of 405 nm, and the diaphragm lens 207a has a refractive index of 1.6239 and a thickness in an optical axis direction of 2.076187 mm. The solid immersion lens 207b has a refractive index of 2.0681 and a radius of curvature of 500 μm. A base material thickness of a recording layer of the reproduced optical recording medium 208 is 4 μm and a refractive index of a region between a surface of the optical recording medium 208 to the recording layer is 2.0.

TABLE 2

| | DIAPHRAGM LENS 207a | |
|---|---|---|
| | INCIDENCE PLANE | EMISSION PLANE |
| R | 1.217119E+00 | −3.472851E+00 |
| K | −5.423898E−01 | −2.287117E+02 |
| A | 9.864258E−03 | 9.412244E−02 |
| B | −9.660009E−04 | −7.048401E−02 |
| C | 1.517276E−03 | −2.578422E−02 |
| D | −2.728756E−04 | 2.107904E−02 |
| E | −2.198266E−05 | 2.834953E−02 |
| F | 8.616155E−05 | −5.128126E−03 |
| G | −8.717833E−06 | −2.644683E−02 |
| H | −1.838625E−05 | 2.742161E−03 |
| I | −5.440303E−06 | 8.259383E−03 |
| J | 7.537459E−07 | 4.205282E−03 |
| L | 2.493839E−06 | −3.976803E−03 |
| M | −1.266341E−06 | 0.000000E+00 |

Table 3 below shows a thickness of the solid immersion lens 207b, a distance between the diaphragm lens 207a and the solid immersion lens 207b, a reciprocal (1/cc) of an object point distance cc of light incident to the diaphragm lens 207a, an aperture diameter of light incident to the diaphragm lens 207a, and a numerical aperture NA of the objective lens optical system 207.

TABLE 3

| PATTERN | SIL THICKNESS (μm) | DISTANCE BETWEEN SIL AND DIAPHRAGM LENS (mm) | 1/cc (1/mm) | APERTURE DIAMETER (mm) | NA |
|---|---|---|---|---|---|
| 1 | 500 | 0.0900 | −4.7152E−04 | 2.93 | 1.738 |
| 2 | 510 | 0.0692 | −2.4136E−04 | 2.93 | 1.759 |
| 3 | 515 | 0.0589 | 0.0000E+00 | 2.93 | 1.768 |
| 4 | 530 | 0.0280 | 1.2903E−03 | 2.93 | 1.796 |
| 5 | 500 | 0.0903 | −3.5360E−04 | 2.64 | 1.570 |
| 6 | 510 | 0.0698 | −1.2615E−05 | 2.64 | 1.592 |
| 7 | 515 | 0.0589 | 0.0000E+00 | 2.64 | 1.602 |
| 8 | 530 | 0.0284 | 1.4464E−03 | 2.64 | 1.633 |
| 9 | 500 | 0.0906 | −2.6367E−04 | 2.3 | 1.369 |
| 10 | 510 | 0.0698 | −1.5331E−05 | 2.3 | 1.391 |

TABLE 3-continued

| PATTERN | SIL THICKNESS (μm) | DISTANCE BETWEEN SIL AND DIAPHRAGM LENS (mm) | 1/cc (1/mm) | APERTURE DIAMETER (mm) | NA |
|---|---|---|---|---|---|
| 11 | 515 | 0.0588 | 0.0000E+00 | 2.3 | 1.400 |
| 12 | 530 | 0.0287 | 1.5556E−03 | 2.3 | 1.432 |
| 13 | 500 | 0.0902 | −3.9818E−04 | 1.968 | 1.172 |
| 14 | 510 | 0.0699 | 0.0000E+00 | 1.968 | 1.192 |
| 15 | 515 | 0.0588 | 0.0000E+00 | 1.968 | 1.201 |
| 16 | 530 | 0.0287 | 1.5630E−03 | 1.968 | 1.234 |
| 17 | 500 | 0.0903 | −3.4886E−04 | 1.8006 | 1.070 |
| 18 | 510 | 0.0696 | −9.0926E−05 | 1.8006 | 1.092 |
| 19 | 515 | 0.0588 | 0.0000E+00 | 1.8006 | 1.100 |
| 20 | 530 | 0.0286 | 1.5367E−03 | 1.8006 | 1.131 |
| 21 | 500 | 0.0902 | −3.9636E−04 | 1.6898 | 1.006 |
| 22 | 510 | 0.0695 | −1.3220E−04 | 1.6898 | 1.025 |
| 23 | 515 | 0.0588 | 0.0000E+00 | 1.6898 | 1.033 |
| 24 | 530 | 0.0287 | 1.5589E−03 | 1.60132 | 1.006 |

With all of the lenses in 24 patterns shown in Table 3 above, defocusing and spherical aberration are approximately zero. A coma aberration that is created when light inclined by 0.3 degrees is incident to this objective lens optical system 207 was calculated. In addition, FIG. 38 shows a relationship between: a value obtained by multiplying a value, which is normalized by the radius of curvature Rs, of ns·(ds−Rs)+nd·dd which signifies a deviation from a hemispherical shape expressed by the thickness of the solid immersion lens 207b, the refractive index of the solid immersion lens 207b, the radius of curvature of the solid immersion lens 207b, the base material thickness of the optical recording medium 208, and the refractive index of the optical recording medium 208 by a value that is a 3.5th power of the numerical aperture NA of the objective lens optical system 207; and coma aberration.

Figure 38:
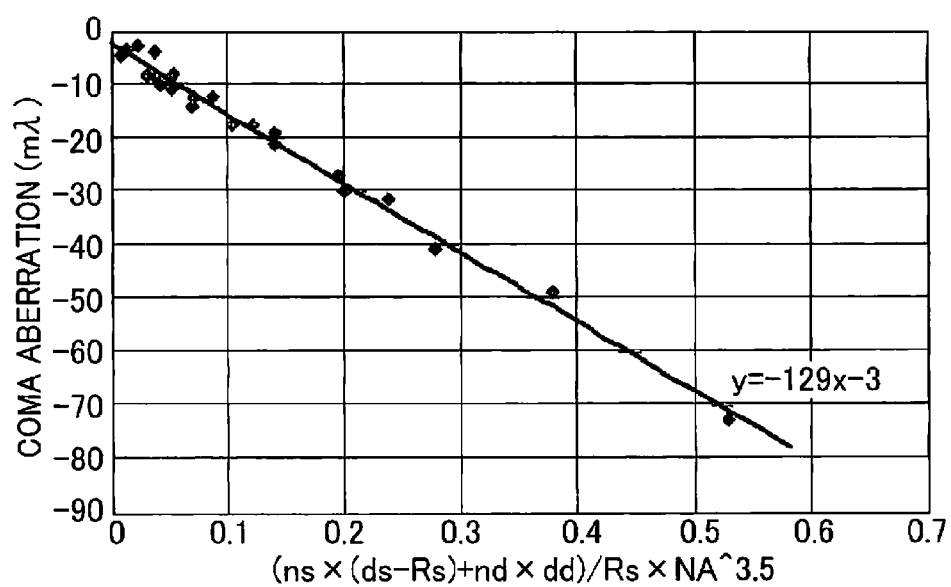
FIG. 38 is a diagram showing a relationship between a coma aberration generated when an incident light to an objective lens optical system is inclined by an angle of 0.3 deg and $(ns \times (ds-Rs)+nd \times dd)/Rs \times NA^{3.5}$ according to the fifth embodiment of the present invention.

FIG. 38 is a diagram showing a relationship between a coma aberration generated when an incident light to an objective lens optical system is inclined by an angle of 0.3 deg and $(ns \times (ds-Rs) + nd \times dd)/Rs \times NA^{3.5}$ according to the fifth embodiment of the present invention. From the graph shown in FIG. 38, a coma aberration (CM(0.405)) when light with a wavelength of 0.405 μm which is inclined by 0.3 degrees is incident to the objective lens optical system 207 is expressed by Expression (12) below.

$$CM(0.405) = -129 \times (ns \times (ds-Rs) + nd \times dd)/Rs \times NA^{3.5} - 3 \quad (12)$$

In this case, since coma aberration is inversely proportional to wavelength, a coma aberration CM(λ) for a wavelength of λ (μm) is expressed by Expression (13) below.

$$CM(\lambda) = \{-129 \times (ns \times (ds-Rs) + nd \times dd)/Rs \times NA^{3.5} - 3\} \times (0.405/\lambda) \quad (13)$$

Since an aberration which indicates a spot performance of an optical pickup causes significant deterioration of a reproduction signal when exceeding 70 mλ that is the Marechal criterion, the coma aberration described above must be 70 mλ or less. Therefore, the thickness of the solid immersion lens 207b must satisfy Expression (14) below.

$$\{-129 \times (ns \times (ds-Rs) + nd \times dd)/Rs \times NA^{3.5} - 3\} \times (0.405/\lambda) < 70 \quad (14)$$

As long as Expression (14) above is satisfied, reproduction signal quality does not deteriorate even if the objective lens optical system 207 follows the inclination of the optical recording medium 208.

Next, a case where the optical recording medium 208 is a multilayered optical recording medium having a plurality of recording layers will be considered. Let us assume that base material thicknesses from the surface of the optical recording medium 208 to the respective recording layers are 1 μm, 4 μm, and 7 μm, and an object point position is a position where defocusing and a spherical aberration become zero when the base material thickness is 4 μm. In other words, the state shown in Table 3 is considered, and when the base material thickness changes, a defocus component is removed by varying a distance between the diaphragm lens 207a and the solid immersion lens 207b while keeping the object point position fixed. Moreover, the objective lens actuator 217 varies the distance between the diaphragm lens 207a and the solid immersion lens 207b by moving the diaphragm lens 207a in the optical axis direction.

Table 4 below shows a distance between the diaphragm lens 207a and the solid immersion lens 207b for setting a defocus component to zero and a residual third-order spherical aberration when the base material thickness is changed to 1 μm or 7 μm with respect to each of the 24 patterns shown in Table 3.

TABLE 4

| PATTERN | BASE MATERIAL THICKNESS (μm) | DISTANCE BETWEEN SIL AND DIAPHRAGM LENS (mm) | THIRD-ORDER SPHERICAL ABERRATION (mλ) |
|---|---|---|---|
| 1 | 1 | 0.0967 | −19.8 |
|   | 7 | 0.0833 | 19.5 |
| 2 | 1 | 0.0761 | −16.5 |
|   | 7 | 0.0623 | 16.2 |
| 3 | 1 | 0.0659 | −14.6 |
|   | 7 | 0.0518 | 14.1 |
| 4 | 1 | 0.0354 | −8 |
|   | 7 | 0.0205 | 7.7 |
| 5 | 1 | 0.0969 | −8.7 |
|   | 7 | 0.0837 | 8.3 |
| 6 | 1 | 0.0767 | −3.1 |
|   | 7 | 0.0629 | 9.2 |
| 7 | 1 | 0.0658 | −9.6 |
|   | 7 | 0.0518 | −0.2 |
| 8 | 1 | 0.0357 | −0.3 |
|   | 7 | 0.0209 | −0.4 |
| 9 | 1 | 0.0971 | −3.6 |
|   | 7 | 0.0839 | 3.3 |
| 10 | 1 | 0.0766 | −2.3 |
|   | 7 | 0.0629 | 1.9 |
| 11 | 1 | 0.0658 | −5.6 |
|   | 7 | 0.0518 | −3 |
| 12 | 1 | 0.0360 | 1.2 |
|   | 7 | 0.0212 | −1.7 |
| 13 | 1 | 0.0967 | −2.6 |
|   | 7 | 0.0836 | 0.3 |

TABLE 4-continued

| PATTERN | BASE MATERIAL THICKNESS (μm) | DISTANCE BETWEEN SIL AND DIAPHRAGM LENS (mm) | THIRD-ORDER SPHERICAL ABERRATION (mλ) |
|---|---|---|---|
| 14 | 1 | 0.0767 | −0.6 |
|    | 7 | 0.0630 | 0.8 |
| 15 | 1 | 0.0658 | −2.4 |
|    | 7 | 0.0518 | −1.8 |
| 16 | 1 | 0.0361 | 1 |
|    | 7 | 0.0212 | −1.3 |
| 17 | 1 | 0.0968 | −1 |
|    | 7 | 0.0837 | 0.8 |
| 18 | 1 | 0.0764 | −0.5 |
|    | 7 | 0.0627 | 0.3 |
| 19 | 1 | 0.0657 | −1.2 |
|    | 7 | 0.0518 | −0.9 |
| 20 | 1 | 0.0360 | 0.8 |
|    | 7 | 0.0211 | −0.9 |
| 21 | 1 | 0.0967 | −0.7 |
|    | 7 | 0.0836 | 0.6 |
| 22 | 1 | 0.0763 | −0.3 |
|    | 7 | 0.0626 | 0.2 |
| 23 | 1 | 0.0657 | −0.7 |
|    | 7 | 0.0518 | −0.6 |
| 24 | 1 | 0.0361 | 0.5 |
|    | 7 | 0.021203 | −0.6 |

Figure 39:
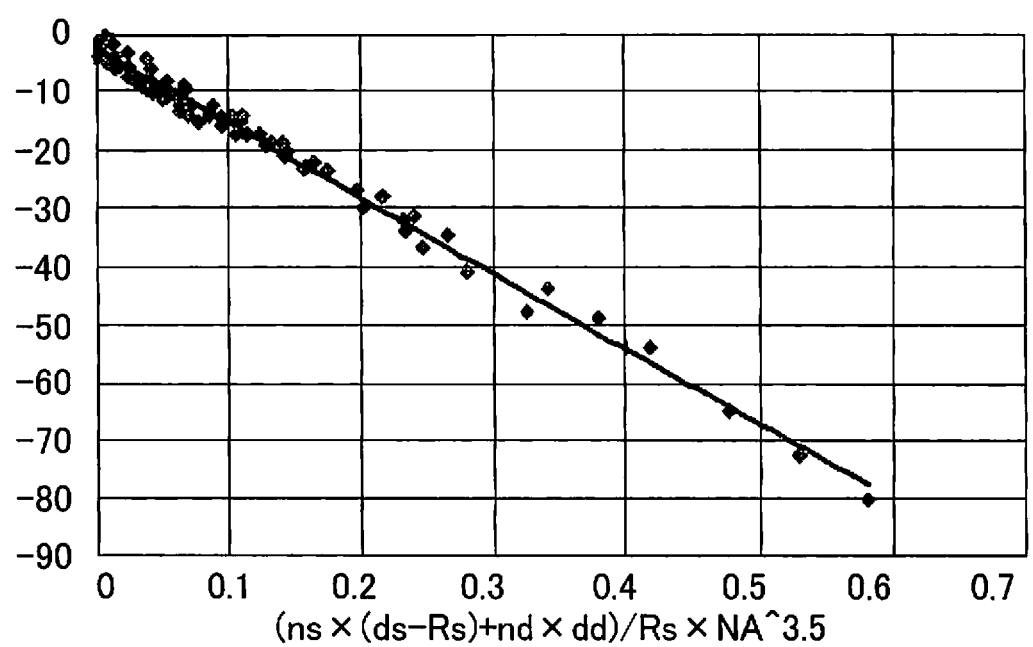
FIG. 39 is a diagram showing a relationship between a coma aberration generated when an optical recording medium is a multilayered optical recording medium and an incident light to an objective lens optical system is inclined by an angle of 0.3 deg and $(ns \times (ds-Rs)+nd \times dd)/Rs \times NA^{3.5}$ according to the fifth embodiment of the present invention.

As shown in Table 4, since the spherical aberration is smaller than 70 mλ that is the Marechal criterion, the optical pickup according to the present embodiment is capable of accommodating multilayered optical recording media. This means that defocusing can be removed by varying the distance between the diaphragm lens 207a and the solid immersion lens 207b for each of the recording layers and that information can be reproduced or recorded in a state where the spherical aberration is sufficiently small. In addition, a coma aberration was calculated when light is incident at an angle of 0.3 degrees in a case where the distance between the diaphragm lens 207a and the solid immersion lens 207b is varied to set defocusing to zero in correspondence to each recording layer for the lenses of 24 patterns shown in Table 3. FIG. 39 shows a graph created by using $(ns \times (ds-Rs) + nd \times dd)/Rs \times NA^{3.5}$ described above as a parameter and by adding the calculated coma aberration to the graph shown in FIG. 38.

FIG. 39 is a diagram showing a relationship between a coma aberration generated when an optical recording medium is a multilayered optical recording medium and an incident light to an objective lens optical system is inclined by an angle of 0.3 deg and $(ns \times (ds-Rs) + nd \times dd)/Rs \times NA^{3.5}$ according to the fifth embodiment of the present invention.

As shown in FIG. 39, a coma aberration is expressed by Expression (12) above, and even in a case where a multilayered optical recording medium is accommodated, reproduction signal quality does not deteriorate even if the objective lens optical system 207 follows the inclination of the optical recording medium 208 as long as Expression (14) above is satisfied. Furthermore, since defocusing and spherical aberration can be reduced for each of the recording layers by varying the distance between the solid immersion lens 207b and the diaphragm lens 207a, focus control can be performed without having to use the emittance modifying unit 202.

Therefore, by controlling the entire objective lens optical system 207 in the optical axis direction according to a gap signal, controlling the distance between the solid immersion lens 207b and the diaphragm lens 207a according to a focus error signal, controlling the entire objective lens optical system 207 in the radial direction according to a tracking error signal, and controlling the angle of the entire objective lens optical system 207 according to a radial tilt signal and a tangential tilt signal, information can be reliably recorded onto or reliably reproduced from a multilayered optical recording medium.

In addition, while focus control is performed using the emittance modifying unit 202 in the present fifth embodiment, focus control can be performed without using the emittance modifying unit 202 by varying the distance between the solid immersion lens 207b and the diaphragm lens 207a described above.

Next, control of light quantity of the first light source 201 will be described. Light outputted from the first light source 201 is transmitted through the first beam splitter 203 and the first collimator lens 202a and is incident to the second beam splitter 205. The second beam splitter 205 transmits 90% and reflects 10% of the incident light. Light reflected by the second beam splitter 205 is received by an optical detector (not shown). Based on a signal outputted from an optical detector (not shown), a light quantity control unit (not shown) monitors a quantity of light outputted from the first light source 201 and controls the first light source 201 so that the quantity of light outputted from the first light source 201 becomes constant.

As described above, the objective lens optical system and the optical pickup according to the present fifth embodiment are primarily configured as described below.

Specifically, the optical pickup according to the present embodiment is an optical pickup that records information onto or reproduces information from an optical recording medium, and comprises: a first light source; an objective lens optical system including a solid immersion lens and a diaphragm lens that focuses light on the solid immersion lens; a first branch section which reflects light outputted from the first light source and reflected by a recording layer of the optical recording medium; a detection optical system which focuses light reflected by the recording layer of the optical recording medium and reflected by the first branch section; and a first optical detector which receives light focused by the detection optical system and which outputs an electrical signal according to the quantity of received light. In this case, a distance between an end face of the solid immersion lens and a surface of an optical recording medium is kept at a distance which enables an evanescent light to be propagated and which is shorter than 1/10 of a wavelength of light outputted from the first light source. In addition, a thickness of the solid immersion lens satisfies Expressions (15) and (16) below.

$$ns \times (ds-Rs) + nd \times dd > 8/(NA/0.85)/(m/15)^2 \quad (15)$$

$$\{-129 \times (ns \times (ds-Rs) + nd \times dd)/Rs \times NA^{3.5} - 3\} \times (0.405/\lambda) < 70 \quad (16)$$

In Expressions (15) and (16), ns denotes a refractive index of the solid immersion lens, ds denotes a thickness (μm) of the solid immersion lens, Rs denotes a radius of curvature (μm) of the solid immersion lens, nd denotes a refractive index of a region between a surface and a recording layer of the optical recording medium, dd denotes a distance (μm) between the surface and the recording layer of the optical recording medium, NA denotes a numerical aperture of the objective lens optical system, m denotes a lateral magnification from the objective lens optical system to a detection system, and λ denotes a wavelength (μm) of light outputted from the first light source.

In addition, the objective lens optical system according to the present fifth embodiment is an objective lens optical system mounted on an optical pickup that records information onto or reproduces information from an optical recording medium, and comprises: a solid immersion lens; and a diaphragm lens that focuses light from a light source on the solid immersion lens. In this case, a distance between an end face of the solid immersion lens and a surface of an optical recording medium is kept at a distance which enables an evanescent light to be propagated and which is shorter than 1/10 of a wavelength of light outputted from the light source. In addition, a thickness of the solid immersion lens in this case satisfies Expressions (17) and (18) below.

$$ns \times (ds-Rs) + nd \times dd > 8/(NA/0.85)/(m/15)^2 \quad (17)$$

$$\{-129 \times (ns \times (ds-Rs) + nd \times dd)/Rs \times NA^{3.5} - 3\} \times (0.405/\lambda) < 70 \quad (18)$$

In Expressions (17) and (18), ns denotes a refractive index of the solid immersion lens, ds denotes a thickness ds (μm) of the solid immersion lens, Rs denotes a radius of curvature (μm) of the solid immersion lens, nd denotes a refractive index of a region between a surface and a recording layer of the optical recording medium, dd denotes a distance (μm) between the surface and the recording layer of the optical recording medium, NA denotes a numerical aperture of the objective lens optical system, m denotes a lateral magnification from the objective lens optical system to a detection system which focuses light reflected by the recording layer of the optical recording medium on an optical detector, and λ denotes a wavelength (μm) of light outputted from the light source.

As described above, according to the present fifth embodiment, by having the thickness of the solid immersion lens satisfy Expressions (15) and (16), deterioration of a detected signal due to interference between a reflected light from an incidence plane of the solid immersion lens 207b and a reflected light from a recording layer of the optical recording medium can be eliminated, and deterioration of an optical spot can be prevented even when the objective lens optical system 207 follows an inclination of the optical recording medium 208. As a result, an optical pickup and an objective lens optical system capable of not only reliably recording and reproducing information but also reducing the risk of damaging the important optical recording medium can be provided.

In addition, since defocusing and spherical aberration can be reduced by causing a distance between the diaphragm lens 207a and the solid immersion lens 207b to vary in correspondence to each recording layer of the optical recording medium 208, a similar effect can be obtained with a multilayered optical recording medium having a plurality of recording layers. In other words, the optical recording medium 208 may have a plurality of recording layers. Furthermore, the objective lens actuator 217 may vary a distance between the solid immersion lens 207b and the diaphragm lens 207a in the optical axis direction according to a recording layer on which light is converged.

Moreover, while the second optical detector 215 has a four-fraction light receiving section in order to detect inclinations in both a radial direction and a tangential direction in the present fifth embodiment, the second optical detector 215 may alternatively have a two-fraction light receiving section to detect an inclination in only the radial direction or an inclination in only the tangential direction. In this case, since adjustment of the second optical detector 215 need only be performed in one axis direction, adjustment becomes easier and reliability of the optical pickup increases.

In addition, while an astigmatic method has been exemplified as a focus detection method and a push-pull method has been exemplified as a tracking detection method in the present fifth embodiment, such methods are not restrictive and these detection methods may be combined with other detection methods.

Furthermore, while the optical pickup according to the present fifth embodiment comprises the analyzer 214 which transmits a linearly-polarized light in a given direction of polarization and which absorbs a linearly-polarized light in a direction perpendicular to the linearly-polarized light in the given direction, the optical pickup may alternatively comprise a polarizing hologram which transmits a linearly-polarized light in a given direction of polarization and which diffracts a linearly-polarized light in a direction perpendicular to the linearly-polarized light in the given direction or a polarizing beam splitter which transmits a linearly-polarized light in a given direction of polarization and which reflects a linearly-polarized light in a direction perpendicular to the linearly-polarized light in the given direction. Unnecessary linearly-polarized light can be prevented from being incident to the second optical detector 215 using any optical element among an analyzer, a polarizing hologram, and a polarizing beam splitter.

Moreover, while a film which reflects light outputted from the first light source 201 and which transmits light outputted from the second light source 211 is formed on the analyzer 214 in the present fifth embodiment, a film having this property may alternatively be provided on an optical component positioned between the second beam splitter 205 and the second optical detector 215 or an optical component having this property may be separately provided. In addition, a light incidence plane of the optical component on which is formed the film having the property described above is favorably inclined with respect to a plane perpendicular to an optical axis. Accordingly, since an incident reflected light proceeds in a direction that differs from an optical axis direction, unnecessary stray light can be prevented from being incident to the second optical detector 215.

In addition, while light quantity control of the first light source 201 is performed using light reflected by the second beam splitter 205 in the present fifth embodiment, light quantity control of the first light source 201 may alternatively be performed using light which is outputted from the first light source 201 and which is not used to record information onto or reproduce information from the optical recording medium 208.

Furthermore, while the first beam splitter 203 has a property of 100%-transmitting outward polarized light, the first beam splitter 203 may alternatively have a property of 90%-transmitting and 10%-reflecting outward polarized light, in which case the light quantity of the first light source 201 can be controlled by detecting a reflected light from the first beam splitter 203. However, in this case, since light reflected by an emission end face of the solid immersion lens 207b returns as a same polarized light as the outward polarized light, the light is 10%-reflected by the first beam splitter 203 and is incident to the first optical detector 210. Therefore, unnecessary light must be removed from signal light by arranging a third beam splitter which 100%-reflects polarized light that is the same as polarized light outputted from the first light source 201 and which 100%-transmits polarized light that is perpendicular to polarized light outputted from the first light source 201 on an optical path between the first beam splitter 203 and the first optical detector 210.

Moreover, while the multilayered optical recording medium according to the present fifth embodiment has three recording layers, a multilayered optical recording medium having two or more recording layers is also perfectly acceptable.

In addition, while the second light source 211 outputs light that differs in wavelength from the first light source 201 in order to detect a gap signal in the present fifth embodiment, it is also perfectly acceptable to have the second light source 211 output light with the same wavelength as the first light source 201. In other words, the wavelength of light outputted from the first light source 201 and the wavelength of light outputted from the second light source 211 may be the same.

However, since the first light source 201 and the second light source 211 output light with the same wavelength, light outputted by the first light source 201 and reflected by the emission end face of the solid immersion lens 207b and light outputted by the second light source 211 and reflected by the emission end face of the solid immersion lens 207b cannot be separated from each other with the polarization property of a beam splitter or an analyzer. In consideration thereof, the two lights are separated from each other using a difference between a degree of emittance of light outputted from the first light source 201 and incident to the objective lens optical system 207 and a degree of emittance of light outputted from the second light source 211 and incident to the objective lens optical system 207. In other words, by greatly defocusing light outputted by the first light source 201 and reflected by the emission end face of the solid immersion lens 207b on the second optical detector 215, the two lights can be separated from each other.

Furthermore, signal deterioration due to interference must be taken into consideration when the solid immersion lens 207b is thin, and diaphragm performance with respect to inclined incident light must be taken into consideration when the solid immersion lens 207b is thick. Therefore, designing of lens must be carried out with due consideration to the above.

(Sixth Embodiment)

Figure 40:
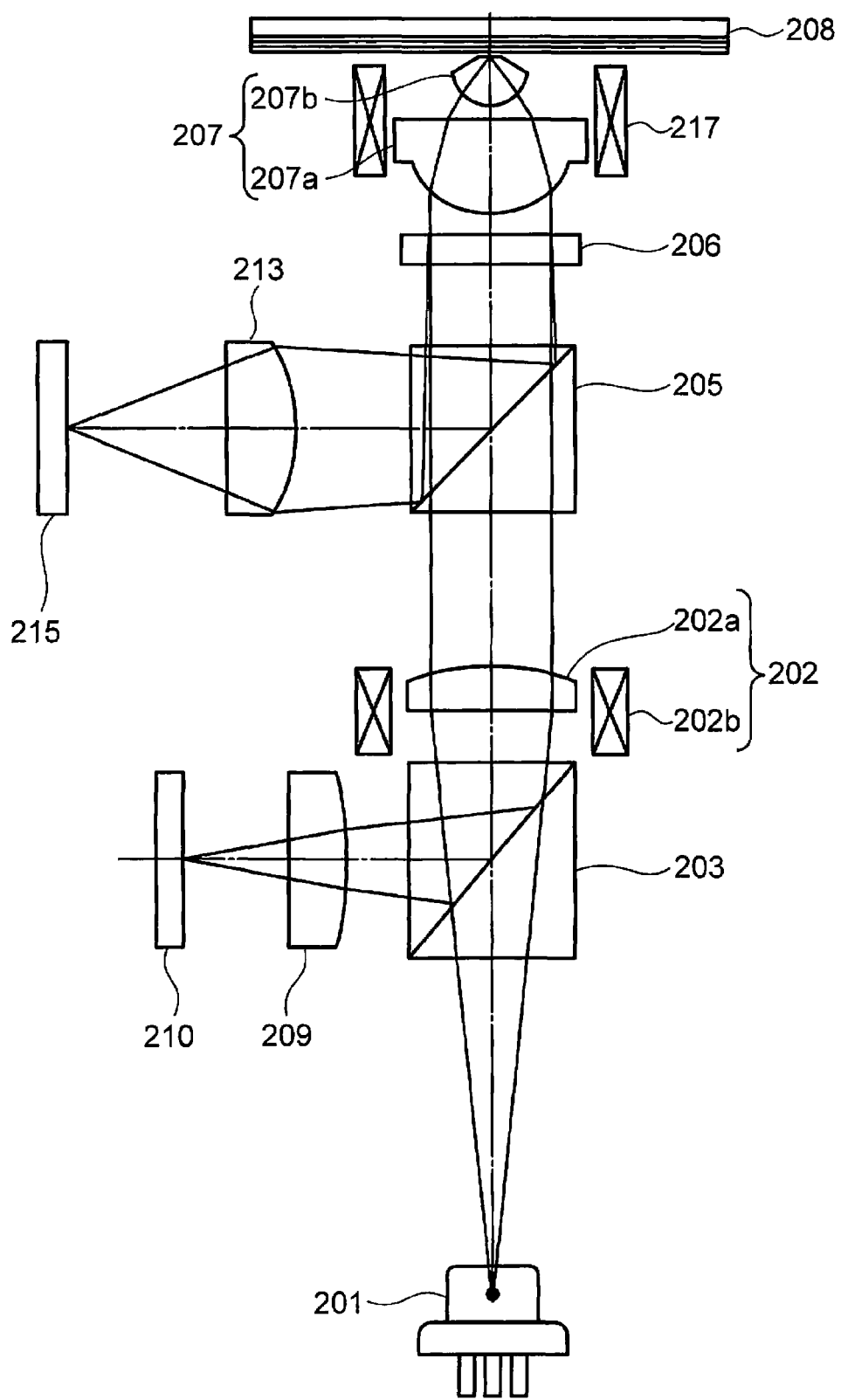
FIG. 40 is a diagram showing a configuration of an optical pickup according to a sixth embodiment of the present invention.

Next, an optical pickup according to a sixth embodiment of the present invention will be described with respect to the drawings. FIG. 40 is a diagram showing a configuration of an optical pickup according to the sixth embodiment of the present invention. The present sixth embodiment only differs from the fifth embodiment described above in that the second light source 211, the analyzer 214, the third beam splitter 212, and the third optical detector 216 have been removed. Otherwise, the present sixth embodiment is the same as the fifth embodiment. Therefore, in the present sixth embodiment, it is assumed that components not particularly described are the same as those in the fifth embodiment and, unless specifically described, it is assumed that components denoted by same reference characters as used in the fifth embodiment have similar functions as their counterparts in the fifth embodiment.

Light outputted from the first light source 201 is incident to the second beam splitter 205, and the second beam splitter 205 reflects light reflected by an emission end face of the solid immersion lens 207b. The second optical detector 215 receives light reflected by the second beam splitter 205 and outputs an electrical signal according to a quantity of received light. The second optical detector 215 outputs an electrical signal for detecting a distance between the emission end face of the solid immersion lens 207b and a surface of the optical recording medium 208.

As already described in the fifth embodiment, light outputted from the first light source 201 is focused on the optical recording medium 208, light reflected by the optical recording medium 208 is received by the first optical detector 210, and a reproduction signal, a focus error signal, and a tracking error signal are detected.

Next, since light reflected by the emission end face of the solid immersion lens 207b has a same direction of polarization as light outputted from the first light source 201, 10% of light reflected by the emission end face of the solid immersion lens 207b is reflected by the second beam splitter 205. The light reflected by the second beam splitter 205 is incident to the second collimator lens 213 since the analyzer 214 that had been arranged in the fifth embodiment is no longer present. Light transmitted through the second collimator lens 213 is incident to the second optical detector 215. The second optical detector 215 outputs a gap signal, a radial tilt signal, and a tangential tilt signal in the same manner as in the fifth embodiment.

According to the present sixth embodiment, by having a thickness of the solid immersion lens 207b satisfy Expressions (15) and (16), deterioration of a detected signal due to interference between a reflected light from an incidence plane of the solid immersion lens 207b and a reflected light from a recording layer of the optical recording medium is eliminated, and deterioration of an optical spot is prevented even when the objective lens optical system 207 follows an inclination of the optical recording medium 208. As a result, an optical pickup and an objective lens optical system capable of not only reliably recording and reproducing information but also reducing the risk of damaging the important optical recording medium can be provided. In addition, since the use of only one light source reduces the number of components as well as the number of assembly steps, an inexpensive and small optical pickup can be realized.

(Seventh Embodiment)

In a seventh embodiment of the present invention, an example of an optical information device according to the present invention will be described. The optical information device according to the seventh embodiment is a device which records information onto and/or reproduces information from an optical recording medium.

Figure 41:
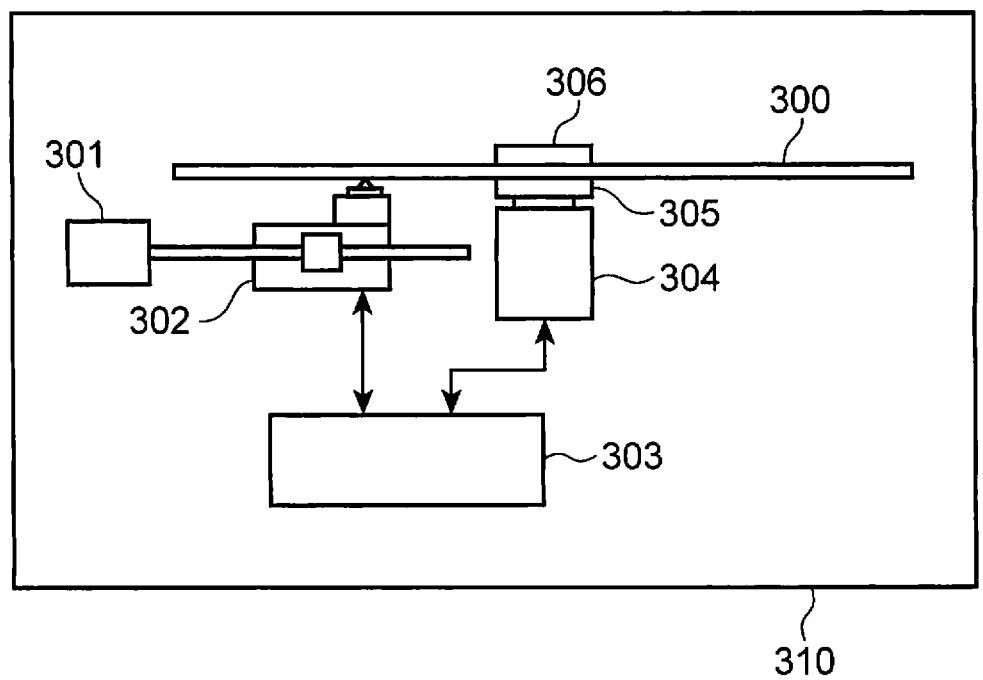
FIG. 41 is a diagram schematically showing a configuration of an optical information device according to a seventh embodiment of the present invention.

FIG. 41 is a diagram schematically showing a configuration of an optical information device 310 according to the seventh embodiment of the present invention. In FIG. 41, the optical information device 310 comprises: an optical pickup driving device 301; an optical pickup 302; a control unit 303; a motor 304; a turntable 305; and a clamper 306. Since the optical pickup 302 is similar to the optical pickups described in the first to sixth embodiments, overlapping descriptions will be omitted.

In FIG. 41, an optical recording medium 300 is mounted on the turntable 305, held by the damper 306, and rotated by the motor 304. The optical pickup driving device 301 coarsely moves the optical pickup 302 described in the first to sixth embodiments to a position of a track of the optical recording medium 300 containing desired information.

The control unit 303 controls the optical pickup 302 and the motor 304 based on signals obtained from the optical pickup 302. The optical pickup 302 sends a focus error signal, a tracking error signal, a gap signal, and a tilt signal to the control unit 303 in correspondence with a positional relationship with the optical recording medium 300. In response to these signals, the control unit 303 sends a signal for finely moving an objective lens optical system or an emittance modifying unit to the optical pickup 302. According to the signal, the optical pickup 302 performs focus control, tracking control, gap control, or tilt control on the optical recording medium 300 in order to read, write or delete information.

In addition, when the optical recording medium 300 has a plurality of recording layers, the control unit 303 may send a signal for varying a distance between a diaphragm lens and a solid immersion lens. According to the signals including the signal for varying distance, the optical pickup 302 performs focus control, tracking control, gap control, and tilt control on the multilayered optical recording medium 300 in order to read, write or delete information.

In the description provided above, the optical recording medium 300 mounted on the optical information device 310 is the optical recording medium which is described in the first to sixth embodiments and which has a recording layer for recording or reproducing information using near-field light. Even with a multilayered optical recording medium, the optical information device 310 according to the present seventh embodiment is capable of reliably and accurately detecting a relative inclination angle between a surface of the optical recording medium and an emission end face of the solid immersion lens and preventing the solid immersion lens from colliding with the surface of the optical recording medium. As a result, in addition to reliably recording and reproducing information, the risk of damaging the important optical recording medium can be reduced.

In addition, with the optical information device 310 according to the present seventh embodiment, since a reflected light from an incidence plane of the solid immersion lens and a reflected light from a recording layer of the optical recording medium do not interfere with each other on a first optical detector, deterioration of signal quality does not occur. Furthermore, since a coma aberration can be kept at an acceptable level even if the objective lens optical system 207 inclines when following an inclination of the optical recording medium 208, deterioration of signal quality can be prevented. Moreover, by varying the distance between the diaphragm lens and the solid immersion lens, information can be reliably recorded onto or reproduced from even a multilayered optical recording medium.

(Eighth Embodiment)

In an eighth embodiment of the present invention, an example of a computer equipped with the optical information device according to the seventh embodiment will be described.

Figure 42:
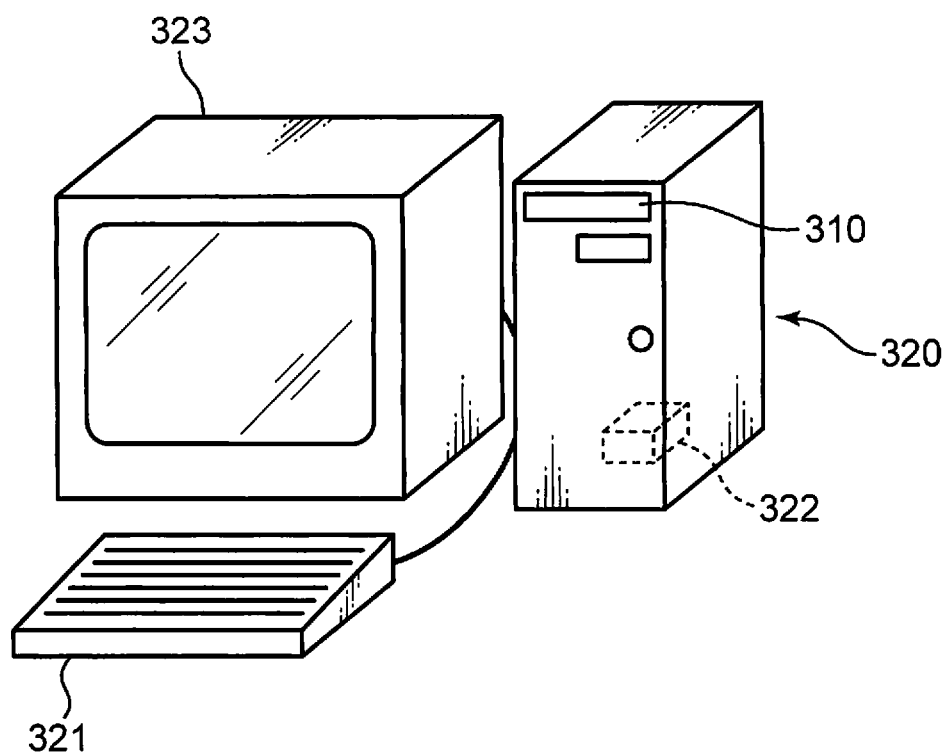
FIG. 42 is a diagram schematically showing a configuration of a computer according to an eighth embodiment of the present invention.

FIG. 42 is a diagram schematically showing a configuration of a computer according to the eighth embodiment of the present invention. In FIG. 42, a computer 320 comprises: the optical information device 310 according to the seventh embodiment; an input device 321 which is constituted by a keyboard, a mouse, a touch panel, or the like and which is used for inputting information; a processing unit 322 such as a central processing unit (CPU) which performs processing based on information inputted using the input device 321, information read from the optical information device 310, and the like; and a monitor 323 which is constituted by a cathode-ray tube or a liquid crystal display device and which displays information including results of processing by the processing unit 322.

Moreover, in the present eighth embodiment, the computer 320 corresponds to an example of an information processing device and the processing unit 322 corresponds to an example of an information processing unit.

Since the computer 320 equipped with the optical information device 310 according to the seventh embodiment described above as an external storage device is capable of reliably recording information onto or reliably reproducing information from an optical recording medium having a recording layer for recording or reproducing information using near-field light, the computer 320 can be used in a wide range of applications. By virtue of its large capacity, the optical information device 310 is able to back up information recorded on a hard disk in the computer. In addition, taking advantage of the properties of a medium (an optical disk) including its low cost, portability, and compatibility that enables reading of information by other optical information devices, programs or data may be exchanged with others or carried around for personal use.

(Ninth Embodiment)

In a ninth embodiment of the present invention, an example of a video recording/reproducing device (an optical disk recorder) equipped with the optical information device according to the seventh embodiment will be described.

Figure 43:
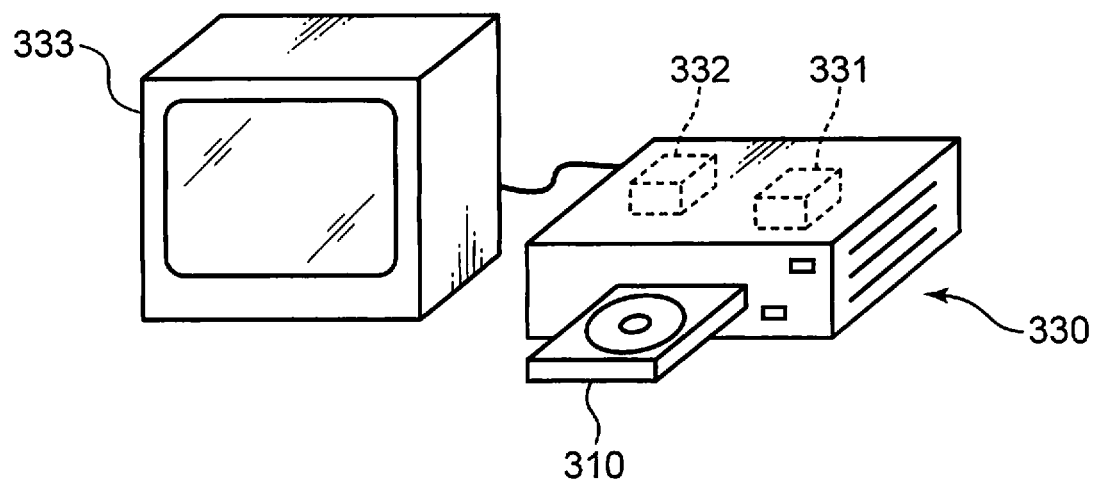
FIG. 43 is a diagram schematically showing a configuration of an optical disk recorder according to a ninth embodiment of the present invention.

FIG. 43 is a diagram schematically showing a configuration of an optical disk recorder according to the ninth embodiment of the present invention. In FIG. 43, an optical disk recorder 330 comprises: the optical information device 310 according to the seventh embodiment; and an encoder 331 which converts image information into an information signal to be recorded onto an optical recording medium by the optical information device 310. Desirably, by further comprising a decoder 332 which converts an information signal obtained from the optical information device 310 into an image signal, the optical disk recorder 330 becomes also capable of reproducing already-recorded information. In addition, the optical disk recorder 330 is connected to a monitor 333 which displays recorded information.

Moreover, in the present ninth embodiment, the optical disk recorder 330 corresponds to an example of an information processing device and the encoder 331 corresponds to an example of an information processing unit.

Since the optical disk recorder 330 equipped with the optical information device according to the seventh embodiment described above is capable of reliably recording video onto or reliably reproducing video from an optical recording medium having a recording layer for recording or reproducing information using near-field light, the optical disk recorder 330 can be used in a wide range of applications. The optical disk recorder 330 is capable of recording video onto a medium (an optical disk) and reproducing the video at anytime. Unlike tapes, an optical recording medium does not require rewinding after recording or playback. In addition, chasing playback where a top part of a program is reproduced while the program is being recorded or simultaneous recording/playback where a previously recorded program is reproduced while another program is being recorded can be performed. Furthermore, taking advantage of the properties of a medium including its low cost, portability, and compatibility that enables reading of information by other video recording/reproducing devices, a recorded video may be exchanged with others or carried around for personal use.

Moreover, while a configuration in which the optical disk recorder 330 comprises the optical information device 310 has been described, the optical disk recorder 330 may alternatively have a built-in hard disk or a built-in video tape recording/playback function. In this case, temporary storage or backup of video can be readily performed.

(Tenth Embodiment)

In a tenth embodiment of the present invention, an example of a video reproducing device (an optical disk player) equipped with the optical information device according to the seventh embodiment will be described.

Figure 44:
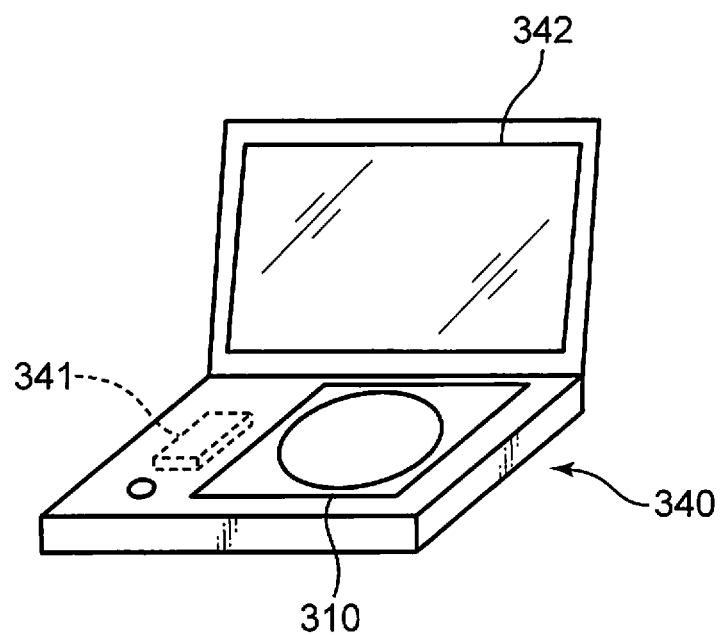
FIG. 44 is a diagram schematically showing a configuration of an optical disk player according to a tenth embodiment of the present invention.

FIG. 44 is a diagram schematically showing a configuration of an optical disk player according to the tenth embodiment of the present invention. In FIG. 44, an optical disk player 340 comprises: the optical information device 310 according to the seventh embodiment; and a decoder 341 which converts an information signal obtained from the optical information device 310 into an image signal. In addition, the optical disk player 340 may comprise a liquid crystal monitor 342. The optical disk player 340 comprising the liquid crystal monitor 342 has the optical information device 310 according to the seventh embodiment built in, and is capable of displaying video recorded on an optical recording medium on the liquid crystal monitor 342.

Moreover, in the present tenth embodiment, the optical disk player 340 corresponds to an example of an information processing device and the decoder 341 corresponds to an example of an information processing unit.

Since the optical disk player 340 equipped with the optical information device 310 according to the seventh embodiment described above is capable of reliably reproducing video from an optical recording medium having a recording layer for recording or reproducing information using near-field light, the optical disk player 340 can be used in a wide range of applications. The optical disk player 340 is capable of reproducing video recorded on a medium (an optical disk) at anytime. An optical disk does not require rewinding after playback as is the case with tapes and enables playback by accessing an arbitrary location in a video.

(Eleventh Embodiment)

In an eleventh embodiment of the present invention, an example of an optical disk server equipped with the optical information device according to the seventh embodiment will be described.

Figure 45:
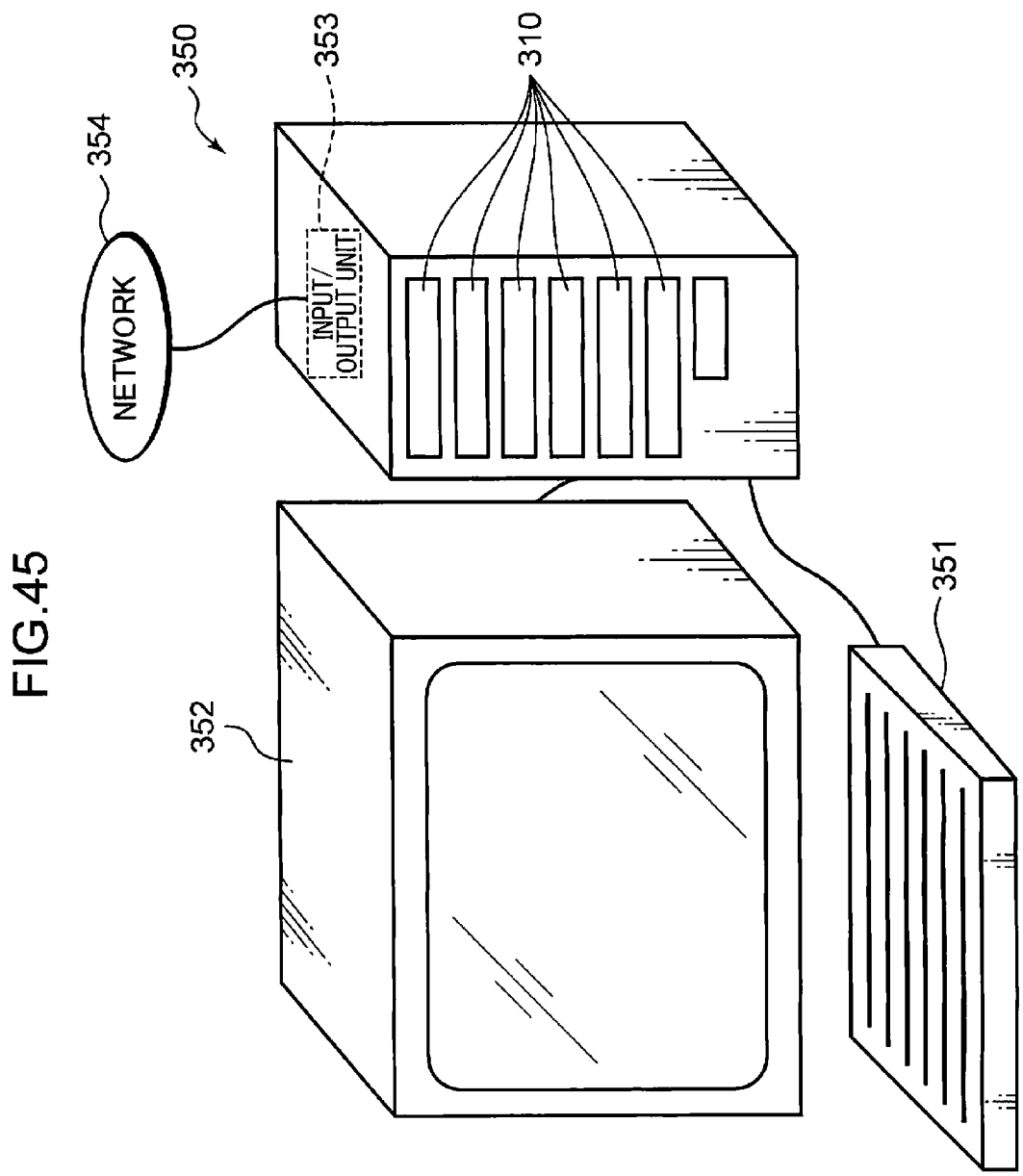
FIG. 45 is a diagram schematically showing a configuration of an optical disk server according to an eleventh embodiment of the present invention.

FIG. 45 is a diagram schematically showing a configuration of an optical disk server according to the eleventh embodiment of the present invention. In FIG. 45, an optical disk server 350 comprises; the optical information device 310 according to the seventh embodiment; an input device 351 which is constituted by a keyboard, a mouse, a touch panel, or the like and which is used for inputting information; and an input/output unit 353 which performs, with the outside, input and output of information recorded or reproduced by the optical information device 310. The input/output unit 353 is connected to a network 354 such as the Internet.

By virtue of its large capacity, the optical information device 310 transmits information (for example, an image, audio, video, an HTML document, and a text document) recorded on an optical recording medium in response to a request from the network 354. In addition, the optical information device 310 records information sent from the network 354 onto a requested location.

The input/output unit 353 retrieves information recorded by the optical information device 310 and outputs information read by the optical information device 310 to the outside in a wired or wireless manner. Accordingly, the optical disk server 350 can exchange information via the network 354 with a plurality of devices including a computer, a telephone, and a television tuner, and can be used by the plurality of devices as a shared information server. Moreover, since the optical disk server 350 is capable of reliably recording information onto or reliably reproducing information from an optical recording medium having a recording layer for recording or reproducing information using near-field light, the optical disk server 350 can be used in a wide range of applications. In addition, the optical disk server 350 may comprise a monitor 352 which is constituted by a cathode-ray tube or a liquid crystal display device and which displays information.

Furthermore, in addition to having a plurality of optical information devices 310, by equipping the optical disk server 350 with a changer which inserts or removes a plurality of optical recording media into/from the plurality of optical information devices 310, a large quantity of information can be recorded.

Moreover, in the present eleventh embodiment, the optical disk server 350 corresponds to an example of an information processing device and the input/output unit 353 corresponds to an example of an information processing unit.

(Twelfth Embodiment)

In a twelfth embodiment of the present invention, an example of a car navigation system equipped with the optical information device according to the seventh embodiment will be described.

Figure 46:
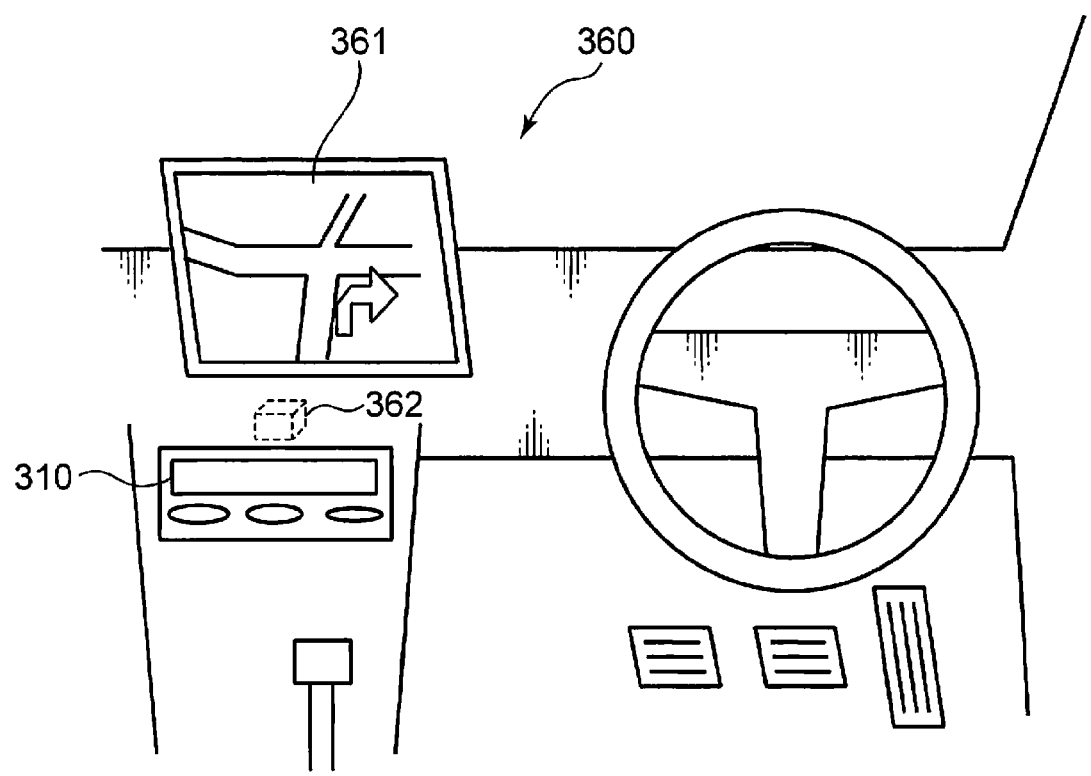
FIG. 46 is a diagram schematically showing a configuration of a car navigation system according to a twelfth embodiment of the present invention.
Figure 47:
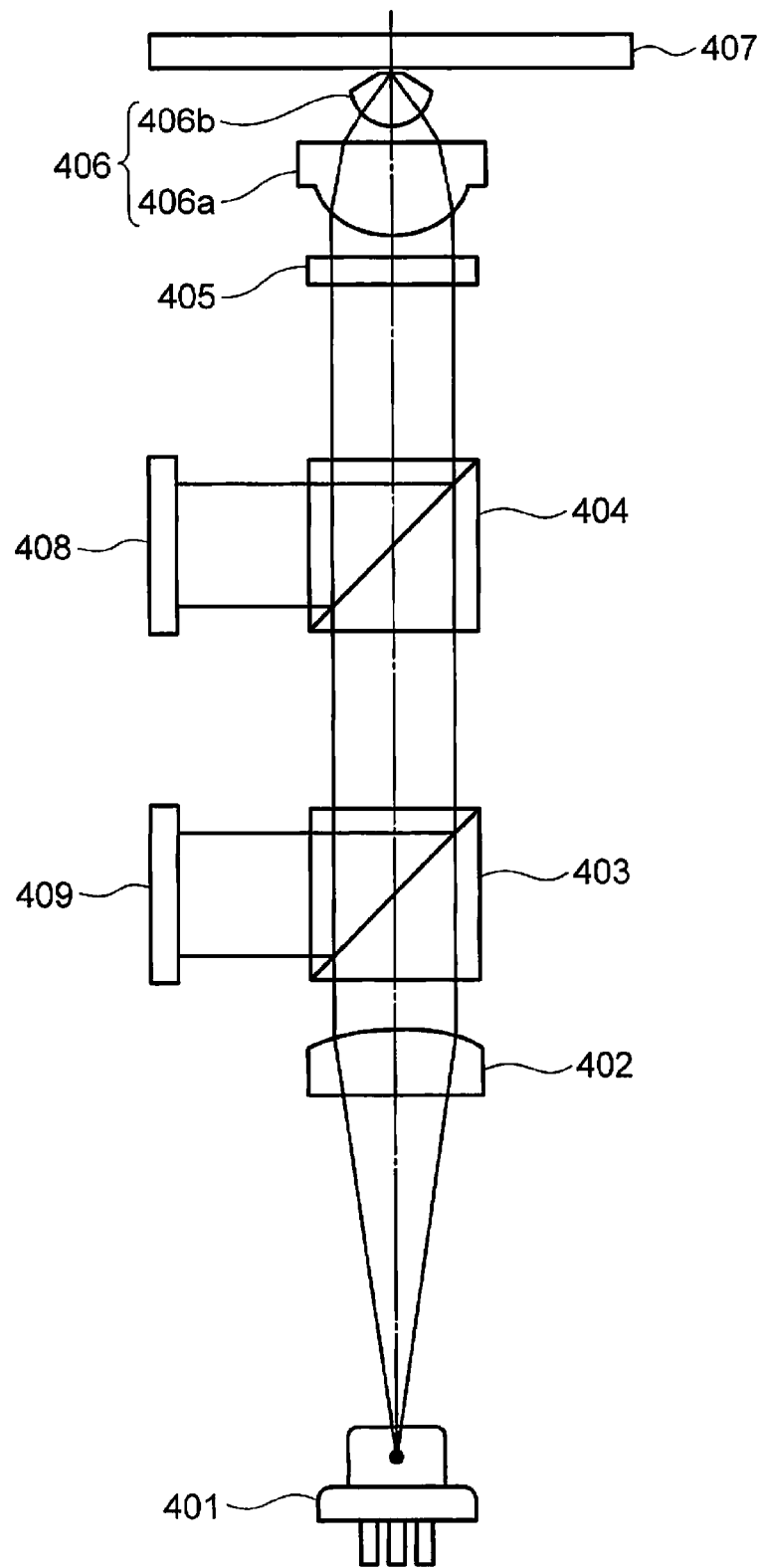
FIG. 47 is a diagram showing a configuration of a conventional optical pickup.
Figure 48:
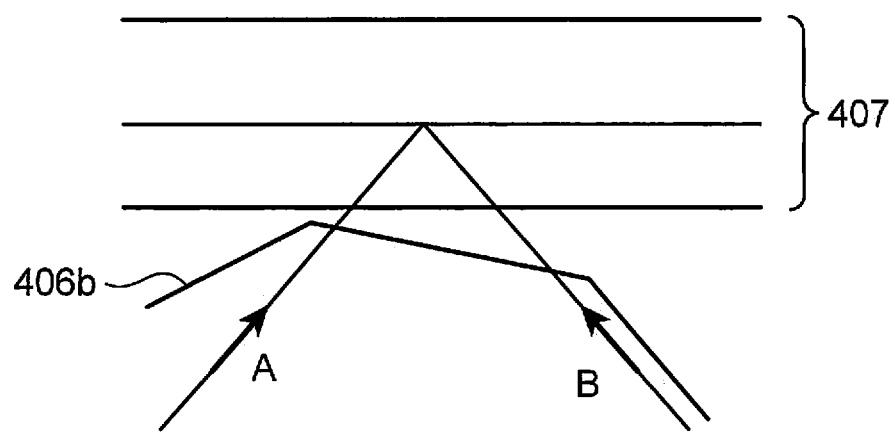
FIG. 48 is an enlarged view of a vicinity of an end face of a solid immersion lens in a case where the end face of the solid immersion lens and a surface of an optical disk are inclined relative to each other in a conventional optical pickup.

FIG. 46 is a diagram schematically showing a configuration of a car navigation system according to the twelfth embodiment of the present invention. In FIG. 46, a car navigation system 360 comprises: the optical information device 310 according to the seventh embodiment; a liquid crystal monitor 361 which displays topographical information or destination information; and a decoder 362 which converts an information signal obtained from the optical information device 310 into an image signal.

Based on map information recorded on a medium (an optical disk) and information from a global positioning system (GPS), a gyroscope, a speedometer, an odometer, and the like, the car navigation system 360 calculates a current position and displays the calculated current position on the liquid crystal monitor 361. In addition, when a destination is inputted using an input device (not shown), the car navigation system 360 calculates an optimum route to the inputted destination based on map information or road information, and displays the calculated route on the liquid crystal monitor 361.

Since the car navigation system 360 equipped with the optical information device 310 according to the seventh embodiment described above is capable of reliably reproducing video from an optical recording medium having a recording layer for recording or reproducing information using near-field light, the car navigation system 360 can be used in a wide range of applications.

Due to the use of a large-capacity optical recording medium for recording map information, a wide geographical area can be covered and detailed road information can be provided with a single optical recording medium. In addition, information on restaurants, convenience stores, gas stations, and the like which accompanies road information can simultaneously be stored in and provided from the optical recording medium. Furthermore, although road information becomes outdated and fails to reflect reality over time, since optical recording media are compatible and inexpensive, up-to-date information can be obtained by replacing with an optical recording medium containing the latest road information.

Although the first to twelfth embodiments of the present invention have been described above through examples thereof, the present invention is not limited to the first to twelfth embodiments described above and can be applied to other embodiments based on the technical ideas of the present invention.

In addition, although an optical recording medium on which information is solely optically recorded has been described in the first to twelfth embodiments above, it is needless to say that similar advantageous effects can be obtained with respect to an optical recording medium on which information is both optically and magnetically recorded.

Furthermore, while a case where the optical recording medium is an optical disk has been described in the first to twelfth embodiments described above, the present invention is also applicable to optical recording media having similar functions as an optical disk such as a card-type optical recording medium.

The specific embodiments described above primarily include an invention configured as described below.

An optical pickup according to an aspect of the present invention comprises:

an optical beam generating unit which generates a first beam and a second beam;

an objective lens optical system which includes a solid immersion lens having an end face opposing a surface of an optical recording medium having a plurality of layers, and which converges the first beam and the second beam on the optical recording medium;

a first branch element which reflects the first beam and the second beam reflected by the end face of the solid immersion lens;

a convergence state modifying unit which converges the first beam and the second beam reflected by the first branch element and which modifies convergence states of the first beam and the second beam; and a first optical detector which detects the first beam and the second beam converged by the convergence state modifying unit, wherein a center of the first beam and a center of the second beam are at positions that differ from each other on the end face of the solid immersion lens, the convergence state modifying unit modifies the convergence states of the first beam and the second beam according to layers of the optical recording medium, and the first optical detector includes a first light receiving section which receives the converged first beam and a second light receiving section which receives the converged second beam, and the first optical detector detects a relative inclination angle between the end face of the solid immersion lens and the surface of the optical recording medium based on a difference in quantities of received light between the first light receiving section and the second light receiving section.

According to this configuration, the optical beam generating unit generates a first beam and a second beam. The objective lens optical system includes a solid immersion lens having an end face opposing a surface of an optical recording medium having a plurality of layers, and converges the first beam and the second beam on the optical recording medium. The first branch element reflects the first beam and the second beam reflected by the end face of the solid immersion lens. The convergence state modifying unit converges the first beam and the second beam reflected by the first branch element, and modifies convergence states of the first beam and the second beam. The first optical detector detects the first beam and the second beam converged by the convergence state modifying unit. A center of the first beam and a center of the second beam are at positions that differ from each other on the end face of the solid immersion lens. The convergence state modifying unit modifies the convergence states of the first beam and the second beam according to layers of the optical recording medium. The first optical detector includes a first light receiving section which receives the converged first beam and a second light receiving section which receives the converged second beam, and the first optical detector detects a relative inclination angle between the end face of the solid immersion lens and the surface of the optical recording medium based on a difference in quantities of received light between the first light receiving section and the second light receiving section.

Therefore, even if the optical recording medium has a plurality of layers, convergence states of the first beam and the second beam are modified according to layers of the optical recording medium, and a spot diameter of the first beam and the second beam incident to the first optical detector is modified to an appropriate size. Consequently, a relative inclination angle between an end face of the solid immersion lens and a surface of the optical recording medium can be reliably and accurately detected and a deviation in inclination angle can be suppressed.

In addition, favorably, the optical pickup described above further comprises an emittance modifying mechanism which modifies emittances of the first beam and the second beam generated by the optical beam generating unit, wherein the objective lens optical system converges the first beam and the second beam from the emittance modifying mechanism on the optical recording medium.

According to this configuration, the emittance modifying mechanism modifies the emittances of the first beam and the second beam generated by the optical beam generating unit. The objective lens optical system converges the first beam and the second beam from the emittance modifying mechanism on the optical recording medium.

Therefore, with an optical pickup in which the emittances of a first beam and a second beam generated by the optical beam generating unit are modified by the emittance modifying mechanism, a relative inclination angle between an end face of the solid immersion lens and a surface of the optical recording medium can be reliably and accurately detected.

Furthermore, in the optical pickup described above, favorably, the objective lens optical system further includes a diaphragm lens which converges the first beam and the second beam on the solid immersion lens, and the optical pickup further comprises an interlens distance modifying unit which modifies a distance between the solid immersion lens and the diaphragm lens in an optical axis direction.

According to this configuration, the objective lens optical system further includes a diaphragm lens which converges the first beam and the second beam on the solid immersion lens. The interlens distance modifying unit modifies a distance between the solid immersion lens and the diaphragm lens in an optical axis direction.

Therefore, since a distance between the solid immersion lens and the diaphragm lens in an optical axis direction is modified, emittances of a first beam and a second beam generated by the optical beam generating unit can be modified, and a relative inclination angle between an end face of the solid immersion lens and a surface of an optical recording medium can be reliably and accurately detected.

Moreover, in the optical pickup described above, favorably, the convergence state modifying unit includes a convergence position modifying unit which modifies convergence positions of the first beam and the second beam.

According to this configuration, by modifying the convergence positions of the first beam and the second beam, the first beam and the second beam can be individually focused on the first optical detector according to each layer, a positional accuracy of the first optical detector can be made less stringent, and a highly reliable optical pickup that is easy to assemble can be realized.

In addition, in the optical pickup described above, favorably, the convergence position modifying unit includes a converging lens which converges the first beam and the second beam, a glass plate, and a glass plate insertion section which inserts the glass plate onto an optical path between the converging lens and the first optical detector according to the layers of the optical recording medium.

According to this configuration, since the glass plate is inserted by the glass plate insertion section onto an optical path between the converging lens and the first optical detector according to the layers of the optical recording medium, the convergence positions of the first beam and the second beam can be modified according to the layers of the optical recording medium by inserting or removing the glass plate onto or from the optical path between the converging lens and the first optical detector.

Furthermore, in the optical pickup described above, favorably, the glass plate includes a plurality of glass plates with thicknesses that differ from each other, and the glass plate insertion section selectively inserts the plurality of glass plates onto the optical path between the converging lens and the first optical detector according to the layers of the optical recording medium.

According to this configuration, since a plurality of glass plates with thicknesses that differ from each other are selectively inserted by the glass plate insertion section onto the optical path between the converging lens and the first optical detector according to the layers of the optical recording medium, convergence positions of the first beam and the second beam can be modified according to the layers of the optical recording medium by inserting a glass plate corresponding to the layers of the optical recording medium among the plurality of glass plates with thicknesses that differ from each other.

Moreover, in the optical pickup described above, favorably, the convergence position modifying unit includes a converging lens which converges the first beam and the second beam, and a lens position modifying mechanism which modifies a position of the converging lens in an optical axis direction according to the layers of the optical recording medium.

According to this configuration, since a position of the converging lens which converges the first beam and the second beam is modified in the optical axis direction according to the layers of the optical recording medium, the convergence positions of the first beam and the second beam can be modified according to the layers of the optical recording medium. In addition, since the converging lens is the only optical component, the number of optical components which light passes through can be reduced, a quality of light that is focused on the first optical detector becomes favorable, and an optical pickup with high quality can be realized.

Furthermore, in the optical pickup described above, favorably, the convergence position modifying unit includes a convertible lens which varies focal positions of the first beam and the second beam according to the layers of the optical recording medium.

According to this configuration, since focal positions of the first beam and the second beam are varied according to the layers of the optical recording medium, the convergence positions of the first beam and the second beam can be modified according to the layers of the optical recording medium. Moreover, since a focal position of light can be varied without using a driving mechanism, the optical pickup can be downsized and an optical pickup with high reliability can be realized.

In addition, in the optical pickup described above, favorably, the convertible lens includes a liquid crystal lens.

According to this configuration, by varying a voltage applied to the liquid crystal lens, focal positions of the first beam and the second beam can be readily varied according to the layers of the optical recording medium. Furthermore, since a focal position can be moved using electricity, the optical pickup can be downsized and an optical pickup with high reliability can be realized.

Moreover, in the optical pickup described above, favorably, the convergence state modifying unit includes an astigmatism imparting unit which imparts astigmatisms to the first beam and the second beam.

According to this configuration, by imparting astigmatisms to the first beam and the second beam, convergence states of the first beam and the second beam can be modified. In addition, since the first beam and the second beam can be prevented from overlapping each other on the first optical detector without using a driving mechanism, the optical pickup can be downsized, and since a driving mechanism is not used, reliability of the optical pickup can be improved.

Furthermore, in the optical pickup described above, favorably, the astigmatism imparting unit includes a lens in which at least one plane among a light incidence plane and a light emission plane is a cylindrical surface.

According to this configuration, astigmatisms can be imparted to the first beam and the second beam by a lens in which at least one plane among a light incidence plane and a light emission plane is a cylindrical surface. Moreover, since astigmatisms can be imparted to the first beam and the second beam by a single optical component, the optical pickup can be downsized.

In addition, in the optical pickup described above, favorably, the astigmatism imparting unit includes a condensing lens which focuses the first beam and the second beam, and a wedge-shaped glass plate arranged in an optical path between the condensing lens and the first optical detector.

According to this configuration, astigmatisms can be imparted to the first beam and the second beam by the wedge-shaped glass plate arranged in an optical path between the condensing lens which focuses the first beam and the second beam and the first optical detector. Furthermore, since the astigmatism imparting unit can be constituted by an inexpensive optical component, cost reduction of the optical pickup can be realized, and since assembly accuracy becomes less stringent, a highly reliable optical pickup can be realized.

Moreover, in the optical pickup described above, favorably, a peripheral shape of the end face of the solid immersion lens is a cone shape.

According to this configuration, since the solid immersion lens and the optical recording medium are less likely to collide with each other even when an end face of the solid immersion lens and a surface of the optical recording medium are inclined relative to each other, a permissible angle of a relative inclination between the end face of the solid immersion lens and the surface of the optical recording medium can be increased.

In addition, in the optical pickup described above, favorably, the center of the second beam on the end face of the solid immersion lens is at a position which is offset from the center of the first beam on the end face of the solid immersion lens in a tangential direction or a radial direction of the optical recording medium.

According to this configuration, a relative inclination between the optical recording medium and the solid immersion lens in a uniaxial direction can be reliably detected, and the solid immersion lens and the optical recording medium can be prevented from colliding with each other.

Furthermore, in the optical pickup described above, favorably, the optical beam generating unit further generates a third beam and a fourth beam, the objective lens optical system converges the third beam and the fourth beam on the optical recording medium, the first branch element reflects the third beam and the fourth beam reflected by the end face of the solid immersion lens, the convergence state modifying unit converges the third beam and the fourth beam reflected by the first branch element on the first optical detector, and modifies convergence states of the third beam and the fourth beam, the first optical detector detects the third beam and the fourth beam converged by the convergence state modifying unit, the center of the first beam, the center of the second beam, a center of the third beam, and a center of the fourth beam are at positions that differ from each other on the end face of the solid immersion lens, a straight line that connects the center of the first beam and the center of the second beam is perpendicular to a straight line that connects the center of the third beam and the center of the fourth beam on the end face of the solid immersion lens, and the first optical detector further includes a third light receiving section which receives the converged third beam and a fourth light receiving section which receives the converged fourth beam, and the first optical detector detects a relative inclination angle between the end face of the solid immersion lens and the surface of the optical recording medium based on a difference in quantities of received light between the first light receiving section and the second light receiving section and on a difference in quantities of received light between the third light receiving section and the fourth light receiving section.

According to this configuration, the optical beam generating unit further generates a third beam and a fourth beam. The objective lens optical system converges the third beam and the fourth beam on the optical recording medium. The first branch element reflects the third beam and the fourth beam reflected by the end face of the solid immersion lens. The convergence state modifying unit converges the third beam and the fourth beam reflected by the first branch element on the first optical detector, and modifies convergence states of the third beam and the fourth beam. The first optical detector detects the third beam and the fourth beam converged by the convergence state modifying unit. At this point, a center of the first beam, a center of the second beam, a center of the third beam, and a center of the fourth beam are at positions that differ from each other on the end face of the solid immersion lens. On the end face of the solid immersion lens, a straight line connecting the center of the first beam and the center of the second beam is perpendicular to a straight line connecting the center of the third beam and the center of the fourth beam. In addition, the first optical detector further includes a third light receiving section which receives the converged third beam and a fourth light receiving section which receives the converged fourth beam, and the first optical detector detects a relative inclination angle between the end face of the solid immersion lens and a surface of the optical recording medium based on a difference in quantities of received light between the first light receiving section and the second light receiving section and on a difference in quantities of received light between the third light receiving section and the fourth light receiving section.

Therefore, a relative inclination between the optical recording medium and the solid immersion lens in all radial directions and tangential directions can be reliably detected, and the solid immersion lens and the optical recording medium can be prevented from colliding with each other.

Moreover, in the optical pickup described above, favorably, the first beam is a main beam, the second beam is a sub-beam, the first branch element reflects the main beam and the sub-beam reflected by the end face of the solid immersion lens, the first optical detector detects the main beam and the sub-beam converged by the convergence state modifying unit, and the optical pickup further comprises:

a second branch element which reflects the main beam reflected by the optical recording medium; and a second optical detector which detects the main beam reflected by the second branch element.

According to this configuration, the first branch element reflects a main beam and a sub-beam reflected by the end face of the solid immersion lens. The first optical detector detects the main beam and the sub-beam converged by the convergence state modifying unit. The second branch element reflects the main beam reflected by the optical recording medium. The second optical detector detects the main beam reflected by the second branch element.

Therefore, even if an optical recording medium has a plurality of layers, convergence states of a main beam and a sub-beam are modified according to layers of the optical recording medium and a spot diameter of the main beam and the sub-beam incident to the first optical detector is modified to an appropriate size. Consequently, a relative inclination angle between an end face of the solid immersion lens and a surface of the optical recording medium can be reliably and accurately detected and a deviation in inclination angle can be suppressed.

An inclination angle detection method according to another aspect of the present invention is an inclination angle detection method of detecting a relative inclination angle between a surface of an optical recording medium having a plurality of layers and an end face of a solid immersion lens, which opposes the surface of the optical recording medium, the inclination angle detection method comprising:

an optical beam generating step of generating a first beam and a second beam;

a converging step of converging the first beam and the second beam on the optical recording medium via the solid immersion lens;

a reflecting step of reflecting the first beam and the second beam reflected by the end face of the solid immersion lens;

a convergence state modifying step of converging the first beam and the second beam reflected in the reflecting step, and modifying convergence states of the first beam and the second beam; and an optical detection step of detecting the first beam and the second beam converged in the convergence state modifying step, wherein a center of the first beam and a center of the second beam are at positions that differ from each other on the end face of the solid immersion lens, the convergence states of the first beam and the second beam are modified according to layers of the optical recording medium in the convergence state modifying step, and a relative inclination angle between the end face of the solid immersion lens and the surface of the optical recording medium is detected in the optical detection step based on a difference in quantities of received light between the converged first beam and the converged second beam.

According to this configuration, in the optical beam generating step, a first beam and a second beam are generated. In the converging step, the first beam and the second beam are converged on an optical recording medium via a solid immersion lens. In the reflecting step, the first beam and the second beam reflected by an end face of the solid immersion lens are reflected. In the convergence state modifying step, the first beam and the second beam reflected in the reflecting step are converged and convergence states of the first beam and the second beam are modified. In the optical detection step, the first beam and the second beam converged in the convergence state modifying step are detected. A center of the first beam and a center of the second beam are at positions that differ from each other on the end face of the solid immersion lens. In the convergence state modifying step, the convergence states of the first beam and the second beam are modified according to layers of the optical recording medium. In the optical detection step, a relative inclination angle between the end face of the solid immersion lens and a surface of the optical recording medium is detected based on a difference in quantities of received light between the converged first beam and the converged second beam.

Therefore, even if the optical recording medium has a plurality of layers, convergence states of the first beam and the second beam are modified according to layers of the optical recording medium and a spot diameter of the first beam and the second beam incident to an optical detector is modified to an appropriate size. Consequently, a relative inclination angle between an end face of the solid immersion lens and a surface of the optical recording medium can be reliably and accurately detected and a deviation in inclination angle can be suppressed.

An optical information device according to another aspect of the present invention comprises any one of the optical pickups described above, a motor which rotates an optical recording medium, and a control unit which controls the motor and the optical pickup based on signals obtained from the optical pickup. According to this configuration, the optical pickups described above can be applied to an optical information device.

An information processing device according to another aspect of the present invention comprises the optical information device described above, and an information processing unit which processes information to be recorded on the optical information device and/or information reproduced from the optical information device. According to this configuration, the optical information device described above can be applied to an information processing device.

In addition, an optical pickup according to an aspect of the present invention comprises:

a first light source;

a second light source;

an emittance modifying unit which modifies an emittance of light outputted from the first light source;

an objective lens optical system which includes a solid immersion lens and which converges light from the emittance modifying unit on an optical recording medium having a plurality of recording layers;

a first branch section which reflects light outputted from the first light source and reflected by a recording layer of the optical recording medium;

a second branch section into which light outputted from the second light source is incident and which reflects light reflected by an end face of the solid immersion lens;

a first optical detector which receives light reflected by the first branch section and which outputs an electrical signal corresponding to a quantity of received light; and a second optical detector which has a light receiving section divided into at least two fractions, which receives light reflected by the second branch section, and which outputs an electrical signal corresponding to a quantity of received light, wherein a distance between the end face of the solid immersion lens and a surface of the optical recording medium is kept at a distance over which an evanescent light is propagated and which is shorter than $1/10$ of a wavelength of light outputted from the first light source, the second branch section is arranged between the emittance modifying unit and the objective lens optical system, the first optical detector outputs an electrical signal for reproducing information recorded on the optical recording medium, and the second optical detector outputs an electrical signal for detecting a relative inclination angle between the end face of the solid immersion lens and the surface of the optical recording medium.

According to this configuration, the emittance modifying unit modifies an emittance of light outputted from the first light source. The objective lens optical system includes a solid immersion lens and converges light from the emittance modifying unit on an optical recording medium having a plurality of recording layers. The first branch section reflects light outputted from the first light source and reflected by a recording layer of the optical recording medium. Light outputted from a second light source is incident to the second branch section, and the second branch section reflects light reflected by an end face of the solid immersion lens. The first optical detector receives light reflected by the first branch section and outputs an electrical signal according to a quantity of received light. The second optical detector has a light receiving section which has been divided into at least two fractions, receives light reflected by the second branch section, and outputs an electrical signal according to a quantity of received light. A distance between the end face of the solid immersion lens and a surface of the optical recording medium is kept at a distance which enables an evanescent light to be propagated and which is shorter than $1/10$ of a wavelength of light outputted from the first light source. The second branch section is arranged between the emittance modifying unit and the objective lens optical system. The first optical detector outputs an electrical signal for reproducing information recorded on the optical recording medium, and the second optical detector outputs an electrical signal for detecting a relative inclination angle between the end face of the solid immersion lens and the surface of the optical recording medium.

Therefore, since the second branch section is arranged between the emittance modifying unit and the objective lens optical system, a shape of light from the second light source on the end face of the solid immersion lens does not vary even if the emittance modifying unit is operated to vary a focusing position of the first light source in an optical axis direction according to layers that become a recording or reproducing target, and since a spot size on the second optical detector does not vary, a relative inclination angle between the end face of the solid immersion lens and the surface of the optical recording medium can be reliably and accurately detected and a deviation in inclination angle can be suppressed.

In addition, in the optical pickup described above, favorably, a wavelength of light outputted from the first light source and a wavelength of light outputted from the second light source differ from each other.

According to this configuration, since light outputted from the first light source is never incident to the second optical detector, a relative inclination angle between the end face of the solid immersion lens and the surface of the optical recording medium can be reliably detected.

Furthermore, in the optical pickup described above, favorably, a wavelength of light outputted from the first light source and a wavelength of light outputted from the second light source are the same.

According to this configuration, since only a single wavelength is handled, the second branch section can be readily manufactured and a cost of creating the second branch section can be reduced.

Moreover, in the optical pickup described above, favorably, light outputted from the second light source is incident to the objective lens optical system as a convergent light.

According to this configuration, since light outputted from the second light source is incident to the objective lens optical system as a convergent light, a chromatic aberration due to the objective lens optical system can be corrected and optical components between the objective lens optical system and the second optical detector can be downsized. Consequently, the optical pickup can be downsized.

In addition, in the optical pickup described above, favorably, a peripheral shape of an end face of the solid immersion lens, the end face opposing the surface of the optical recording medium, is a cone shape.

According to this configuration, since the solid immersion lens and the optical recording medium are less likely to collide with each other even when the end face of the solid immersion lens and the surface of the optical recording medium are inclined relative to each other, a permissible angle of a relative inclination between the end face of the solid immersion lens and the surface of the optical recording medium can be increased.

An information recording/reproducing method according to another aspect of the present invention comprises:

an emittance modifying step of modifying an emittance of light outputted from a first light source by an emittance modifying unit;

a converging step of converging light, whose emittance had been modified in the emittance modifying step, on an optical recording medium having a plurality of layers by an objective lens optical system including a solid immersion lens;

a first reflecting step of reflecting light outputted from the first light source and reflected by a recording layer of the optical recording medium by a first branch section;

a second reflecting step of reflecting light reflected by an end face of the solid immersion lens by a second branch section into which light outputted from a second light source is incident;

a first optical detection step of receiving light reflected in the first reflecting step and outputting an electrical signal corresponding to a quantity of received light; and a second optical detection step of receiving light reflected in the second reflecting step and outputting an electrical signal corresponding to a quantity of received light, wherein a distance between the end face of the solid immersion lens and a surface of the optical recording medium is kept at a distance over which an evanescent light is propagated and which is shorter than $1/10$ of a wavelength of light outputted from the first light source, the second branch section is arranged between the emittance modifying unit and the objective lens optical system, an electrical signal for reproducing information recorded on the optical recording medium is outputted in the first optical detection step, and an electrical signal for detecting a relative inclination angle between the end face of the solid immersion lens and the surface of the optical recording medium is outputted in the second optical detection step.

According to this configuration, in the emittance modifying step, an emittance of light outputted from the first light source is modified by the emittance modifying unit. In the converging step, light whose emittance had been modified in the emittance modifying step is converged on an optical recording medium having a plurality of layers by the objective lens optical system including a solid immersion lens. In the first reflecting step, light outputted from the first light source and reflected by a recording layer of the optical recording medium is reflected by the first branch section. In the second reflecting step, light reflected by an end face of the solid immersion lens is reflected by a second branch section into which light outputted from the second light source is incident. In the first optical detection step, light reflected in the first reflecting step is received and an electrical signal corresponding to a quantity of received light is outputted. In the second optical detection step, light reflected in the second reflecting step is received and an electrical signal corresponding to a quantity of received light is outputted. A distance between the end face of the solid immersion lens and a surface of the optical recording medium is kept at a distance which enables an evanescent light to be propagated and which is shorter than $1/10$ of a wavelength of light outputted from the first light source. The second branch section is arranged between the emittance modifying unit and the objective lens optical system. In the first optical detection step, an electrical signal for reproducing information recorded on the optical recording medium is outputted. In the second optical detection step, an electrical signal for detecting a relative inclination angle between the end face of the solid immersion lens and the surface of the optical recording medium is outputted.

Therefore, since the second branch section is arranged between the emittance modifying unit and the objective lens optical system, a shape of light from the second light source on the end face of the solid immersion lens does not vary even if the emittance modifying unit is operated in order to vary a focusing position of the first light source in an optical axis direction according to layers that become a recording or reproducing target, and since a spot size on the second optical detector does not vary, a relative inclination angle between the end face of the solid immersion lens and the surface of the optical recording medium can be reliably and accurately detected and a deviation in inclination angle can be suppressed.

In addition, in the information recording/reproducing method described above, favorably, a wavelength of light outputted from the first light source and a wavelength of light outputted from the second light source differ from each other.

According to this configuration, since light outputted from the first light source is never incident to the second optical detector, a relative inclination angle between the end face of the solid immersion lens and the surface of the optical recording medium can be reliably detected.

Furthermore, in the information recording/reproducing method described above, favorably, a wavelength of light outputted from the first light source and a wavelength of light outputted from the second light source are the same.

According to this configuration, since only a single wavelength is handled, the second branch section can be readily manufactured and a cost of creating the second branch section can be reduced.

Moreover, in the information recording/reproducing method described above, favorably, light outputted from the second light source is incident to the objective lens optical system as a convergent light.

According to this configuration, since light outputted from the second light source is incident to the objective lens optical system as a convergent light, a chromatic aberration due to the objective lens optical system can be corrected and optical components between the objective lens optical system and the second optical detector can be downsized. Consequently, the optical pickup can be downsized.

In addition, in the information recording/reproducing method described above, favorably, a peripheral shape of an end face of the solid immersion lens, the end face opposing a surface of the optical recording medium, is a cone shape.

According to this configuration, since the solid immersion lens and an optical recording medium are less likely to collide with each other even when the end face of the solid immersion lens and the surface of the optical recording medium are inclined relative to each other, a permissible angle of a relative inclination between the end face of the solid immersion lens and the surface of the optical recording medium can be increased.

An optical information device according to another aspect of the present invention comprises any one of the optical pickups described above, a motor which rotates an optical recording medium, and a control unit which controls the motor and the optical pickup based on signals obtained from the optical pickup. According to this configuration, the optical pickups described above can be applied to an optical information device.

An information processing device according to another aspect of the present invention comprises the optical information device described above, and an information processing unit which processes information to be recorded on the optical information device and/or information reproduced from the optical information device. According to this configuration, the optical information device described above can be applied to an information processing device.

In addition, an optical pickup according to an aspect of the present invention is an optical pickup which records information onto or reproduces information from an optical recording medium, the optical pickup comprising:

a first light source;

an objective lens optical system which includes a solid immersion lens and a diaphragm lens that focuses light from the first light source on the solid immersion lens;

a first branch section which reflects light outputted from the first light source and reflected by a recording layer of the optical recording medium;

a detection optical system which focuses light reflected by the recording layer of the optical recording medium and reflected by the first branch section; and a first optical detector which receives light focused by the detection optical system and which outputs an electrical signal according to a quantity of received light, wherein a distance between an end face of the solid immersion lens and a surface of the optical recording medium is kept at a distance which enables an evanescent light to be propagated and which is shorter than 1/10 of a wavelength of light outputted from the first light source, and a thickness of the solid immersion lens satisfies Expressions (19) and (20) below.

$$ns \times (ds - Rs) + nd \times dd > 8/(NA/0.85)/(m/15)^2 \quad (19)$$

$$\{-129 \times (ns \times (ds-Rs) + nd \times dd)/Rs \times NA^{3.5} - 3\} \times (0.405/\lambda) < 70 \quad (20)$$

In Expressions (19) and (20), ns denotes a refractive index of the solid immersion lens, ds denotes a thickness (μm) of the solid immersion lens, Rs denotes a radius of curvature (μm) of the solid immersion lens, nd denotes a refractive index of a region between the surface and a recording layer of the optical recording medium, dd denotes a distance (μm) between the surface and the recording layer of the optical recording medium, NA denotes a numerical aperture of the objective lens optical system, m denotes a lateral magnification from the objective lens optical system to the detection optical system, and λ denotes a wavelength (μm) of light outputted from the first light source.

According to this configuration, the objective lens optical system includes a solid immersion lens and a diaphragm lens that focuses light from a first light source on the solid immersion lens. The first branch section reflects light outputted from the first light source and reflected by a recording layer of an optical recording medium. The detection optical system focuses light reflected by the recording layer of the optical recording medium and reflected by the first branch section. The first optical detector receives light focused by the detection optical system and outputs an electrical signal according to a quantity of received light. A distance between the end face of the solid immersion lens and a surface of the optical recording medium is kept at a distance which enables an evanescent light to be propagated and which is shorter than 1/10 of a wavelength of light outputted from the first light source. A thickness of the solid immersion lens satisfies Expressions (19) and (20) above.

Therefore, since deterioration of a detected signal due to interference between a reflected light from an incidence plane of the solid immersion lens and a reflected light from the recording layer of the optical recording medium is eliminated and deterioration of an optical spot can be prevented even if the objective lens optical system follows an inclination of the optical recording medium, not only can information can be reliably recorded or reproduced, the risk of damaging the important optical recording medium can also be reduced.

In addition, in the optical pickup described above, favorably, a peripheral shape of the end face of the solid immersion lens, the end face opposing the optical recording medium, is a cone shape.

According to this configuration, since the solid immersion lens and an optical recording medium are less likely to collide with each other even when the end face of the solid immersion lens and the surface of the optical recording medium are inclined relative to each other, a permissible angle of a relative inclination between the end face of the solid immersion lens and the surface of the optical recording medium can be increased and a following accuracy with respect to an inclination of the optical recording medium can be set less stringent.

Furthermore, favorably, the optical pickup described above further comprises:

a second branch section into which light outputted from the first light source is incident and which reflects light reflected by an end face of the solid immersion lens; and a second optical detector which receives light reflected by the second branch section and which outputs an electrical signal corresponding to a quantity of received light, wherein the second optical detector outputs an electrical signal for detecting a distance between the end face of the solid immersion lens and a surface of the optical recording medium.

According to this configuration, light outputted from the first light source is incident to the second branch section, and the second branch section reflects light reflected by the end face of the solid immersion lens. The second optical detector receives light reflected by the second branch section and outputs an electrical signal according to a quantity of received light. The second optical detector outputs an electrical signal for detecting a distance between the end face of the solid immersion lens and the surface of the optical recording medium.

Therefore, a distance between the solid immersion lens and the optical recording medium can be accurately detected and information can be reliably recorded or reproduced. In addition, since the optical pickup comprises only one light source, an inexpensive and small optical pickup can be realized.

Furthermore, favorably, the optical pickup described above further comprises:

a second light source;

a second branch section into which light outputted from the second light source is incident and which reflects light reflected by the end face of the solid immersion lens; and a second optical detector which receives light reflected by the second branch section and which outputs an electrical signal corresponding to a quantity of received light, wherein the second optical detector outputs an electrical signal for detecting a distance between the end face of the solid immersion lens and the surface of the optical recording medium.

According to this configuration, light outputted from the second light source is incident to the second branch section, and the second branch section reflects light reflected by the end face of the solid immersion lens. The second optical detector receives light reflected by the second branch section and outputs an electrical signal according to a quantity of received light. The second optical detector outputs an electrical signal for detecting a distance between the end face of the solid immersion lens and the surface of the optical recording medium.

Therefore, a distance between the solid immersion lens and the optical recording medium can be accurately detected and information can be reliably recorded or reproduced. In addition, since the second light source for detecting a distance between the solid immersion lens and the optical recording medium is arranged separately from the first light source for recording information onto or reproducing information from a predetermined layer of the optical recording medium, an adjustment accuracy of each light source can be set less stringent and an optical pickup that is readily assembled can be realized.

Furthermore, in the optical pickup described above, favorably, the second optical detector has at least two light receiving sections, and the second optical detector outputs an electrical signal for detecting a relative inclination angle between the end face of the solid immersion lens and the surface of the optical recording medium.

According to this configuration, an electrical signal for detecting a relative inclination angle between the end face of the solid immersion lens and the surface of the optical recording medium is outputted by the second optical detector. Therefore, since a distance between the solid immersion lens and the optical recording medium can be accurately detected and the solid immersion lens and the optical recording medium can be controlled so as not to collide with each other, information can be reliably recorded or reproduced.

In addition, in the optical pickup described above, favorably, a wavelength of light outputted from the first light source and a wavelength of light outputted from the second light source differ from each other.

According to this configuration, since light outputted from the first light source is never incident to the second optical detector, a distance between the end face of the solid immersion lens and the surface of the optical recording medium as well as a relative inclination angle between the end face of the solid immersion lens and the surface of the optical recording medium can be reliably detected.

Furthermore, in the optical pickup described above, favorably, a wavelength of light outputted from the first light source and a wavelength of light outputted from the second light source are the same.

According to this configuration, since only a single wavelength is handled, the second branch section can be readily manufactured and a cost of creating the second branch section can be reduced.

Moreover, in the optical pickup described above, favorably, light outputted from the second light source is incident to the objective lens optical system as a convergent light.

According to this configuration, since light outputted from the second light source is incident to the objective lens optical system as a convergent light, a chromatic aberration due to the objective lens optical system can be corrected and optical components between the objective lens optical system and the second optical detector can be downsized. Consequently, the optical pickup can be downsized.

In addition, in the optical pickup described above, favorably, the optical recording medium has a plurality of recording layers, and the optical pickup further comprises an interlens distance modifying unit which modifies a distance between the solid immersion lens and the diaphragm lens in an optical axis direction according to the recording layers on which light is to be converged.

According to this configuration, since a distance between the solid immersion lens and the diaphragm lens in an optical axis direction is modified, an emittance of light outputted from a first light source can be modified, and a relative inclination angle between the end face of the solid immersion lens and the surface of the optical recording medium can be reliably and accurately detected.

An information recording/reproducing method according to another aspect of the present invention is an information recording/reproducing method of an optical pickup which records information onto or reproduces information from an optical recording medium, the information recording/reproducing method comprising:

a light outputting step of outputting light from a first light source;

a converging step of converging light on a recording layer of the optical recording medium by an objective lens optical system which includes a solid immersion lens and a diaphragm lens that focuses light from the first light source on the solid immersion lens;

a first reflecting step of reflecting light outputted from the first light source and reflected by the recording layer of the optical recording medium;

a focusing step of focusing light reflected by the recording layer of the optical recording medium and reflected in the first reflecting step by a detection optical system; and a first optical detection step of receiving light focused in the focusing step and outputting an electrical signal corresponding to a quantity of received light, wherein a distance between an end face of the solid immersion lens and a surface of the optical recording medium is kept at a distance which enables an evanescent light to be propagated and which is shorter than $1/10$ of a wavelength of light outputted from the first light source, an electrical signal for detecting a reproduction signal recorded on the optical recording medium is outputted in the first optical detection step, and a thickness of the solid immersion lens satisfies Expressions (21) and (22) below.

$$ns \times (ds-Rs) + nd \times dd > 8/(NA/0.85)/(m/15)^2 \quad (21)$$

$$\{-129 \times (ns \times (ds-Rs) + nd \times dd)/Rs \times NA^{3.5} - 3\} \times (0.405/\lambda) < 70 \quad (22)$$

In Expressions (21) and (22), ns denotes a refractive index of the solid immersion lens, ds denotes a thickness (μm) of the solid immersion lens, Rs denotes a radius of curvature (μm) of the solid immersion lens, nd denotes a refractive index of a region between the surface and the recording layer of the optical recording medium, dd denotes a distance (μm) between the surface and the recording layer of the optical recording medium, NA denotes a numerical aperture of the objective lens optical system, m denotes a lateral magnification from the objective lens optical system to a detection optical system which focuses light reflected by the recording layer of the optical recording medium on an optical detector, and λ denotes a wavelength (μm) of light outputted from the first light source.

According to this configuration, in the light outputting step, light is outputted from a first light source. In the converging step, light is converged on a recording layer of an optical recording medium by an objective lens optical system which includes a solid immersion lens and a diaphragm lens that focuses light from the first light source on the solid immersion lens. In the first reflecting step, light outputted from the first light source and reflected by the recording layer of the optical recording medium is reflected. In the focusing step, light reflected by the recording layer of the optical recording medium and reflected in the first reflecting step is focused by a detection optical system. In the first optical detection step, light reflected in the focusing step is received and an electrical signal corresponding to a quantity of received light is outputted. A distance between the end face of the solid immersion lens and a surface of the optical recording medium is kept at a distance which enables an evanescent light to be propagated and which is shorter than 1/10 of a wavelength of light outputted from the first light source. In the first optical detection step, an electrical signal for detecting a reproduction signal recorded on the optical recording medium is outputted. A thickness of the solid immersion lens satisfies Expressions (21) and (22) above.

Therefore, since deterioration of a detected signal due to interference between a reflected light from an incidence plane of the solid immersion lens and a reflected light from the recording layer of the optical recording medium is eliminated and deterioration of an optical spot can be prevented even if the objective lens optical system follows an inclination of the optical recording medium, not only can information can be reliably recorded or reproduced, the risk of damaging the important optical recording medium can also be reduced.

An objective lens optical system according to another aspect of the present invention is an objective lens optical system mounted to an optical pickup which records information onto or reproduces information from an optical recording medium, the objective lens optical system comprising:

a solid immersion lens; and a diaphragm lens that focuses light from a light source on the solid immersion lens, wherein a distance between an end face of the solid immersion lens and a surface of the optical recording medium is kept at a distance which enables an evanescent light to be propagated and which is shorter than 1/10 of a wavelength of light outputted from the light source, and a thickness of the solid immersion lens satisfies Expressions (23) and (24) below.

$$ns \times (ds-Rs) + nd \times dd > 8/(NA/0.85)/(m/15)^2 \quad (23)$$

$$\{-129 \times (ns \times (ds-Rs) + nd \times dd)/Rs \times NA^{3.5} - 3\} \times (0.405/\lambda) < 70 \quad (24)$$

In Expressions (23) and (24), ns denotes a refractive index of the solid immersion lens, ds denotes a thickness (μm) of the solid immersion lens, Rs denotes a radius of curvature (μm) of the solid immersion lens, nd denotes a refractive index of a region between the surface and a recording layer of the optical recording medium, dd denotes a distance (μm) between the surface and the recording layer of the optical recording medium, NA denotes a numerical aperture of the objective lens optical system, m denotes a lateral magnification from the objective lens optical system to the detection optical system, and λ denotes a wavelength (μm) of light outputted from the light source.

According to this configuration, the objective lens optical system comprises the solid immersion lens and the diaphragm lens that focuses light from the light source on the solid immersion lens. A distance between an end face of the solid immersion lens and a surface of an optical recording medium is kept at a distance which enables an evanescent light to be propagated and which is shorter than 1/10 of a wavelength of light outputted from the light source. A thickness of the solid immersion lens satisfies Expressions (23) and (24) above.

Therefore, since deterioration of a detected signal due to interference between a reflected light from an incidence plane of the solid immersion lens and a reflected light from the recording layer of the optical recording medium is eliminated and deterioration of an optical spot can be prevented even if the objective lens optical system follows an inclination of the optical recording medium, not only can information can be reliably recorded or reproduced, the risk of damaging the important optical recording medium can also be reduced.

An optical information device according to another aspect of the present invention comprises any one of the optical pickups described above, a motor which rotates an optical recording medium, and a control unit which controls the motor and the optical pickup based on signals obtained from the optical pickup. According to this configuration, the optical pickups described above can be applied to an optical information device.

An information processing device according to another aspect of the present invention comprises the optical information device described above, and an information processing unit which processes information to be recorded on the optical information device and/or information reproduced from the optical information device. According to this configuration, the optical information device described above can be applied to an information processing device.

It is to be understood that the specific embodiments or examples described in Description of Embodiments are merely illustrative of the technical contents of the present invention, and that the present invention should not be construed as being limited to such specific examples. Obviously, many modifications and variations of the present invention are possible without departing from the spirit of the invention and the scope of the following claims.

Industrial Applicability

The optical pickup, the inclination angle detection method, and the optical information device according to the present invention enable information to be reliably recorded onto or reproduced from an optical recording medium having plurality of layers at high density and in a reliable manner using a solid immersion lens with a numerical aperture greater than one. Therefore, the optical pickup, the inclination angle detection method, and the optical information device according to the present invention can be used in information processing devices such as a computer, an optical disk recorder, an optical disk player, an optical disk server, a car navigation system, and the like which are applied equipment of an optical information device.

The invention claimed is:

1. An optical pickup comprising:
an optical beam generating unit which generates a first beam and a second beam;
an objective lens optical system which includes a solid immersion lens having an end face opposing a surface of an optical recording medium having a plurality of layers, and which converges the first beam and the second beam on the optical recording medium;
a first branch element which reflects the first beam and the second beam reflected by the end face of the solid immersion lens;
a convergence state modifying unit which converges the first beam and the second beam reflected by the first branch element and which modifies convergence states of the first beam and the second beam; and
a first optical detector which detects the first beam and the second beam converged by the convergence state modifying unit, wherein
a center of the first beam and a center of the second beam are at positions that differ from each other on the end face of the solid immersion lens,
the convergence state modifying unit modifies the convergence states of the first beam and the second beam according to layers of the optical recording medium, and
the first optical detector includes a first light receiving section which receives the converged first beam and a second light receiving section which receives the converged second beam, and the first optical detector detects a relative inclination angle between the end face of the solid immersion lens and the surface of the optical recording medium based on a difference in quantities of received light between the first light receiving section and the second light receiving section.

2. The optical pickup according to claim 1, further comprising
an emittance modifying mechanism which modifies emittances of the first beam and the second beam generated by the optical beam generating unit, wherein
the objective lens optical system converges the first beam and the second beam from the emittance modifying mechanism on the optical recording medium.

3. The optical pickup according to claim 1, wherein
the objective lens optical system further includes a diaphragm lens which converges the first beam and the second beam on the solid immersion lens, and
the optical pickup further comprises an interlens distance modifying unit which modifies a distance between the solid immersion lens and the diaphragm lens in an optical axis direction.

4. The optical pickup according to claim 1, wherein the convergence state modifying unit includes a convergence position modifying unit which modifies convergence positions of the first beam and the second beam.

5. The optical pickup according to claim 4, wherein the convergence position modifying unit includes a converging lens which converges the first beam and the second beam, a glass plate, and a glass plate insertion section which inserts the glass plate onto an optical path between the converging lens and the first optical detector according to the layers of the optical recording medium.

6. The optical pickup according to claim 5, wherein
the glass plate includes a plurality of glass plates with thicknesses that differ from each other, and
the glass plate insertion section selectively inserts the plurality of glass plates onto the optical path between the converging lens and the first optical detector according to the layers of the optical recording medium.

7. The optical pickup according to claim 4, wherein the convergence position modifying unit includes a converging lens which converges the first beam and the second beam, and a lens position modifying mechanism which modifies a position of the converging lens in an optical axis direction according to the layers of the optical recording medium.

8. The optical pickup according to claim 4, wherein the convergence position modifying unit includes a convertible lens which varies focal positions of the first beam and the second beam according to the layers of the optical recording medium.

9. The optical pickup according to claim 8, wherein the convertible lens includes a liquid crystal lens.

10. The optical pickup according to claim 1, wherein the convergence state modifying unit includes an astigmatism imparting unit which imparts astigmatisms to the first beam and the second beam.

11. The optical pickup according to claim 10, wherein the astigmatism imparting unit includes a lens in which at least one plane among a light incidence plane and a light emission plane is a cylindrical surface.

12. The optical pickup according to claim 10, wherein the astigmatism imparting unit includes a condensing lens which focuses the first beam and the second beam, and a wedge-shaped glass plate arranged in an optical path between the condensing lens and the first optical detector.

13. The optical pickup according to claim 1, wherein a peripheral shape of the end face of the solid immersion lens is a cone shape.

14. The optical pickup according to claim 1, wherein the center of the second beam on the end face of the solid immersion lens is at a position which is offset from the center of the first beam on the end face of the solid immersion lens in a tangential direction or a radial direction of the optical recording medium.

15. The optical pickup according to claim 1, wherein
the optical beam generating unit further generates a third beam and a fourth beam,
the objective lens optical system converges the third beam and the fourth beam on the optical recording medium,
the first branch element reflects the third beam and the fourth beam reflected by the end face of the solid immersion lens,
the convergence state modifying unit converges the third beam and the fourth beam reflected by the first branch element on the first optical detector and, modifies convergence states of the third beam and the fourth beam,
the first optical detector detects the third beam and the fourth beam converged by the convergence state modifying unit,
the center of the first beam, the center of the second beam, a center of the third beam, and a center of the fourth beam are at positions that differ from each other on the end face of the solid immersion lens, a straight line that connects the center of the first beam and the center of the second beam is perpendicular to a straight line that connects the center of the third beam and the center of the fourth beam on the end face of the solid immersion lens, and the first optical detector further includes a third light receiving section which receives the converged third beam and a fourth light receiving section which receives the converged fourth beam, and the first optical detector detects a relative inclination angle between the end face of the solid immersion lens and the surface of the optical recording medium based on a difference in quantities of received light between the first light receiving section and the second light receiving section and on a difference in quantities of received light between the third light receiving section and the fourth light receiving section.

16. The optical pickup according to claim 1, wherein
the first beam is a main beam,
the second beam is a sub-beam,
the first branch element reflects the main beam and the sub-beam reflected by the end face of the solid immersion lens,
the first optical detector detects the main beam and the sub-beam converged by the convergence state modifying unit, and
the optical pickup further comprises:
a second branch element which reflects the main beam reflected by the optical recording medium; and
a second optical detector which detects the main beam reflected by the second branch element.

17. An inclination angle detection method of detecting a relative inclination angle between a surface of an optical recording medium having a plurality of layers and an end face of a solid immersion lens, which opposes the surface of the optical recording medium, the inclination angle detection method comprising:
an optical beam generating step of generating a first beam and a second beam;
a converging step of converging the first beam and the second beam on the optical recording medium via the solid immersion lens;
a reflecting step of reflecting the first beam and the second beam reflected by the end face of the solid immersion lens;
a convergence state modifying step of converging the first beam and the second beam reflected in the reflecting step, and modifying convergence states of the first beam and the second beam; and
an optical detection step of detecting the first beam and the second beam converged in the convergence state modifying step, wherein
a center of the first beam and a center of the second beam are at positions that differ from each other on the end face of the solid immersion lens,
the convergence states of the first beam and the second beam are modified according to layers of the optical recording medium in the convergence state modifying step, and
a relative inclination angle between the end face of the solid immersion lens and the surface of the optical recording medium is detected in the optical detection step based on a difference in quantities of received light between the converged first beam and the converged second beam.

18. An optical information device comprising:
the optical pickup according to claim 1;
a motor which rotates an optical recording medium; and
a control unit which controls the motor and the optical pickup based on signals obtained from the optical pickup.

19. An information processing device comprising:
the optical information device according to claim 18; and
an information processing unit which processes information to be recorded on the optical information device and/or information reproduced from the optical information device.

* * * * *